United States Patent
Naito et al.

(10) Patent No.: US 11,695,182 B2
(45) Date of Patent: Jul. 4, 2023

(54) BATTERY PACK

(71) Applicant: MAKITA CORPORATION, Anjo (JP)

(72) Inventors: Akira Naito, Anjo (JP); Tatsuya Nagahama, Anjo (JP)

(73) Assignee: MAKITA CORPORATION, Anjo (JP)

( * ) Notice: Subject to any disclaimer, the term of this patent is extended or adjusted under 35 U.S.C. 154(b) by 0 days.

(21) Appl. No.: 17/036,411

(22) Filed: Sep. 29, 2020

(65) Prior Publication Data

US 2021/0098756 A1 Apr. 1, 2021

(30) Foreign Application Priority Data

Sep. 30, 2019 (JP) ................................. 2019-180792
Sep. 30, 2019 (JP) ................................. 2019-180793
Sep. 30, 2019 (JP) ................................. 2019-180795

(51) Int. Cl.
  *H01M 50/213* (2021.01)
  *H01M 10/42* (2006.01)
  (Continued)

(52) U.S. Cl.
  CPC ....... *H01M 50/213* (2021.01); *H01M 10/425* (2013.01); *H01M 50/10* (2021.01);
  (Continued)

(58) Field of Classification Search
  None
  See application file for complete search history.

(56) References Cited

U.S. PATENT DOCUMENTS

| | | |
|---|---|---|
| 5,661,392 A | 8/1997 | Imazeki |
| 6,227,322 B1 | 5/2001 | Nishikawa |

(Continued)

FOREIGN PATENT DOCUMENTS

| | | |
|---|---|---|
| EP | 1548859 A2 | 6/2005 |
| EP | 2830122 B1 | 2/2016 |

(Continued)

OTHER PUBLICATIONS

Extended European Search Report from the European Patent Office dated Feb. 23, 2021 in related application No. EP 20198597, including European Search Opinion and examined claims 1-15.

(Continued)

*Primary Examiner* — Carmen V Lyles-Irving
(74) *Attorney, Agent, or Firm* — J-Tek Law PLLC; Jeffrey D. Tekanic; Scott T. Wakeman

(57) ABSTRACT

A battery pack (2; 602) includes: an outer case (12; 612); one or more battery cells (90a-90j); and a cell case (80), which is housed in the outer case (12; 612) and houses the battery cell(s) (90a-90j). The outer case (12; 612) has: an upper surface (wall) (14b), in which a terminal-opening part (22a) for exposing a terminal (102) is provided; a bottom wall (15e); and a plurality of side surfaces (walls) (15a-15d) extending upward from the bottom wall (15e). The battery cell(s) (90a-90j) is (are) disposed parallel to the bottom wall (15e). An opening (40a-40j) is provided in a specific side surface (15b, 15d), from among the plurality of side surfaces (15a-15d), that faces an end surface of the battery cell(s) (90a-90j) in a longitudinal direction.

21 Claims, 37 Drawing Sheets

(51) Int. Cl.
  *H01M 50/10* (2021.01)
  *H01M 50/543* (2021.01)
  *H01M 50/572* (2021.01)
  *H01M 50/30* (2021.01)

(52) U.S. Cl.
  CPC ....... *H01M 50/394* (2021.01); *H01M 50/543* (2021.01); *H01M 50/572* (2021.01); *H01M 2220/30* (2013.01)

(56) References Cited

U.S. PATENT DOCUMENTS

| | | | |
|---|---|---|---|
| 6,350,149 | B1 | 2/2002 | Nakane |
| 6,627,345 | B1 | 9/2003 | Zemlok et al. |
| 8,684,106 | B2 | 4/2014 | Hanawa et al. |
| 9,318,729 | B2 | 4/2016 | Ogura |
| 9,601,729 | B2 | 3/2017 | Naito |
| 9,847,562 | B2 | 12/2017 | Kondo |
| 10,348,110 | B2 | 7/2019 | Kondo et al. |
| 2004/0081885 | A1 | 4/2004 | Ziegler et al. |
| 2005/0287426 | A1* | 12/2005 | Kim .................. H01M 50/26 429/120 |
| 2006/0091858 | A1 | 5/2006 | Johnson et al. |
| 2006/0110656 | A1 | 5/2006 | Moores et al. |
| 2008/0061738 | A1 | 3/2008 | Hanawa et al. |
| 2008/0084181 | A1 | 4/2008 | Griffin |
| 2008/0102355 | A1 | 5/2008 | Moores et al. |
| 2008/0286642 | A1 | 11/2008 | Naito et al. |
| 2009/0229957 | A1 | 9/2009 | Nishimiya et al. |
| 2009/0246615 | A1 | 10/2009 | Park |
| 2010/0092850 | A1 | 4/2010 | Ueda et al. |
| 2010/0112435 | A1 | 5/2010 | Hanawa et al. |
| 2010/0156350 | A1 | 6/2010 | Murayama et al. |
| 2010/0248016 | A1 | 9/2010 | Hanawa et al. |
| 2011/0005793 | A1 | 1/2011 | Hanawa et al. |
| 2011/0025269 | A1 | 2/2011 | Funabashi et al. |
| 2011/0250476 | A1 | 10/2011 | Taga |
| 2011/0250780 | A1 | 10/2011 | Fukumoto et al. |
| 2011/0253402 | A1 | 10/2011 | Aradachi et al. |
| 2012/0045667 | A1 | 2/2012 | Yoneda et al. |
| 2012/0045671 | A1 | 2/2012 | Miller et al. |
| 2012/0100400 | A1 | 4/2012 | Kang et al. |
| 2012/0127676 | A1 | 5/2012 | Warmuth et al. |
| 2013/0143452 | A1 | 6/2013 | Yoshikawa |
| 2013/0224539 | A1 | 8/2013 | Hayashi et al. |
| 2013/0230757 | A1 | 9/2013 | Sakakibara |
| 2014/0106195 | A1 | 4/2014 | Milbourne et al. |
| 2014/0248519 | A1 | 9/2014 | Nishikawa et al. |
| 2014/0302353 | A1 | 10/2014 | Ogura |
| 2014/0302376 | A1 | 10/2014 | Naito |
| 2014/0302377 | A1 | 10/2014 | Naito |
| 2015/0075831 | A1 | 3/2015 | Hanawa et al. |
| 2015/0249237 | A1 | 9/2015 | Naito |
| 2016/0006005 | A1 | 1/2016 | Sakakibara |
| 2016/0240901 | A1 | 8/2016 | Kondo |
| 2016/0241065 | A1 | 8/2016 | Kondo et al. |
| 2018/0130980 | A1 | 5/2018 | Ogura et al. |
| 2018/0241017 | A1 | 8/2018 | Nakamura et al. |
| 2018/0262150 | A1 | 9/2018 | White et al. |
| 2019/0259984 | A1* | 8/2019 | Nishikawa ............ H01M 50/20 |
| 2019/0280501 | A1 | 9/2019 | Kondo et al. |
| 2020/0203682 | A1 | 6/2020 | Bannai |
| 2021/0098755 | A1 | 4/2021 | Nagahama et al. |
| 2021/0098757 | A1 | 4/2021 | Nagahama |

FOREIGN PATENT DOCUMENTS

| | | |
|---|---|---|
| JP | H11288744 A | 10/1999 |
| JP | 2000164182 A | 6/2000 |
| JP | 2001256940 A | 9/2001 |
| JP | 2005026190 A | 1/2005 |
| JP | 2005209369 A | 8/2005 |
| JP | 2007172981 A | 7/2007 |
| JP | 2010050044 A | 3/2010 |
| JP | 2011222171 A | 11/2011 |
| JP | 2011222459 A | 11/2011 |
| JP | 2013114782 A | 6/2013 |
| JP | 2013191288 A | 9/2013 |
| JP | 2014170635 A | 9/2014 |
| JP | 2014203660 A | 10/2014 |
| JP | 2014203661 A | 10/2014 |
| JP | 2014203703 A | 10/2014 |
| JP | 2016018604 A | 2/2016 |
| JP | 2016018605 A | 2/2016 |
| JP | 2016149841 A | 8/2016 |
| JP | 2016207517 A | 12/2016 |
| JP | 2017188300 A | 10/2017 |
| JP | 2018106796 A | 7/2018 |
| WO | 2013140951 A1 | 9/2013 |
| WO | 2017073201 A1 | 5/2017 |
| WO | 2019044069 A1 | 3/2019 |

OTHER PUBLICATIONS

Extended European Search Report from the European Patent Office dated Feb. 24, 2021 in related application No. EP 20 198 595, including European Search Opinion and examined claims 1-15.
Unpublished U.S. Appl. No. 17/036,356.
Unpublished U.S. Appl. No. 17/036,435.
Office Action from the United States Patent Office dated Jan. 24, 2022 in U.S. Appl. No. 17/036,435.
Office Action dated May 17, 2022, in U.S. Appl. No. 17/036,356.
Office Action from the United States Patent Office dated Dec. 22, 2021 in related U.S. Appl. No. 17/036,356, including examined claims 1-20.
Office Action dated Jun. 1, 2022, in related U.S. Appl. No. 17/036,435.
Office Action from the Japanese Patent Office dated Apr. 4, 2023 in counterpart Japanese application No. JP2019-180792, and machine translation thereof.
Office Action from the Japanese Patent Office dated Apr. 4, 2023 in counterpart Japanese application No. JP2019-180795, and machine translation thereof.
Search Report from the Japanese Patent Office dated Mar. 22, 2023 in related Japanese application No. 2019-180793, and machine translation thereof.
Search Report from the Japanese Patent Office dated Mar. 29, 2023 in counterpart Japanese application No. 2019-180792, and machine translation thereof.
Search Report from the Japanese Patent Office dated Mar. 29, 2023 in counterpart Japanese application No. 2019-180795, and machine translation thereof.
Office Action from the Japanese Patent Office dated Apr. 19, 2023 in counterpart Japanese application No. JP2019-180793, and machine translation thereof.

* cited by examiner ( Second Embodiment )

BATTERY PACK

CROSS-REFERENCE TO RELATED APPLICATIONS

This application claims priority to Japanese patent application no. 2019-180792, 2019-180793 and 2019-180795, all filed on Sep. 30, 2019, the contents of each of which are fully incorporated herein by reference.

TECHNICAL FIELD

The subject matter disclosed by the present specification generally relates to battery packs, such as, e.g., battery packs for power tools and outdoor power equipment.

BACKGROUND ART

Japanese Laid-open Patent Publication 2014-203703 discloses a battery pack that comprises: an outer case; battery cells; and a cell case, which is housed in the outer case and houses the battery cells. The outer case has: an upper surface, in which terminal-opening parts for exposing terminals are provided; a bottom surface (wall); and a plurality of side surfaces (walls) extending upward from the bottom surface. The battery cells are disposed parallel to the bottom surface.

SUMMARY OF THE INVENTION

When a power tool is driven using power supplied by such a battery pack mounted thereon, the temperature within the battery pack increases. Specifically, the temperature of the battery cells housed in the cell case increases and it is preferable to quickly cool the battery cells.

It is one non-limiting object of the present teachings to disclose techniques that enable battery cells within a battery pack to be quickly cooled, e.g., while the battery pack is mounted on a power tool and the power tool is being operated.

In one aspect of the present teachings, a battery pack disclosed in the present specification comprises: an outer case; one or more battery cells; and a cell case, which is housed in the outer case and houses the battery cell(s). The outer case has: an upper surface (wall), in which one or more terminal-opening parts for (respectively) exposing one or more terminal(s) is provided; a bottom wall (bottom plate); and a plurality of side surfaces (walls) extending upward from the bottom wall. The battery cell(s) is (are) disposed parallel to the bottom wall. At least one opening is provided (defined) in at least one specific side surface, from among the plurality of side surfaces, and the at least one specific side surface faces (opposes) an end surface of the battery cell(s) in a longitudinal direction.

In such a battery pack according to the present teachings, the opening(s) is (are) provided in the at least one specific side surface that faces (opposes) one longitudinal end surface of the battery cell(s). Therefore, when the temperature within the battery pack increases owing to the air around the battery cell(s) warming up, outside air flows via the opening(s) into the outer case and rises within the outer case while cooling the battery cell(s). Accordingly, the battery cell(s) can be quickly cooled, even when the battery pack is mounted on an external apparatus, such as a power tool or outdoor power equipment, and is supplying current thereto.

DETAILED DESCRIPTION OF EMBODIMENTS OF THE PRESENT TEACHINGS

Figure 1A:
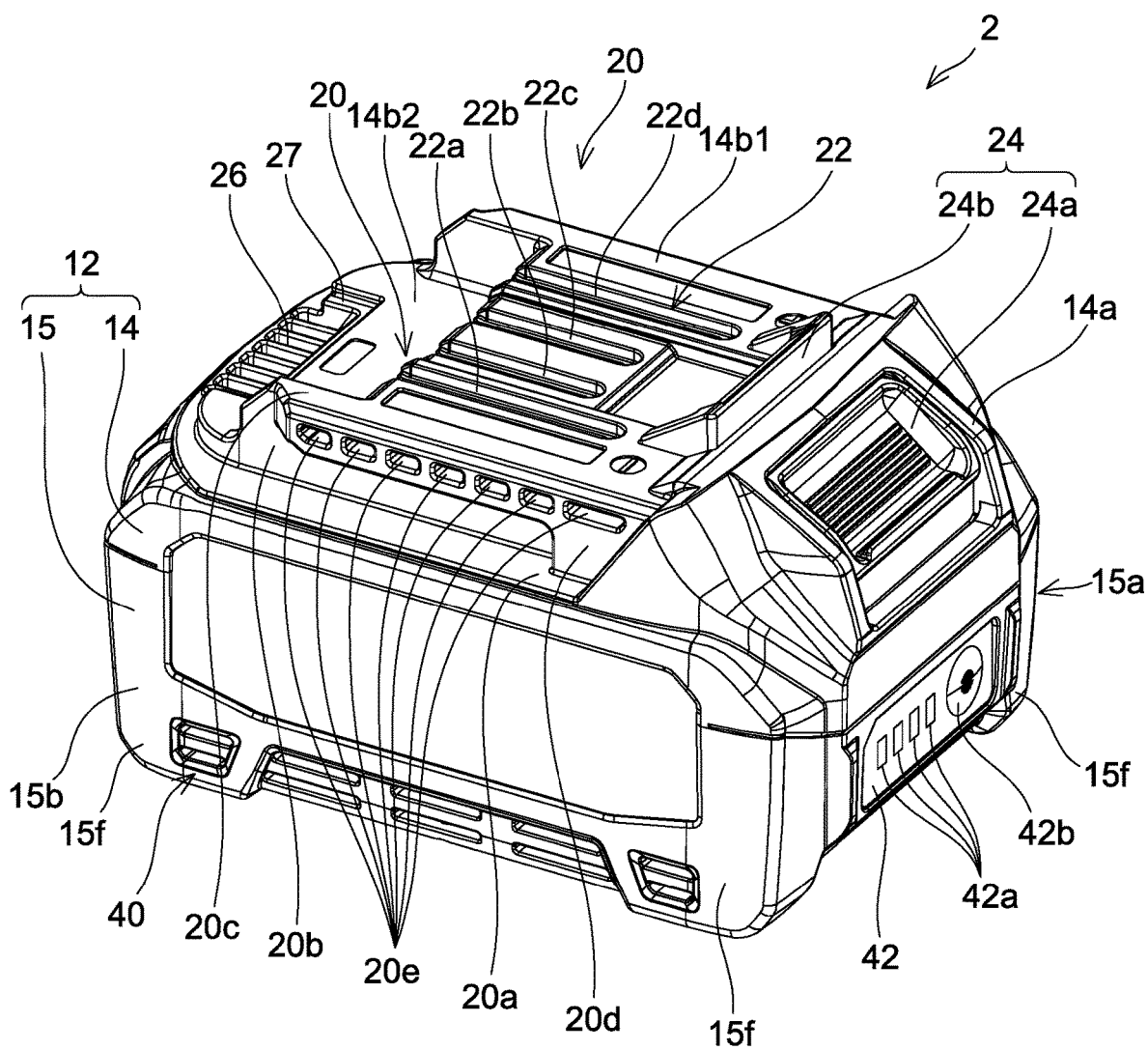
FIG. 1A is an oblique view, viewed from the front, the right, and above, of a battery pack 2 according to a first embodiment of the present teachings.
Figure 1A:
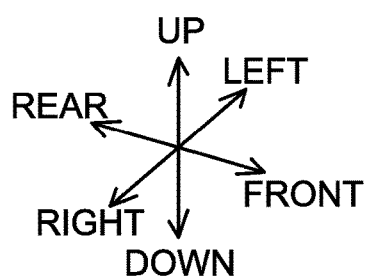

In one or more embodiments of the above-described aspect of the present teachings, the opening(s) may be provided in the at least one specific side surface (wall) at a location (locations) at which the opening(s) face(s) (oppose(s)) the end surface(s) of the battery cell(s) in the longitudinal direction.

According to the above-mentioned configuration, air that has flowed via the opening(s) into the outer case can be reliably caused to contact the battery cell(s).

In one or more embodiments, the battery cells may comprise at least one bottom-surface-side battery cell and at least one upward-side battery cell, which is disposed upward of the at least one bottom-surface-side battery cell. The opening(s) is (are) provided in the at least one specific side surface (wall) at a location (locations) at which the opening(s) face(s) (opposes) the end surface(s) of the bottom-surface-side battery cell(s) in the longitudinal direction; preferably, no opening is provided at a location (or locations) that face(s) (oppose(s)) the end surface(s) of the upward-side battery cell(s) in the longitudinal direction.

In such an embodiment, air that has flowed via the opening(s) into the outer case rises within the outer case. More specifically, air that has flowed via the opening(s) provided at the location (locations) that face(s) the end surface(s) of the bottom-surface-side battery cell(s) in the longitudinal direction rises within the outer case while also contacting (flowing across) the upward-side battery cell(s). Accordingly, compared with an embodiment in which the opening(s) is (are) also provided at a location (or location(s)) that face(s) the end surface(s) of the upward-side battery cell(s) in the longitudinal direction, the number of openings provided in the at least one specific side surface (wall) can be reduced.

In one or more embodiments, two or more battery cells may be provided, in the outer case, such that they are lined up parallel to the bottom wall. In such embodiment(s), two or more openings, corresponding to (opposing) the two or more battery cells, may be provided in the at least one specific side surface (wall).

According to the above-mentioned configuration, air that has flowed via the openings, which respectively correspond to (oppose) the battery cells, into the outer case can be caused to make contact with each of the two or more battery cells.

In one or more embodiments, an inward protruding rib may be provided on the at least one specific side surface (wall) of the outer case, and the rib may be provided between a first opening and a second opening from among the two or more openings.

According to the above-mentioned configuration, dispersion (e.g., lateral dispersion) of air that has flowed in via the openings can be prevented (blocked) by the rib, which preferably extends in the up-down (vertical) direction of the battery pack. Accordingly, air that has flowed via the openings, which respectively correspond to (oppose) the battery cells, into the outer case can be reliably caused to make contact with (flow across) each of the two or more battery cells.

In one or more embodiments, a lower end (edge) of the opening(s) may be located downward of a longitudinal-direction axis of the battery cell(s), preferably downward of the longitudinal-direction axis of the bottom-surface-side battery cell(s).

According to the above-mentioned configuration, a greater amount of the surface area of the battery cell(s) contacts the air that has flowed via the opening(s) into the outer case. Accordingly, the battery cell(s) can be more quickly cooled.

In one or more embodiments, the (each) battery cell may further comprise a metal plate connected to the end surface of the (each) battery cell in the longitudinal direction. The metal plate is preferably oriented perpendicular to the longitudinal direction (i.e. it is oriented in the up-down direction), and the lower end (edge) of the opening(s) may be located downward of a lower end (edge) of the metal plate(s).

According to the above-mentioned configuration, an even greater amount of the surface area of the battery cell(s) contacts the air that has flowed via the opening(s) into the outer case. Accordingly, the battery cell(s) can be more quickly cooled.

In one or more embodiments, three or more battery cells may be provided, in the outer case, such that they are lined up parallel to the bottom wall. The three or more battery cells include (two) outward battery cells, which are respectively disposed at locations closest to respective corner portions of the outer case, and an inward battery cell, which is disposed inward of the outward battery cells. That is, the outward battery cells are respectively disposed closer to the corner portions than the inward battery cell. The width(es) of the openings corresponding to (opposing) the outward battery cells is (are) smaller (less) than the width of the opening corresponding to (opposing) the inward battery cell.

This embodiment provides the following advantageous effect. For example, if a user drops the battery pack, one of the corner portions of the outer case may be subjected to an impact. The openings corresponding to (opposing) the outward battery cells are the openings closest to the corner portions of the outer case. If the width of these openings were to be (hypothetically) large (or e.g., the same width as the opening corresponding to (opposing) the inward battery cell), then the stiffness of the outer case in the vicinity of those openings would be reduced. However, in the above-mentioned configuration, because the width(es) of the openings corresponding to (opposing) the outward battery cells is (are) smaller than the width of other opening(s), the stiffness of the corner portions of the outer case can be increased as compared an embodiment in which the widths of all the openings are the same. As a result, if the user drops the battery pack, the likelihood of deformation of the outer case can be reduced.

In one or more embodiments, a vent may be provided in an upper portion (wall) of the outer case.

According to the above-mentioned configuration, air that has flowed via the opening(s) into the outer case rises while cooling the battery cell(s) and is then exhausted via the vent in the upper portion of the outer case. Accordingly, air that has flowed via the opening(s) into the outer case can be reliably caused to make contact with the battery cell(s).

In one or more embodiments, the battery pack may be designed to be mountable on a charger. Preferably, when the battery pack is mounted on the charger, the above-described opening(s) is (are) not covered by the charger.

According to the above-mentioned configuration, when the battery pack is mounted on the charger, air that has flowed via the opening(s) into the outer case is exhausted via the vent, and air that has flowed via the vent into the outer case is exhausted via the opening(s). Accordingly, the opening(s) can be utilized as an air-suction hole and an exhaust hole.

In one or more embodiments, when the battery pack is mounted on the charger, the opening(s) may act as an air-suction hole (air-suction holes).

That is, when the battery pack is mounted on the charger, the opening(s) in the outer case is (are) located at a height higher than the charger. Because dust and the like tends to collect (accumulate) at lower-height locations, dust and the like is less likely to be suctioned into the interior of the battery pack via the opening(s) during a charging operation than in an embodiment the opening(s) is (are) at a lower location when the battery pack is mounted on the charger.

First Embodiment

Figure 24A:
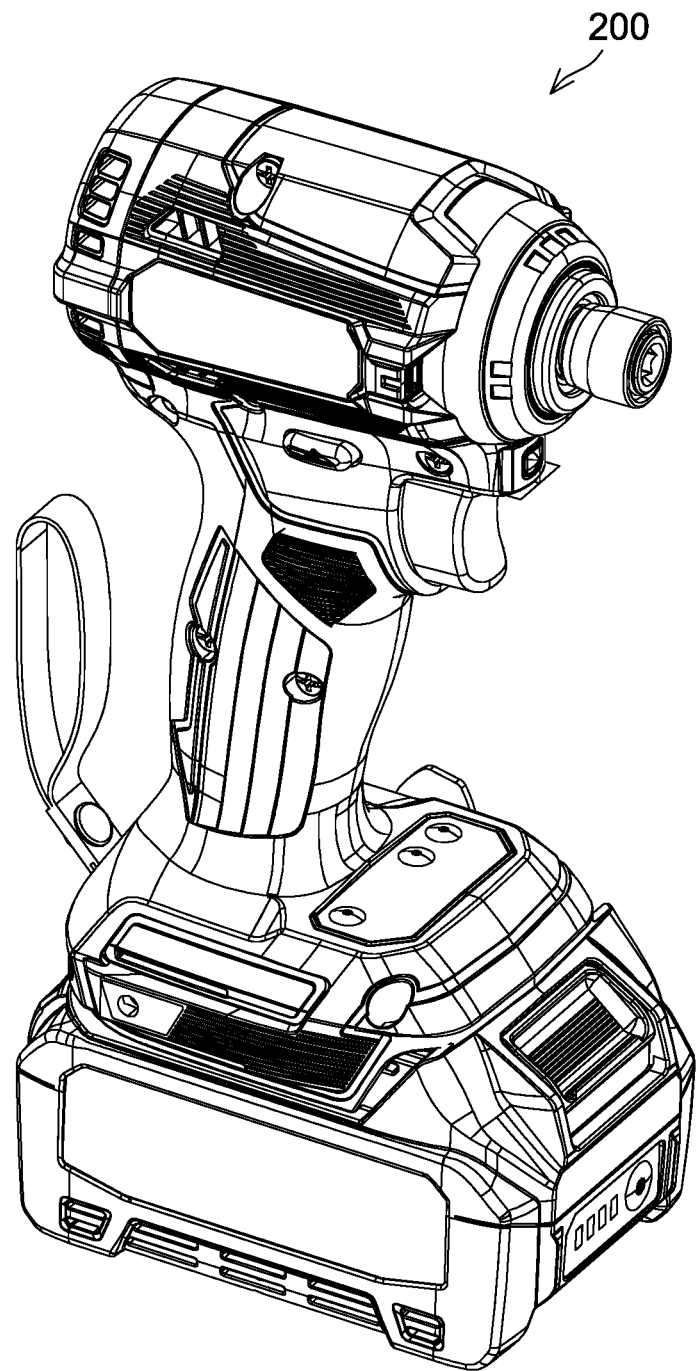
FIG. 24A is an oblique view, viewed from the right, above, and the front, of the state in which the battery pack 2 according to the first embodiment is mounted on a power tool 200.
Figure 24A:
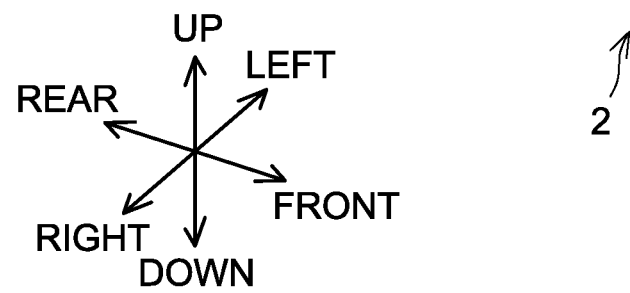
Figure 25A:
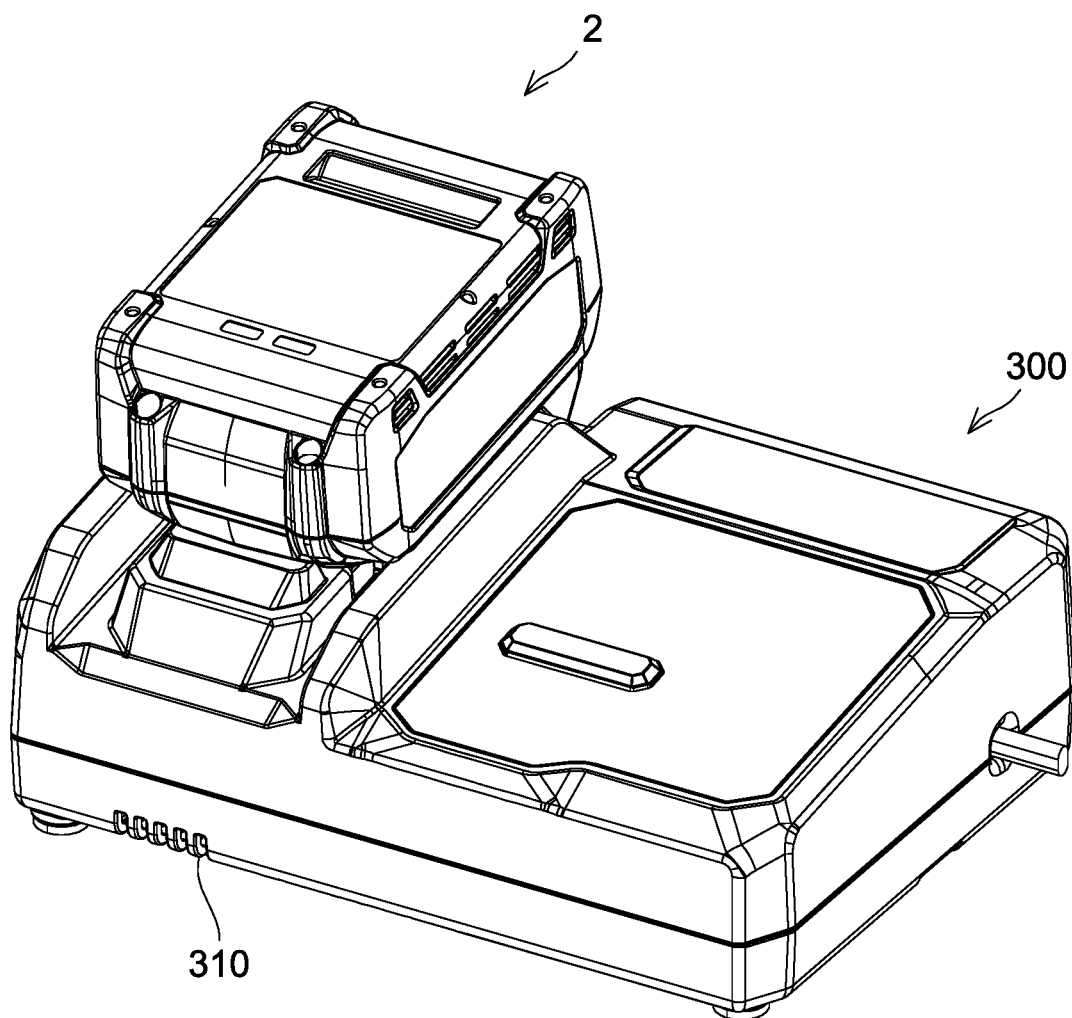
FIG. 25A is an oblique view, viewed from the left, below, and the rear, of the state in which the battery pack 2 according to the first embodiment is mounted on the charger 300.
Figure 25A:
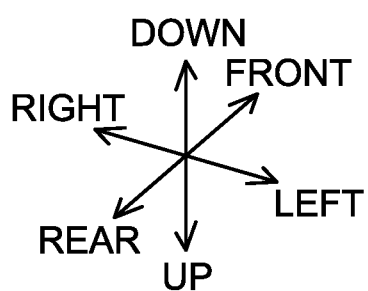

A battery pack 2 according to the first embodiment of the present teachings is explained below, with reference to the drawings. As shown in FIG. 24A, the battery pack 2 can be mounted on a power tool 200 in a detachable manner. In FIG. 24A, the power tool 200 is a power driver, but the power tool 200 may be, for example, a power drill, a power grinder, a power circular saw, a power chain saw, a power reciprocating saw, a power lawnmower, a power brush cutter, a power blower, etc. When mounted on the power tool 200, the battery pack 2 supplies electric power to the power tool 200. In addition, as shown in FIG. 25A, the battery pack 2 can be mounted on a charger 300 in a detachable manner. When mounted on the charger 300, the battery pack 2 is supplied with electric power from the charger 300. It is noted that, in the explanation below, when the battery pack 2 is being mounted on the power tool 200 or the charger 300, the direction in which the power tool 200 or the charger 300 is located, when viewed from the battery pack 2, is called "upward", and the direction opposite thereof is called "downward". In addition, when the battery pack 2 is being mounted on the power tool 200 or the charger 300, the direction in which the battery pack 2 is slid is called "rearward"; and when the battery pack 2 is being removed from the power tool 200 or the charger 300, the direction in which the battery pack 2 is slid is called "forward". That is, in the explanation below, the front-rear direction corresponds to a sliding direction, in which the battery pack 2 is slid relative to the power tool 200 or the charger 300.

As shown in FIG. 1 to FIG. 13B, the battery pack 2 comprises a battery module 10 (refer to FIG. 9) and an outer case (outer shell) 12 (refer to FIG. 1), which houses the battery module 10. The entirety of the outer case 12 is formed substantially in a rectangular-parallelepiped shape and is divided into an upper-part case (or simply "upper case" or even "upper case half") 14 and a lower-part case (or simply "lower case" or even "lower case half") 15. As shown in FIG. 2, the upper-part case 14 and the lower-part case 15 are fixed to one another by four screws 18.

Configuration of Upper-Part Case 14

Figure 2:
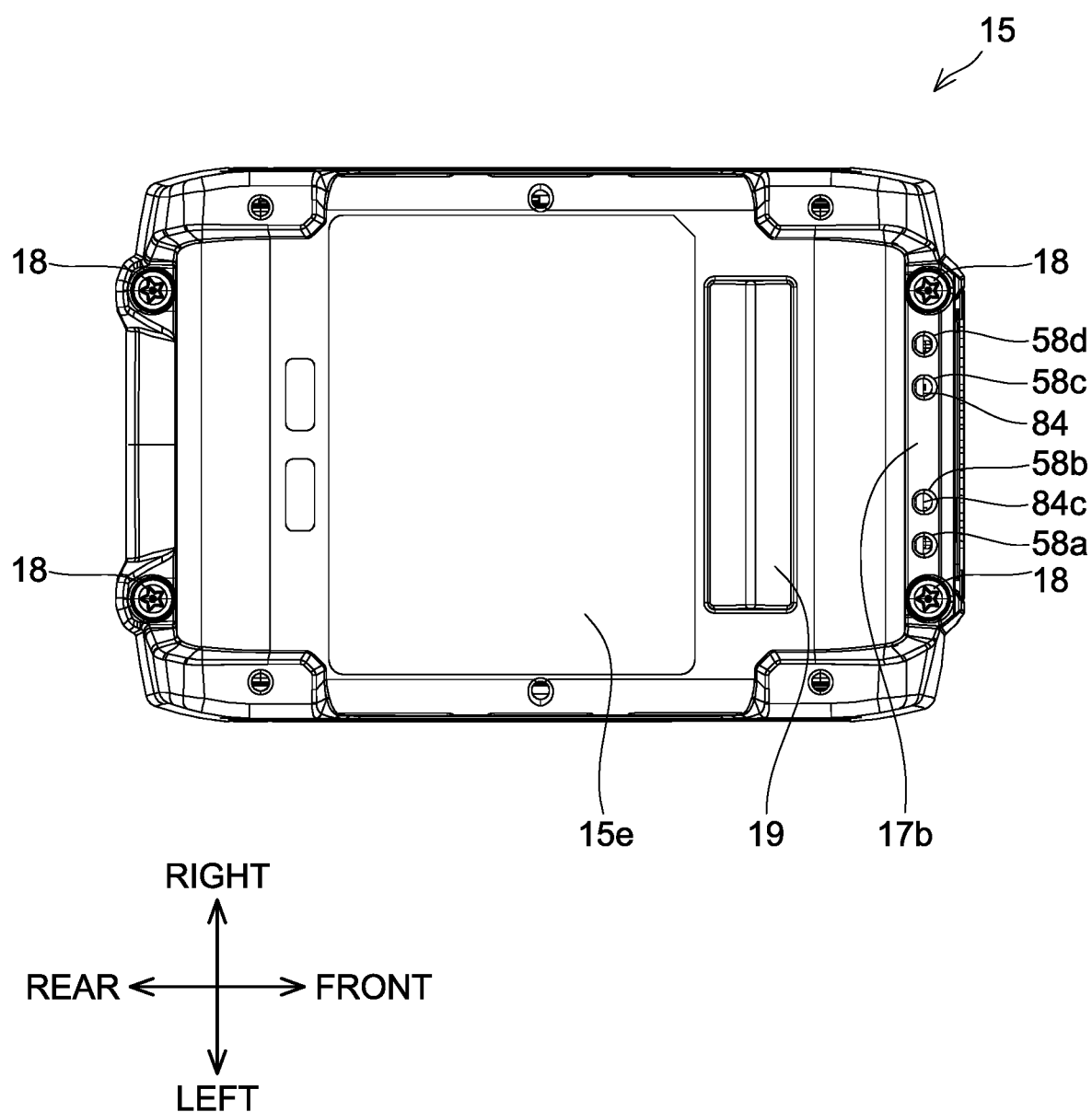
FIG. 2 is a bottom view, viewed from below, of the battery pack 2 according to the first embodiment.

As shown in FIG. 1A, slide rails 20, a terminal-receiving part 22, a hook 24, and a vent 26 are formed on or in the upper-part case 14.

Figure 25B:
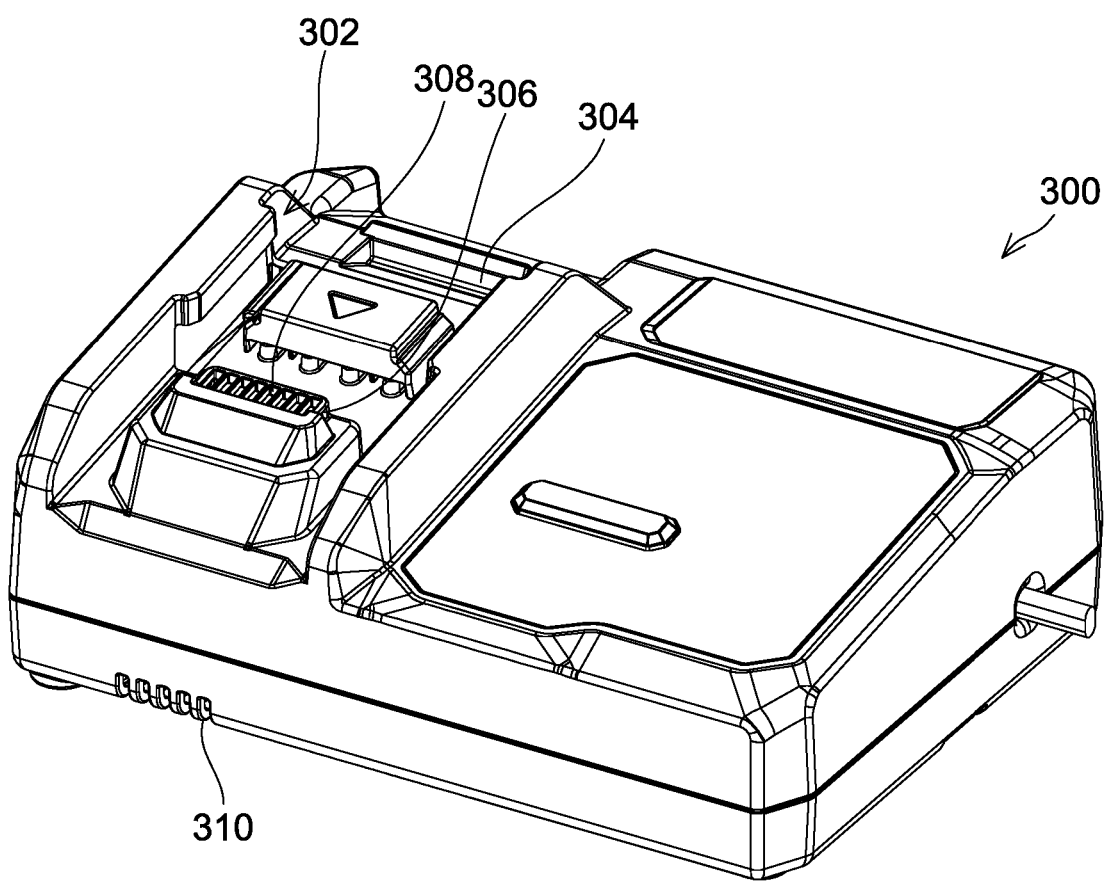
FIG. 25B is an oblique view, viewed from the left, the rear, and below, of the charger 300.
Figure 25B:
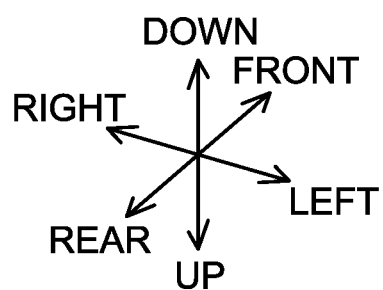

The slide rails 20 extend in the front-rear direction and are respectively disposed on left- and right-end portions of an upper portion of the upper-part case 14. As shown in FIG. 1A, the right-side slide rail 20 comprises a base part 20a, an upward-extending part 20b, a first rightward-extending part 20c, and a second rightward-extending part 20d. Furthermore, the left-side slide rail 20 comprises a base part 20a, an upward-extending part 20b, a first leftward-extending part 20c, and a second leftward-extending part 20d. As shown in FIG. 4C, the upward-extending part 20b of the right-side slide rail 20 extends upward from a left end of the base part 20a. The first rightward-extending part 20c extends rightward from the upward-extending part 20b. A lower end of the first rightward-extending part 20c is located upward of the upper end of the base part 20a. A right end of the first rightward-extending part 20c is located leftward of a right end of the base part 20a. The second rightward-extending part 20d extends rightward from the upward-extending part 20b. A right end of the second rightward-extending part 20d coincides with the location of the right end of the first rightward-extending part 20c in a left-right direction. As shown in FIG. 1A, the second rightward-extending part 20d is connected to the base part 20a. A plurality of slots (recessed parts) 20e is provided on (in) the first rightward-extending part 20c and the second rightward-extending part 20d and the slots 20e are lined up (colinear) in the front-rear direction. When the battery pack 2 is being mounted on or removed from the power tool 200 or the charger 300, the slide rails 20 slidably engage with slide rails (not shown) of the power tool 200 or with slide rails 302 (refer to FIG. 25B) of the charger 300. Specifically, the slide rails (not shown) of the power tool 200 or the slide rails 302 of the charger 300 respectively slide between the base part 20a and the first rightward-extending part 20c of the right-side slide rail 20 and between the base part 20a and the first leftward-extending part 20c of the left-side slide rail 20.

Figure 24B:
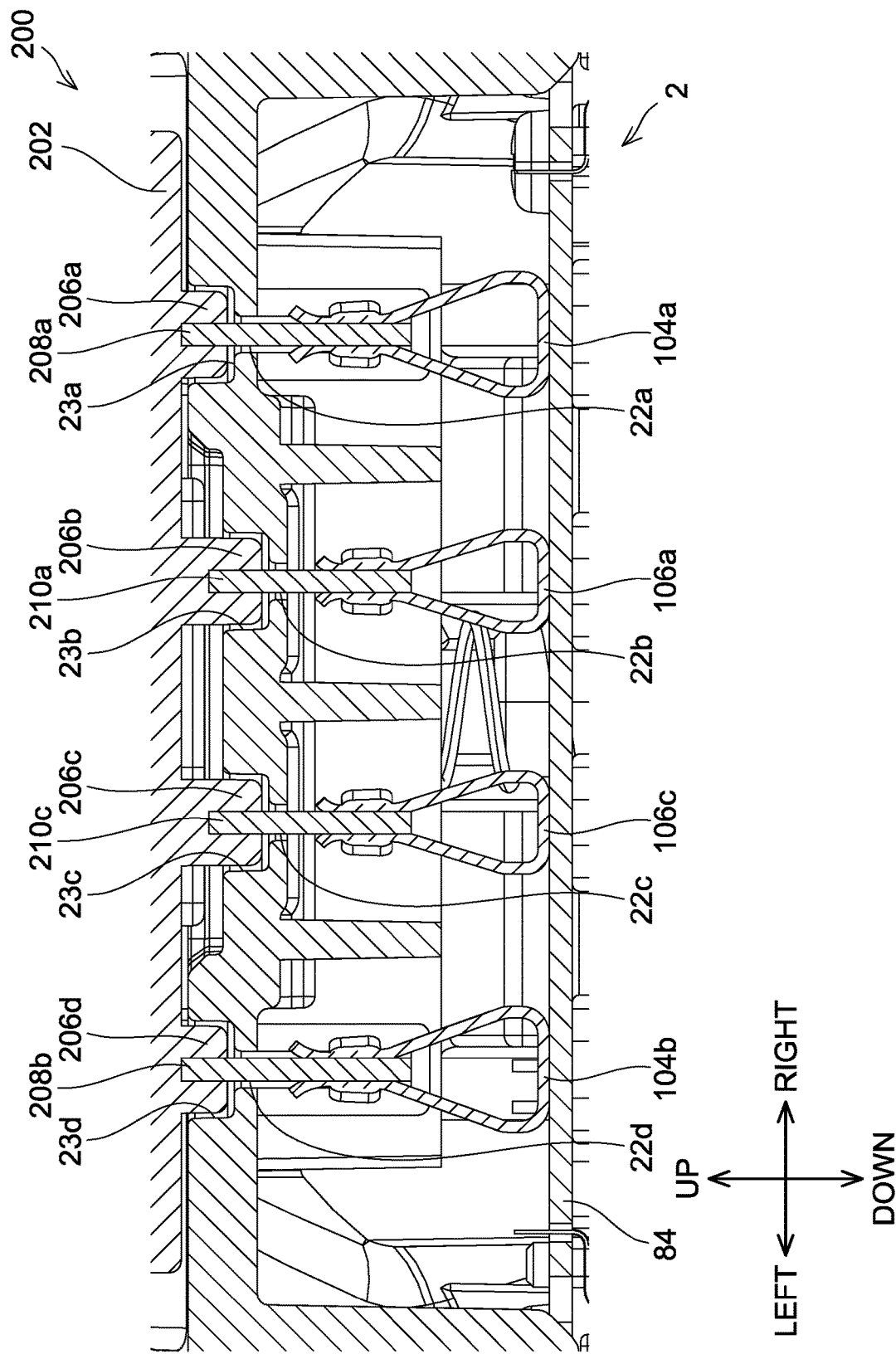
FIG. 24B is a cross-sectional view, viewed from the rear, of the state in which the battery pack 2 according to the first embodiment is mounted on the power tool 200.

The terminal-receiving part 22 comprises four terminal-opening parts (terminal openings) 22a-22d, which are provided on a forward-upper surface 14b1 of an upper wall 14b of the upper-part case 14. The terminal-opening parts 22a-22d are disposed between the left and right slide rails 20. Therefore, when the battery pack 2 is being mounted on the power tool 200 or on the charger 300, the terminal-opening parts 22a-22d respectively receive terminals 208a, 208b, 210a, 210c (refer to FIG. 24B) of the power tool 200 or terminals (not shown) of the charger 300. The terminal-opening parts 22a-22d are provided in the order of, from the right-side slide rail 20 to the left-side slide rail 20, the (first) terminal-opening part 22a, the (second) terminal-opening part 22b, the (third) terminal-opening part 22c, and the (fourth) terminal-opening part 22*d*. As shown in FIG. 1C, FIG. 12B, and FIG. 24B, battery-side channels (recessed parts, steps) 23*a*-23*d* are provided such that they respectively surround the terminal-opening parts 22*a*-22*d*. The terminal-opening parts 22*a*-22*d* and the battery-side channels 23*a*-23*d* each have a U shape when the battery pack 2 is viewed from above (i.e. in plan view of the battery pack 2). The bases or bottom surfaces of the respective battery-side channels 23*a*-23*d* are provided (extend) slightly downward of (parallel to) the forward-upper surface 14*b*1 of the outer case 12. That is, the forward-upper surface 14*b*1 and the battery-side channels 23*a*-23*d* each have a step shape.

The hook 24 is disposed on a front-upper portion of the upper-part case 14. The hook 24 is made of synthetic resin (polymer) and integrally comprises a manipulatable part (button) 24*a* and a projection (protruding part) 24*b*. The manipulatable part 24*a* is provided on a front surface 14*a* of the upper-part case 14. The hook 24 is held, such that it is moveable in the up-down direction, by the upper-part case 14. The hook 24 is biased in the upward direction by a compression spring (not shown) and moves downward when the manipulatable part 24*a* or the projection 24*b* is manually pressed downward. When the battery pack 2 has been mounted on the power tool 200 or the charger 300, the projection 24*b* engages with a housing (not shown) of the power tool 200 or with a housing 304 (refer to FIG. 25B) of the charger 300 and thereby fixes the battery pack 2 to the power tool 200 or the charger 300. When the battery pack 2 is to be removed from the power tool 200 or the charger 300, the user presses the manipulatable part 24*a* downward, and thereby the projection 24*b* moves downward. In this state, by sliding the battery pack 2 relative to the power tool 200 or the charger 300, the battery pack 2 can be removed from the power tool 200 or the charger 300. The manipulatable part 24*a* has a shape that is hollowed inward. Consequently, when the user hooks his or her finger in the manipulatable part 24*a* and presses the manipulatable part 24*a* downward, the manipulatable part 24*a* can be pressed downward without the finger slipping.

The vent 26 is provided rearward of the slide rails 20. The vent 26 is provided in a rear part of a rearward-upper surface 14*b*2 of the outer case 12. The rearward-upper surface 14*b*2 is located downward of the forward-upper surface 14*b*1 and upward of the base parts 20*a* of the slide rails 20. A battery-side channel (recessed part) 27 is provided partially rightward, partially leftward, and forward of the vent 26. The base or bottom of the battery-side channel 27 is provided (extends) slightly downward of (parallel to) the rearward-upper surface 14*b*2. That is, the rearward-upper surface 14*b*2 and the battery-side channel 27 together form a stepped shape. A charger-side ridge part (ridge) 306 (refer to FIG. 25B), which has a shape that matches (corresponds to, is complementary to) the battery-side channel 27, is provided on the charger 300. Consequently, when the battery pack 2 is to be mounted on the charger 300, the charger-side ridge part 306 is inserted into the battery-side channel 27.

Figure 4A:
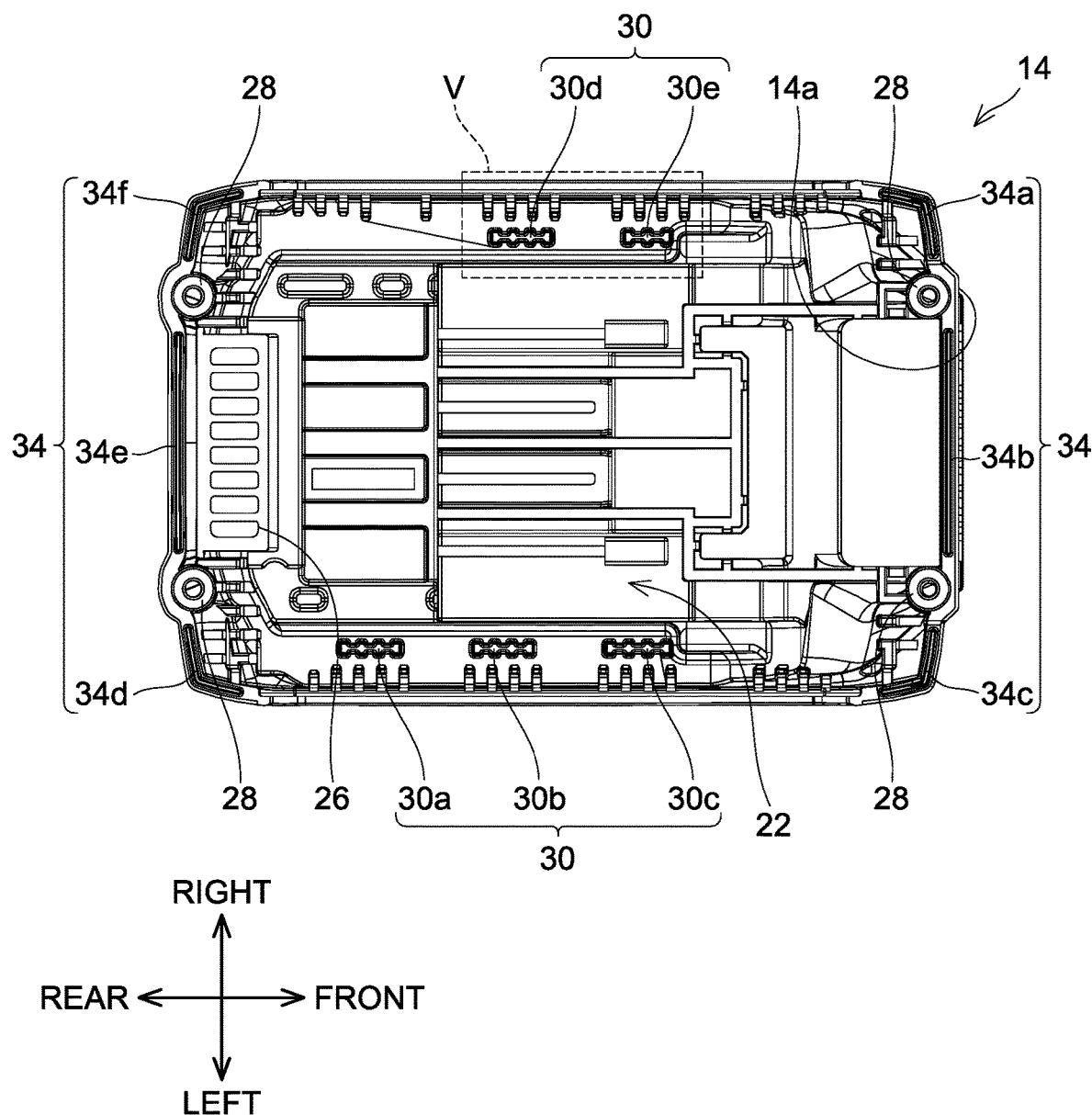
FIG. 4A is a bottom view, viewed from below, of an upper-part case 14 according to the first embodiment.
Figure 4B:
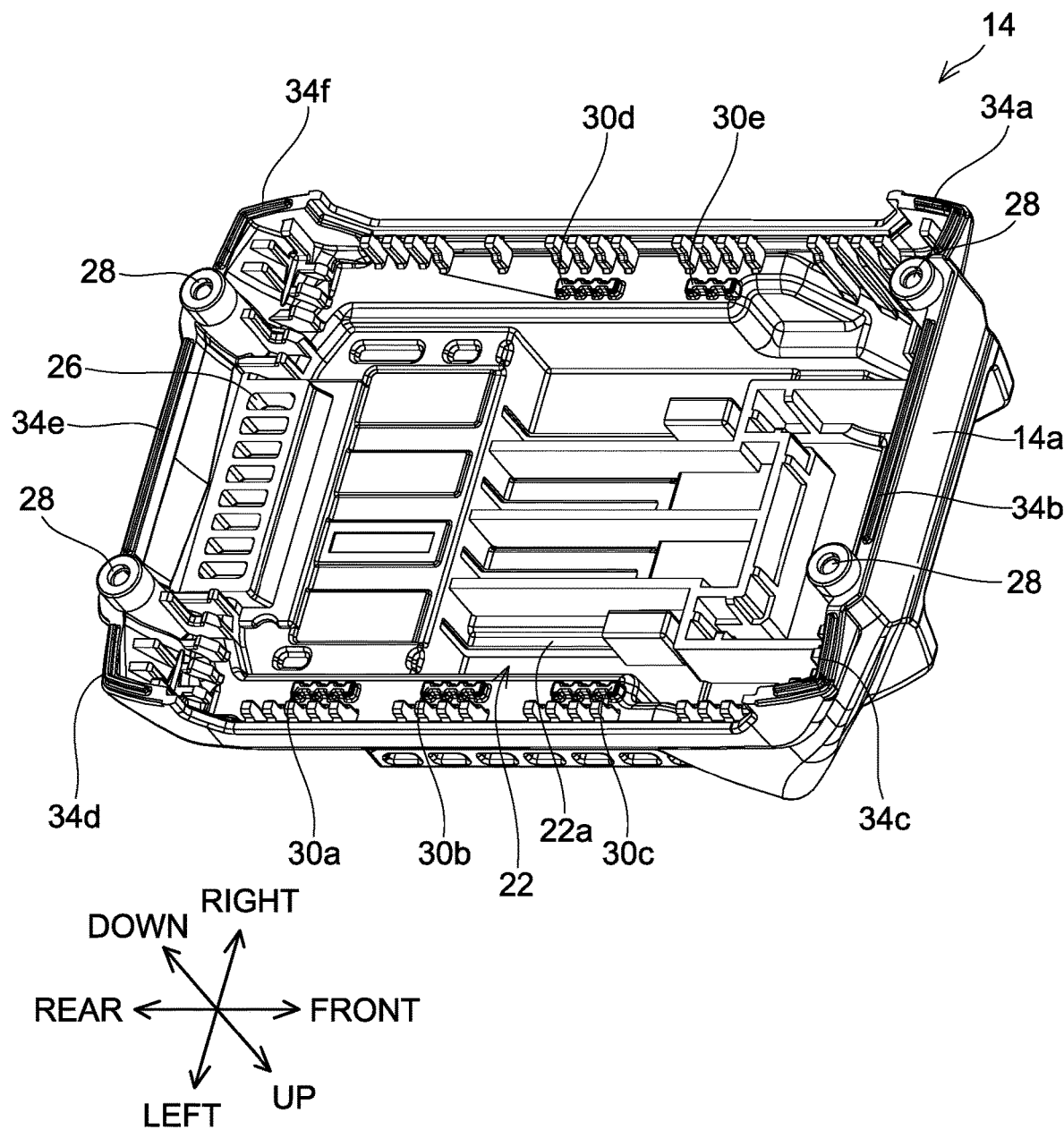
FIG. 4B is an oblique view, viewed from the front, the left, and below, of the upper-part case 14 according to the first embodiment.
Figure 4C:
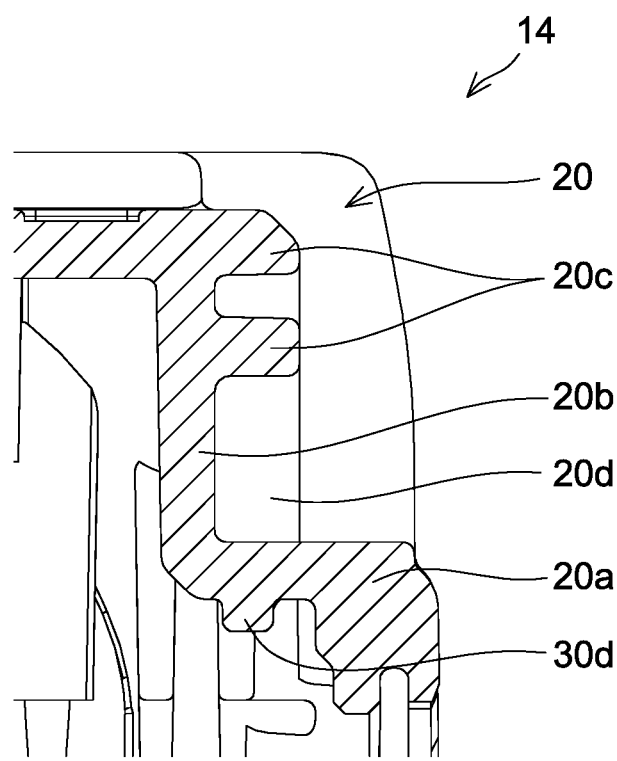
FIG. 4C is a cross-sectional view, viewed from the rear, of a slide rail 20 of the upper-part case 14 according to the first embodiment.
Figure 4C:
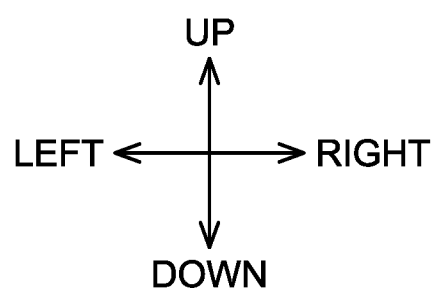
Figure 5:
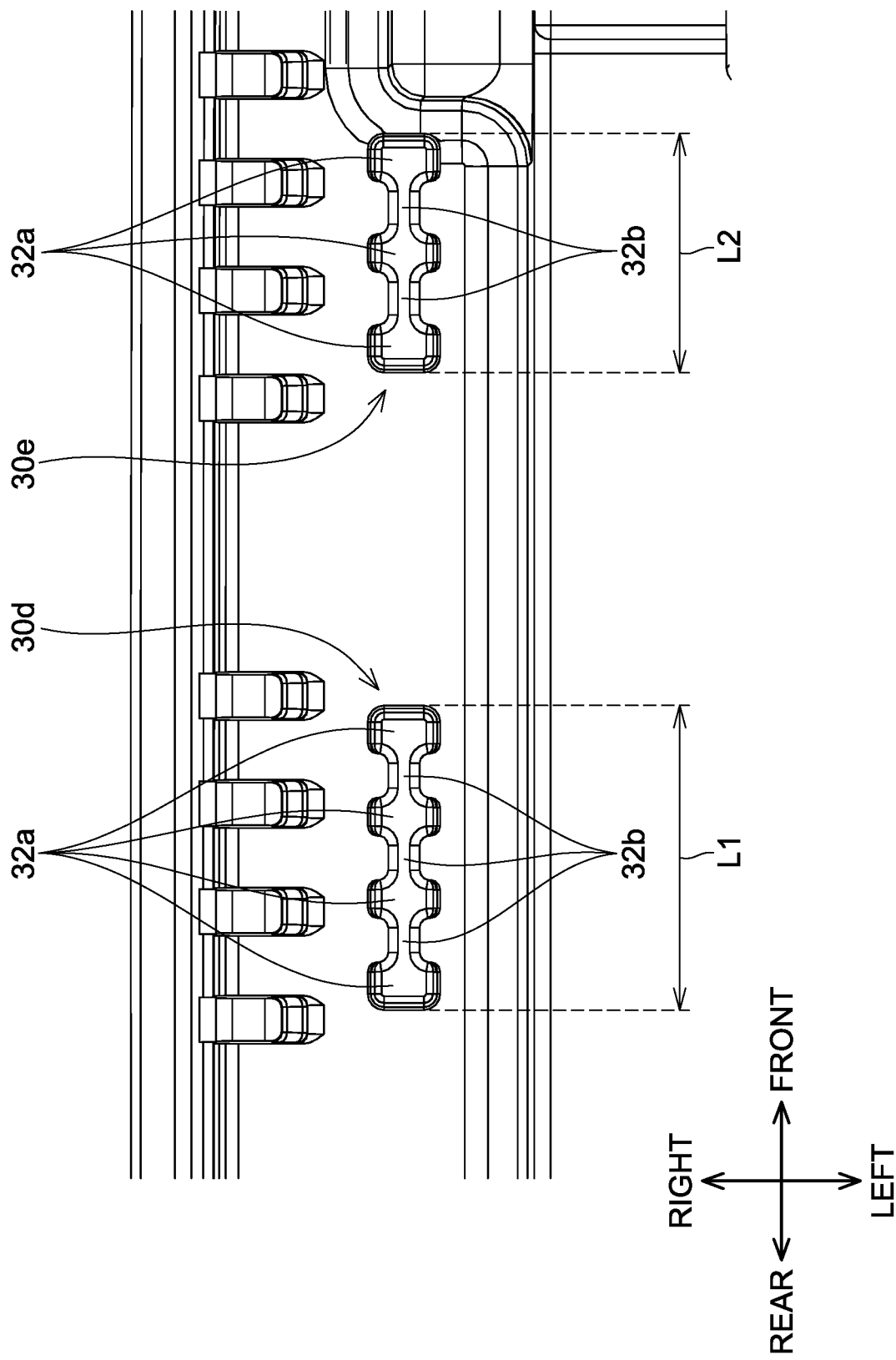
FIG. 5 is an enlarged view of the broken-line area V in FIG. 4A.

As shown in FIG. 4A, four screw holes 28 are provided in the upper-part case 14 and five first ridge parts (first ridges, first projections) 30, more specifically five first ridge parts 30*a*-30*e*, are provided on the upper-part case 14. The screws 18 (refer to FIG. 2) are respectively screwed into the four screw holes 28. As shown in FIG. 4B, the five first ridge parts 30*a*-30*e* protrude downward (i.e., toward the side of a cell case 80) from the lower surface of the upper-part case 14. FIG. 4C shows one of the first ridge parts (30*d*), which is provided downward of (extends integrally downward from) the slide rail 20 (in greater detail, downward of (from)

the base part 20*a*), i.e., inward of the upper-part case 14. The other first ridge parts 30, i.e. the other four first ridge parts 30*a*-30*c*, 30*e*, are likewise provided downward of the slide rails 20. As shown in FIG. 4A and in an enlarged view in FIG. 5, the first ridge parts 30 each comprise thick-wall parts 32*a* and thin-wall parts 32*b*. That is, the thickness (length, dimension) of each thick-wall part 32*a* in the left-right direction is greater than the thickness (length, dimension) of each thin-wall part 32*b* in the left-right direction. In each first ridge part 30, the thick-wall parts 32*a* and the thin-wall parts 32*b* are formed in an alternating manner in the front-rear direction. As shown in FIG. 4A, the first ridge parts 30*a*-30*d* each comprise four of the thick-wall parts 32*a* and three of the thin-wall parts 32*b*. The first ridge part 30*e* comprises three of the thick-wall parts 32*a* and two of the thin-wall parts 32*b*. As shown in FIG. 5, length L1 of the first ridge parts 30*a*-30*d* in the front-rear direction is longer than length L2 of the first ridge part 30*e* in the front-rear direction.

As shown in FIG. 4A, second ridge parts 34, more specifically six second ridge parts 34*a*-34*f*, for aligning the upper-part case 14 and the lower-part case 15 are provided on the upper-part case 14, as will be further explained below.

Configuration of Lower-Part Case 15

Figure 1B:
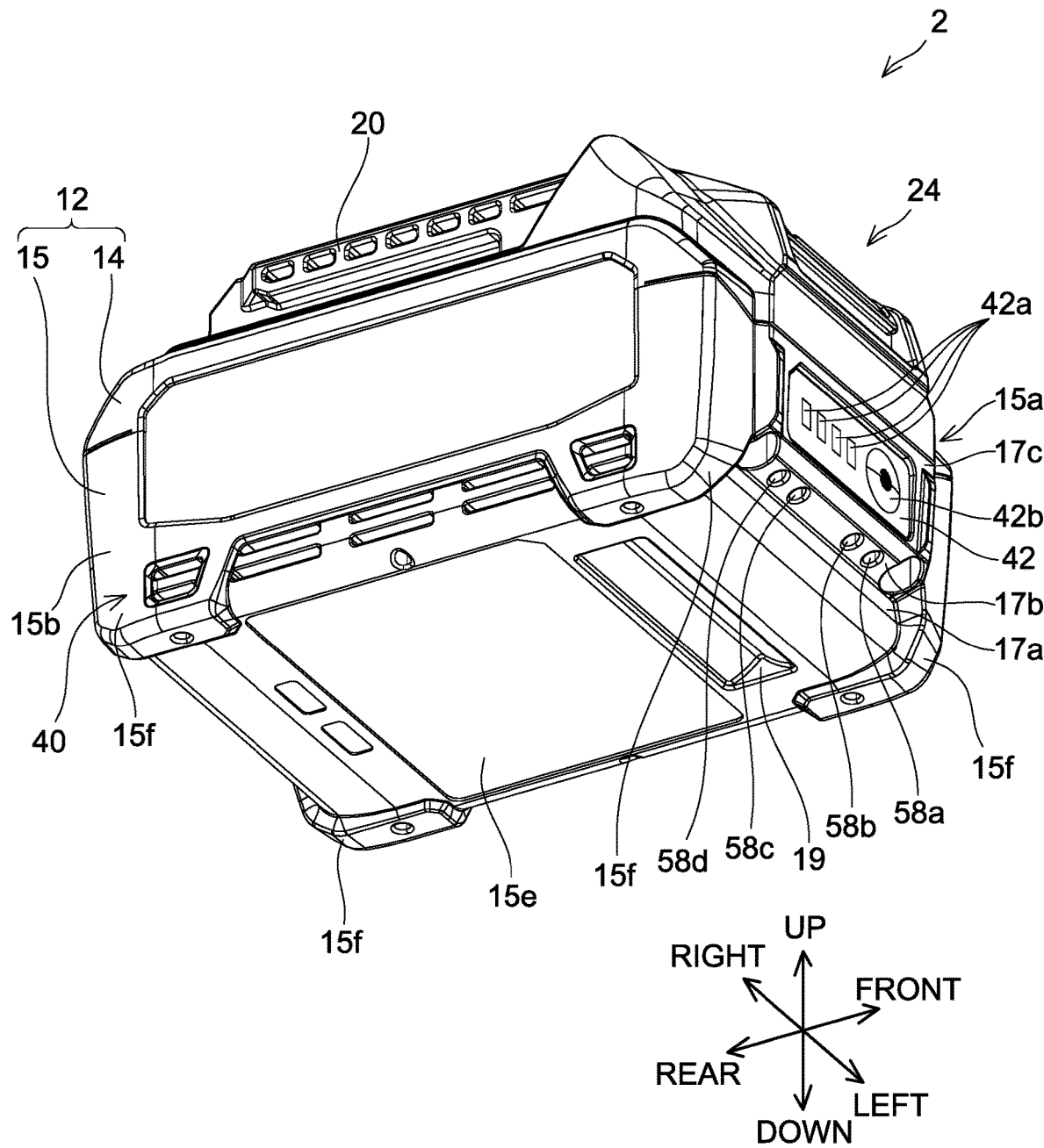
FIG. 1B is an oblique view, viewed from the front, the right, and below, of the battery pack 2 according to the first embodiment.
Figure 1C:
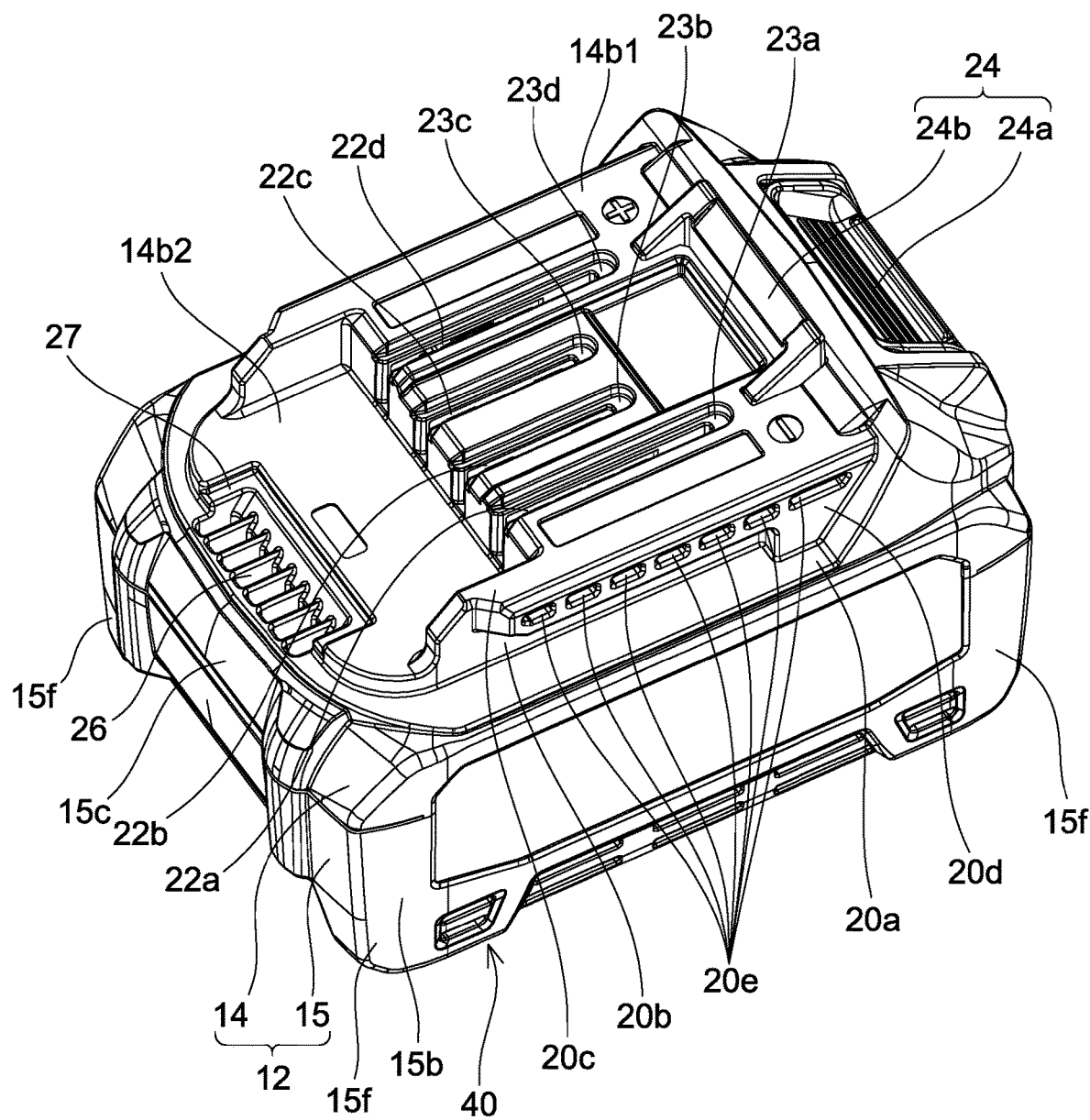
FIG. 1C is an oblique view, viewed from the rear, the right, and above, of the battery pack 2 according to the first embodiment.
Figure 1C:
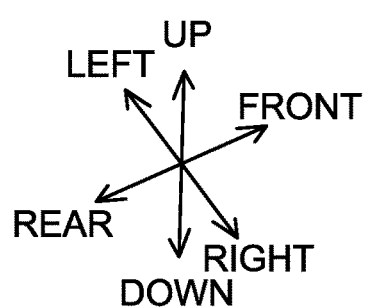
Figure 8:
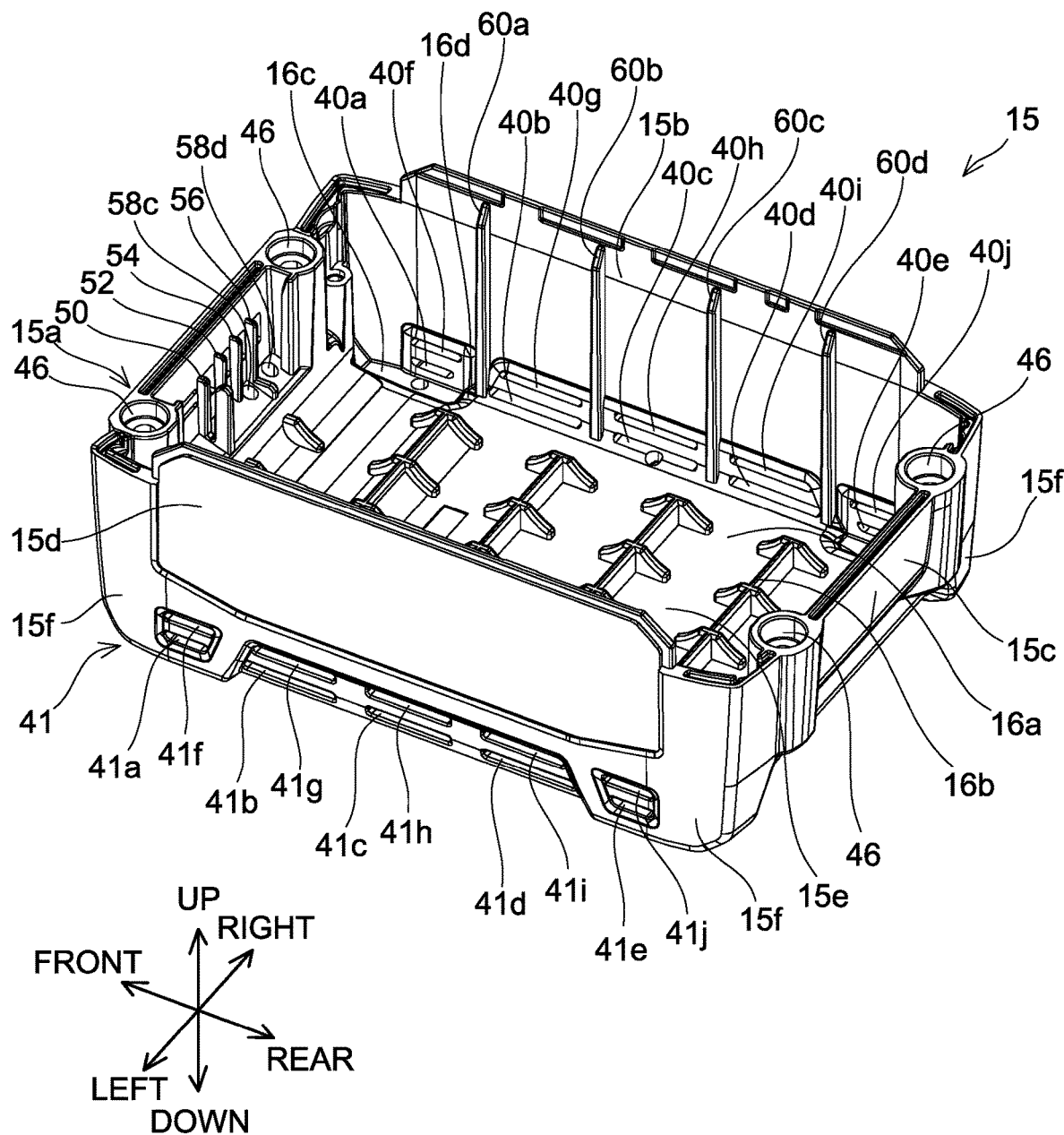
FIG. 8 is an oblique view, viewed from the left, the rear, and above, of the lower-part case 15 according to the first embodiment.
Figure 13A:
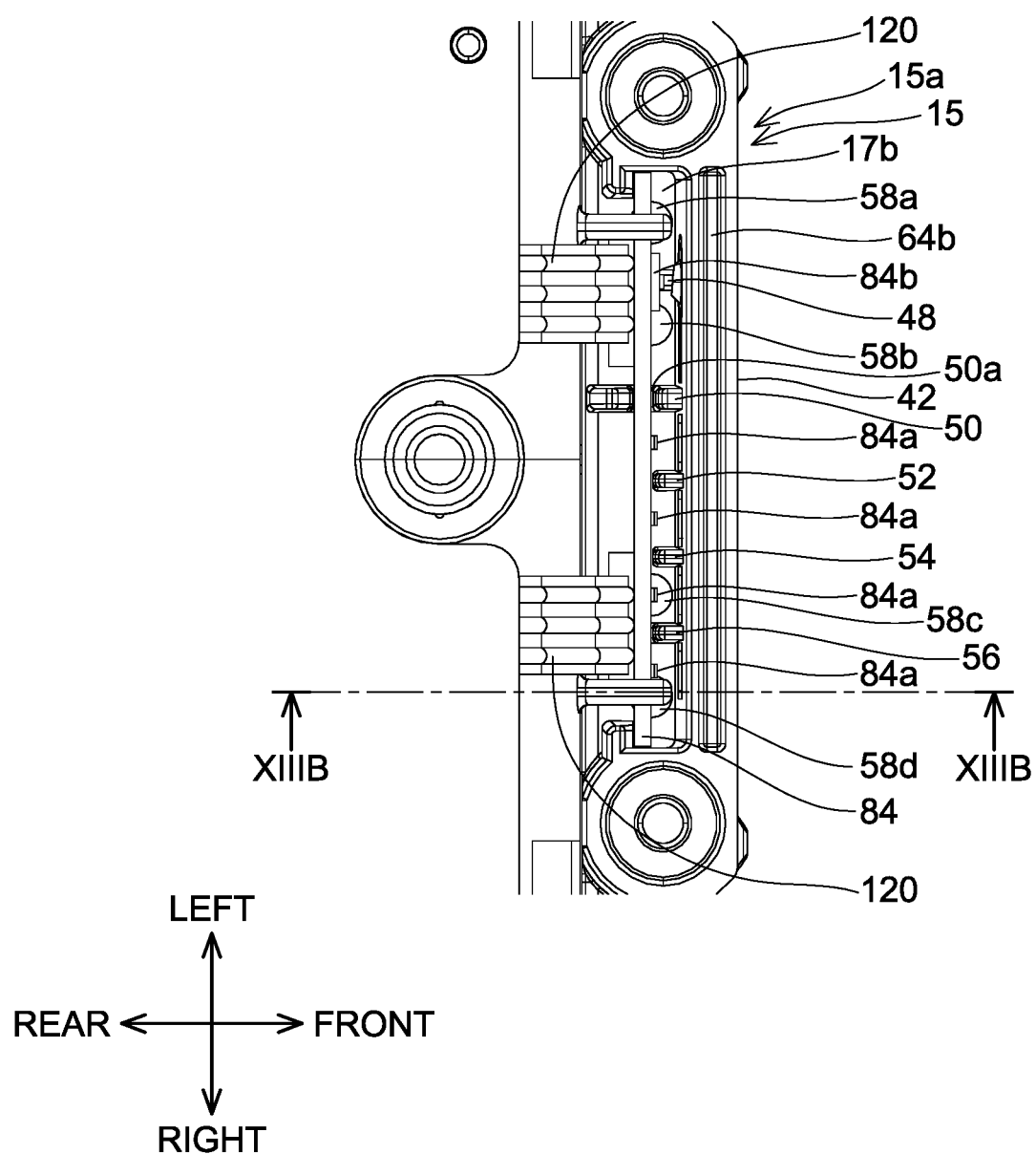
FIG. 13A is an enlarged view of the broken-line area XIII in FIG. 12A.
Figure 13B:
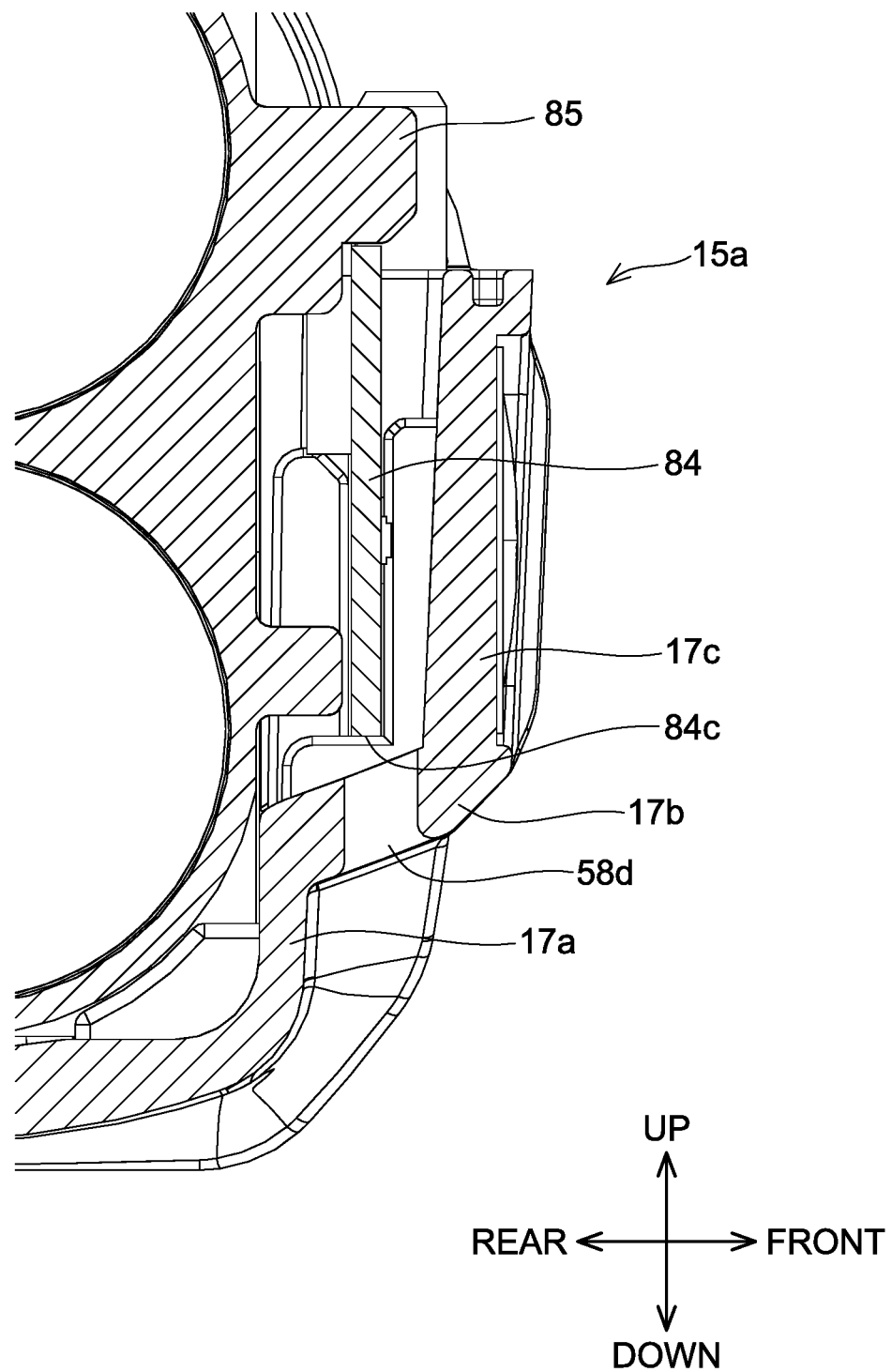
FIG. 13B is a cross-sectional view taken along line XIIIB-XIIIB in FIG. 13A.

As shown in FIG. 1B and FIG. 8, the lower-part case 15 has a front surface (front wall) 15*a*, a right-side surface (right-side wall) 15*b*, a rear surface (rear wall) 15*c*, a left-side surface (left-side wall) 15*d*, and a bottom wall (bottom plate) 15*e*. The front surface 15*a* has: a first upward-extending surface 17*a*, which extends perpendicularly to the lower surface of the bottom wall 15*e*; a tilted surface 17*b*, which is tilted (oblique) with respect to the bottom wall 15*e*; and a second upward-extending surface 17*c*, which extends perpendicularly to the lower surface of the bottom wall 15*e*. As shown in FIG. 13B, the tilted surface 17*b* is tilted such that it goes rearward as it goes downward. As shown in FIG. 1A, a vent 40 and a display part 42 are provided on (in) the lower-part case 15. The display part 42 is provided on the front surface 15*a* of the lower-part case 15. The display part 42 comprises remaining-battery-charge display parts (e.g., LEDs) 42*a*, which are configured (adapted) to indicate (notify) the remaining charge of the battery pack 2 to the user, and a button 42*b*, which is depressible to switch ON and OFF the illumination of the remaining-battery-charge display parts (e.g., LEDs) 42*a* to indicate the amount of remaining charge in four levels (e.g., one illuminated LED means 0-25% remaining charge, two illuminated LEDs means 25-50% remaining charge, three illuminated LEDs means 50-75% remaining charge and four illuminated LEDs means 75-100% remaining charge). In addition, as shown in FIG. 1B, vents (drainage holes) 58*a*-58*d* are provided in the tilted surface 17*b* of the lower-part case 15. In addition, a hook part 19 is provided on the lower surface of the bottom wall 15*e* of the lower-part case 15. The hook part 19 is used when removing the battery pack 2 from the power tool 200 or the charger 300. Specifically, the user pushes the manipulatable part 24*a* (refer to FIG. 1A) downward with his or her thumb while his or her index finger and/or middle finger is hooked in the hook part 19.

Figure 3:
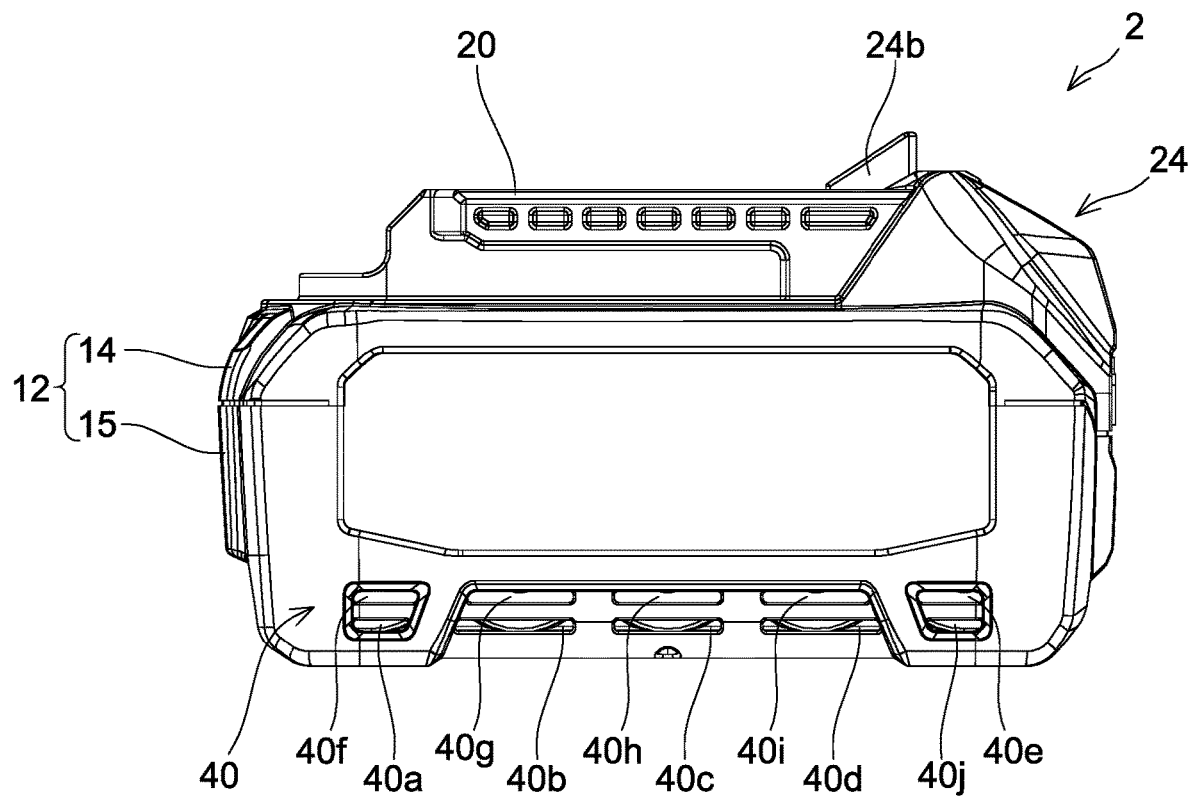
FIG. 3 is a right view, viewed from the right, of the battery pack 2 according to the first embodiment.

As shown in FIG. 3, the vent 40 is provided at a lower portion of the right-side surface 15*b* of the lower-part case 15. The vent 40 is configured with ten holes 40*a*-40*j*. The ten holes 40*a*-40*j* are disposed such that they are lined up (colinear) in two levels: an upper level and a lower level. Of the five holes 40*a*-40*e* provided in the lower level, the length of the hole 40*a*, which is provided on the rearmost side, and of the hole 40e, which is provided on the frontmost side, in the front-rear direction is shorter than the length of the (middle) holes 40b-40d in the front-rear direction. In addition, of the five holes 40f-40j provided in the upper level, the length of the hole 40f, which is provided on the rearmost side, and of the hole 40j, which is provided on the frontmost side, in the front-rear direction is shorter than the length of the (middle) holes 40g-40i in the front-rear direction. In addition, as shown in FIG. 8, a vent 41, which is configured in the same manner as the vent 40, is also provided at the lower portion of the left-side surface 15d of the lower-part case 15. The vent 41 is also configured with ten holes 41a-41j. It is noted that holes 40a, 40e need not be the same width, but it is preferably that the width(es) of holes 40a, 40e is (are) shorter than the width(es) of holes 40b-40d. The same applies the width(es) of the (outer) holes 40f, 40j and the width(es) of the (inner) holes 40g-40h. Similarly, the same applies to the widths of the ten holes 41a-41j.

Figure 6:
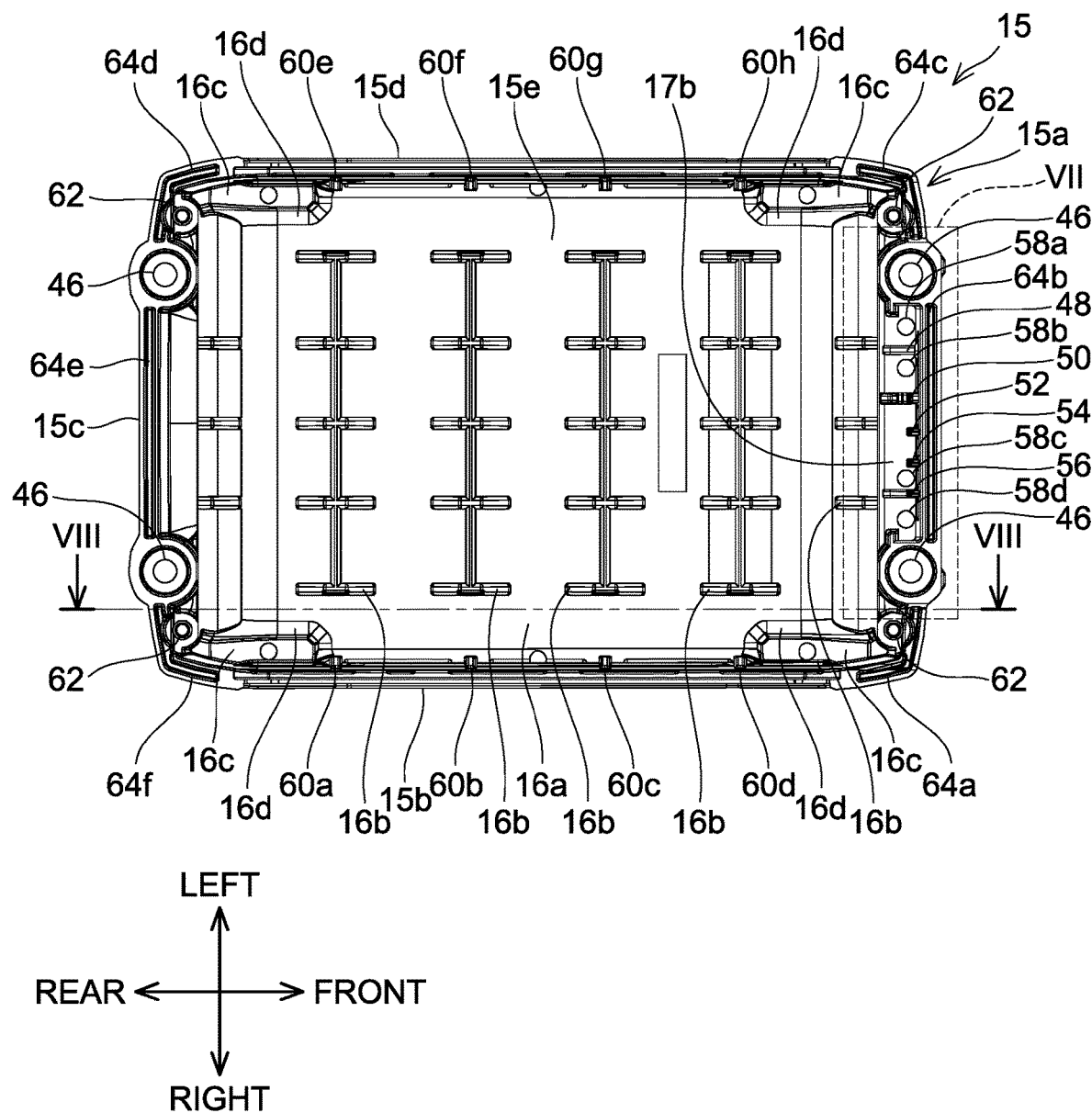
FIG. 6 is a top view, viewed from above, of a lower-part case 15 according to the first embodiment.
Figure 18:
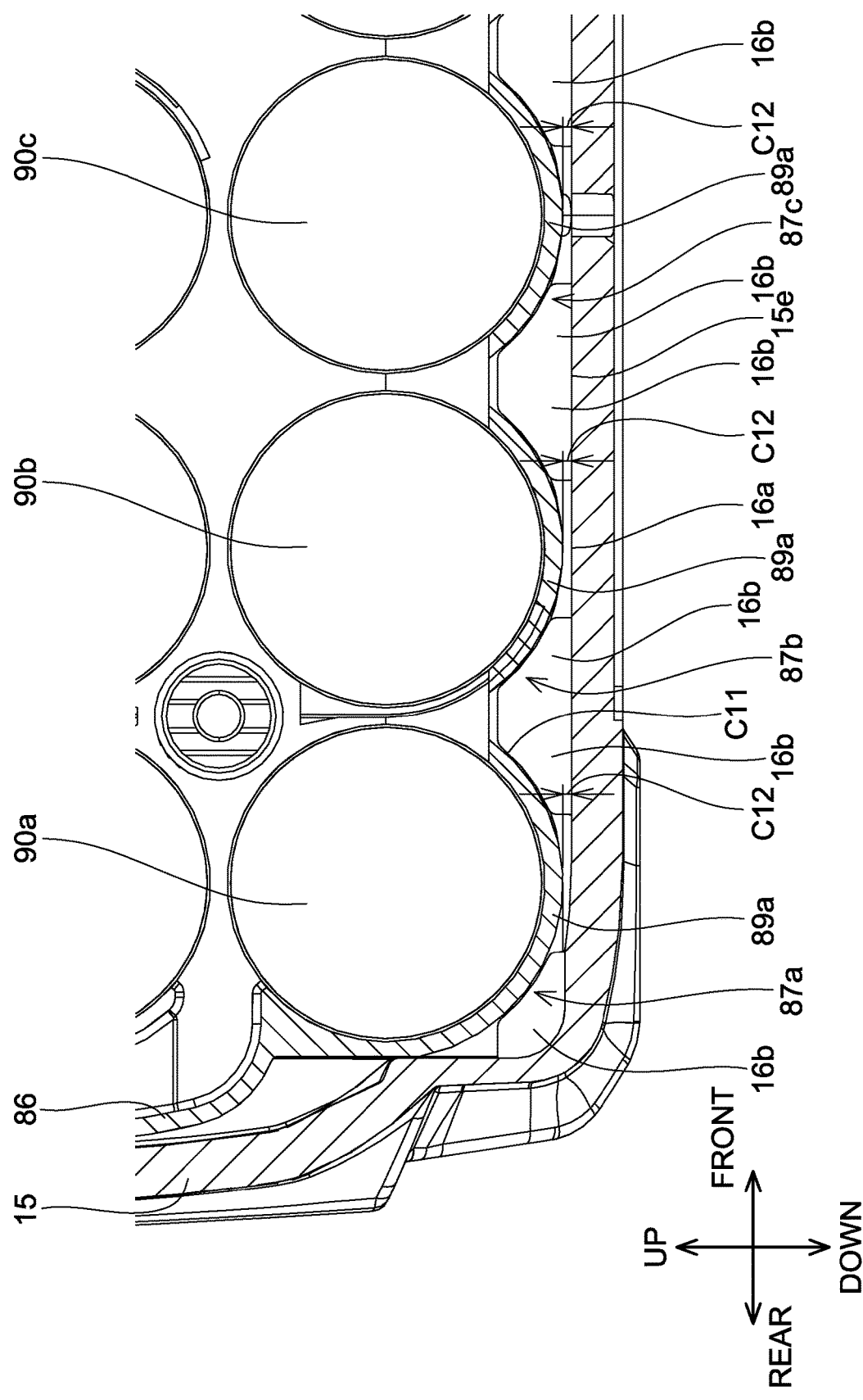
FIG. 18 is a cross-sectional view, viewed from the right, of the battery pack 2 according to the first embodiment.
Figure 19:
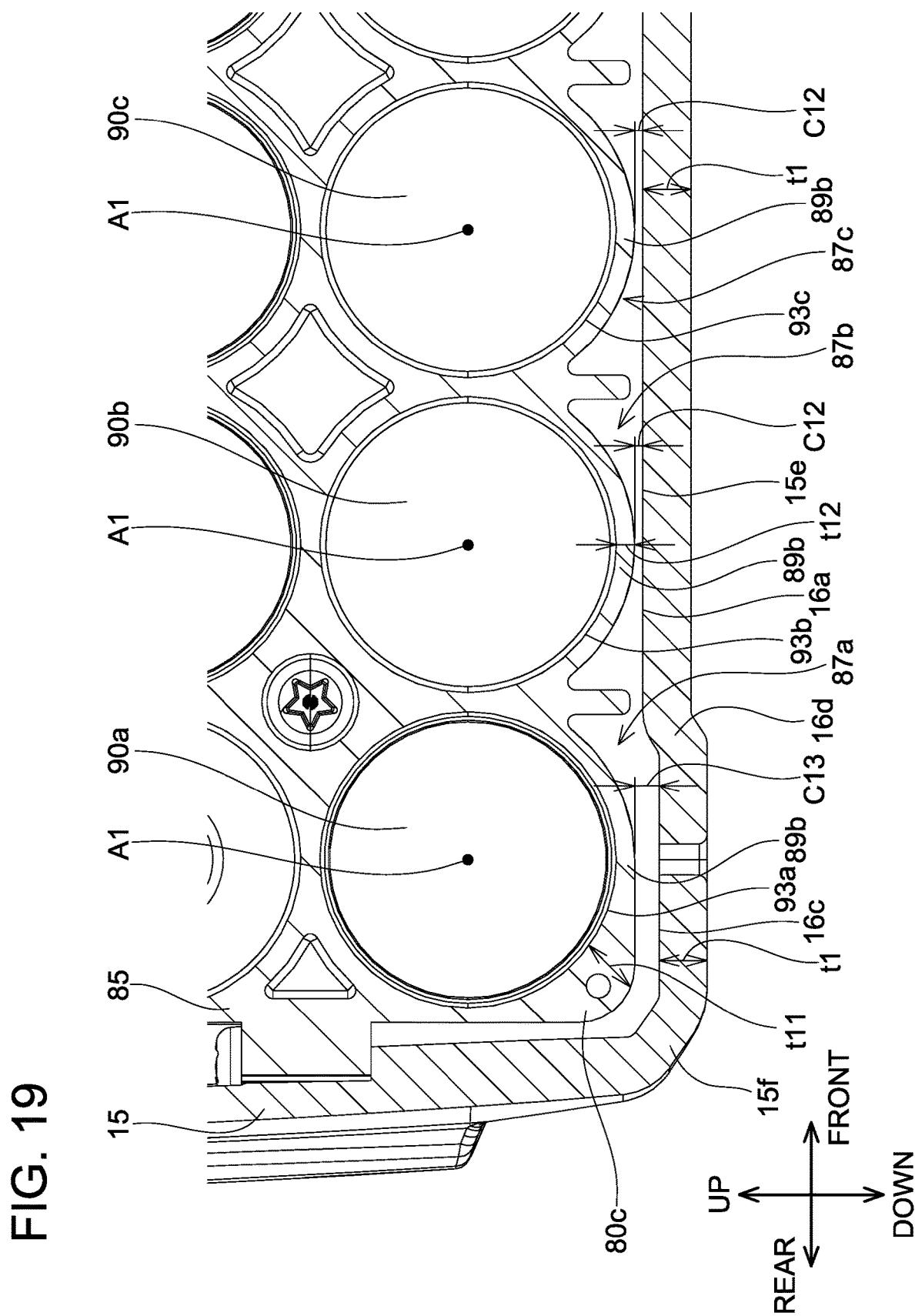
FIG. 19 is a cross-sectional view, viewed from the right, of the battery pack 2 according to the first embodiment.

In addition, as shown in FIG. 6, four screw holes 46, five front-part ribs 48, 50, 52, 54, 56, the four vents 58a-58d, eight side-part ribs (vertical ribs) 60a-60h, four screw holes 62, and six second recessed parts 64a-64f are provided on or in the lower-part case 15. The four screw holes 46 are provided at locations corresponding to the four screw holes 28 (refer to FIG. 4A) of the upper-part case 14. The four screw holes 62 are utilized to fix (secure) the lower-part case 15 and the battery module 10 to one another. The second recessed parts 64a-64f are provided at locations corresponding to the second ridge parts 34a-34f (refer to FIG. 4A), respectively, of the upper-part case 14. An upper surface of the bottom wall 15e of the lower-part case 15 comprises a flat part (planar portion) 16a, projections (protruding parts) 16b, depressions (recessed parts) 16c, and step parts (steps) 16d. The projections 16b protrude (project) upward from the flat part 16a. As shown in FIG. 18, the projections 16b each have a shape that conforms to a lower surface of the cell case 80, which is described below. As shown in FIG. 6, the depressions 16c are provided on (in, at) corner parts 15f at the four corners of the bottom wall 15e of the lower-part case 15. As shown in FIG. 19, each of the step parts 16d connects the flat part 16a and its corresponding depressions 16c. The step parts 16d descend downward as they go from inward to outward of the lower-part case 15. As also shown in FIG. 19, thickness t1 of the lower-part case 15 at the flat part 16a and thickness t1 of the lower-part case 15 at the depressions 16c are the same. Thus, corresponding step portions are formed at the four corners of the lower surface of the bottom wall 15e such that, when placed on a surface, the battery pack 2 contacts the surface only at the four corners 15f. This design helps to ensure that, if the battery pack 2 is placed on a surface having a water puddle thereon, it is less likely that water will enter into the vents 40, 41.

Figure 7:
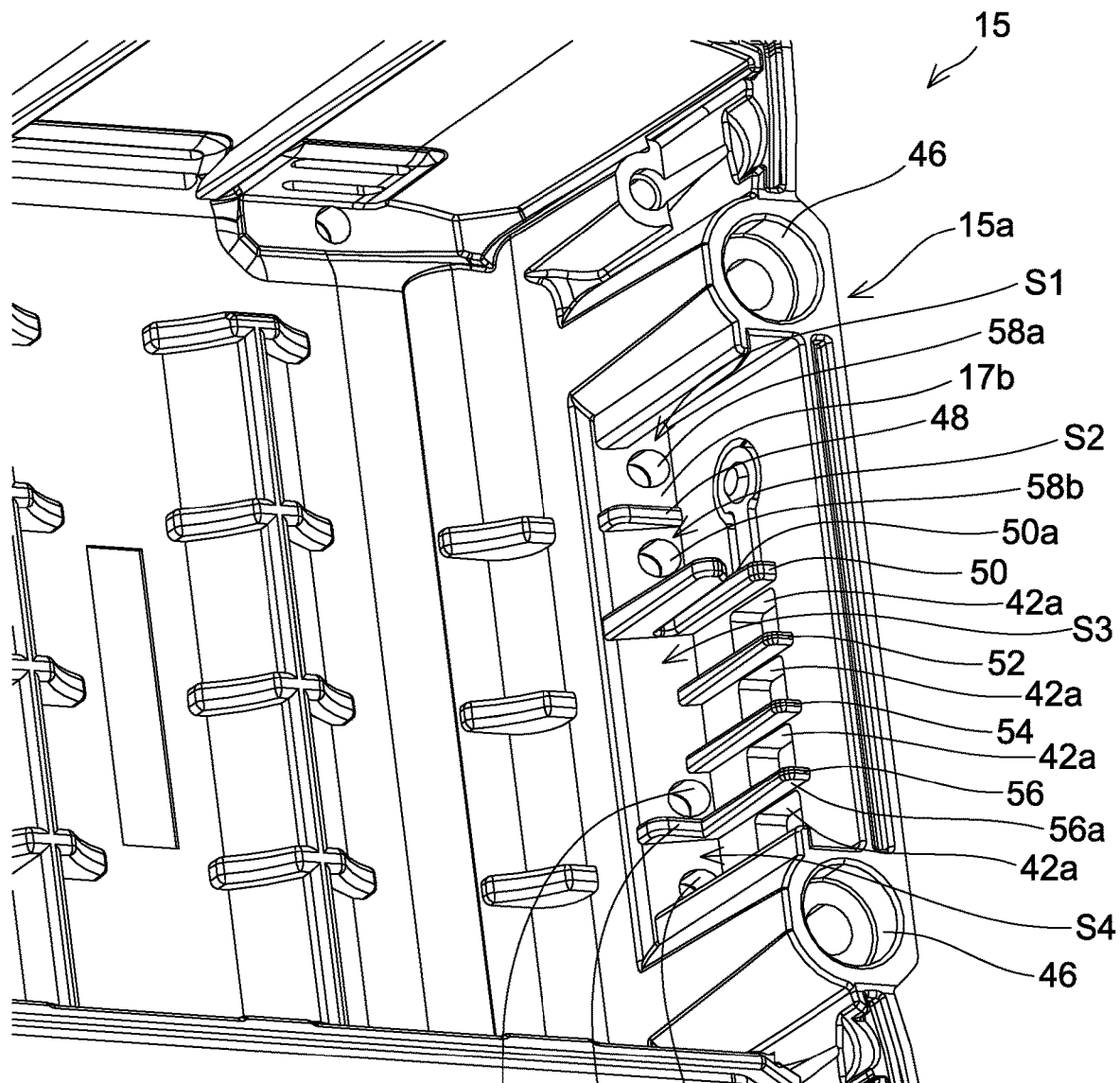
FIG. 7 is an enlarged, oblique view, viewed from the rear, the right, and above, of the broken-line area VII in FIG. 6.

As shown in FIG. 7, the front-part ribs 48, 50, 52, 54, 56 are provided on the tilted surface 17b. The front-part ribs 48, 50, 52, 54, 56 extend upward from the tilted surface 17b and rearward from the front surface 15a of the lower-part case 15. A rear end of the front-part rib 48 coincides substantially with a rear end of the tilted surface 17b, and an upper end of the front-part rib 48 coincides substantially with an uppermost end of the tilted surface 17b. The upper surface of the front-part rib 48 is a flat surface. The rear end of the front-part rib 50 substantially coincides with a rear end of the tilted surface 17b, and an upper end of the front-part rib 50 is located upward of an upper end of the remaining-battery-charge display parts 42a. In addition, a groove part (groove) 50a is provided on (in) the front-part rib 50. An LED board 84 (refer to FIG. 13A), which is described below, passes through the interior of the groove part 50a. Rear ends of the front-part ribs 52, 54 are located forward of a rear end of the tilted surface 17b. In addition, upper ends of the front-part ribs 52, 54 are located upward of upper ends of the remaining-battery-charge display parts 42a. The front-part rib 56 comprises a light-shielding wall part 56a and a flat part 56b. The structure of the light-shielding wall part 56a is the same as the front-part ribs 52, 54. The structure of the flat part 56b is the same as the front-part rib 48.

The front-part ribs 48, 50, 56 sectionalize (compartmentalize) the space upward of the tilted surface 17b into four spaces S1-S4. Specifically, the first space S1 is demarcated by the front-part rib 48, the second space S2 is demarcated by the front-part ribs 48, 50, the third space S3 is demarcated by the front-part ribs 50, 56, and the fourth space S4 is demarcated by the front-part rib 56. The vents 58a-58d are provided in the spaces S1-S4, respectively. The vents 58a-58d pass through the lower-part case 15 in the up-down direction. Consequently, if any water enters the interior of the outer case 12, such water can flow into the spaces S1-S4 and be discharged via the vents 58a-58d.

As shown in FIG. 6, the side-part ribs 60a-60d extend leftward from the right-side surface 15b of the lower-part case 15. In addition, as shown in FIG. 8, the lower ends of the side-part ribs 60a-60d extend upward from the upper surface of the bottom wall 15e of the lower-part case 15. The upper ends of the side-part ribs 60a-60d are located slightly downward of the upper end of the lower-part case 15. The side-part ribs 60a-60d are provided between respective holes 40a-40j of the vent 40 that are adjacent in the front-rear direction. Specifically, the (first) side-part rib 60a is provided between the holes 40a, 40f and the holes 40b, 40g, the (second) side-part rib 60b is provided between the holes 40b, 40g and the holes 40c, 40h, the (third) side-part rib 60c is provided between the holes 40c, 40h and the holes 40d, 40i, and the (fourth) side-part rib 60d is provided between the holes 40d, 40i and the holes 40e, 40j. The structures of side-part ribs 60e-60h are the same as the side-part ribs 60a-60d, with the exception that they extend rightward from the left-side surface 15d of the lower-part case 15. The side-part ribs 60a-60h define vertically isolated channels that reduce the likelihood of a short circuit between battery cells 90a-90j in the event that water were to penetrate into the interior of the battery pack 2 via the holes 40a-40j. The side-part ribs 60a-60h also position the battery module 10 in the left-right direction of the battery pack 2 so that vertical air channels for heat dissipation are defined between the left and right interior walls of the outer case 12 and the corresponding left and right sides of the battery module 10, as will be further described below.

Configuration of Battery Module 10

Figure 9A:
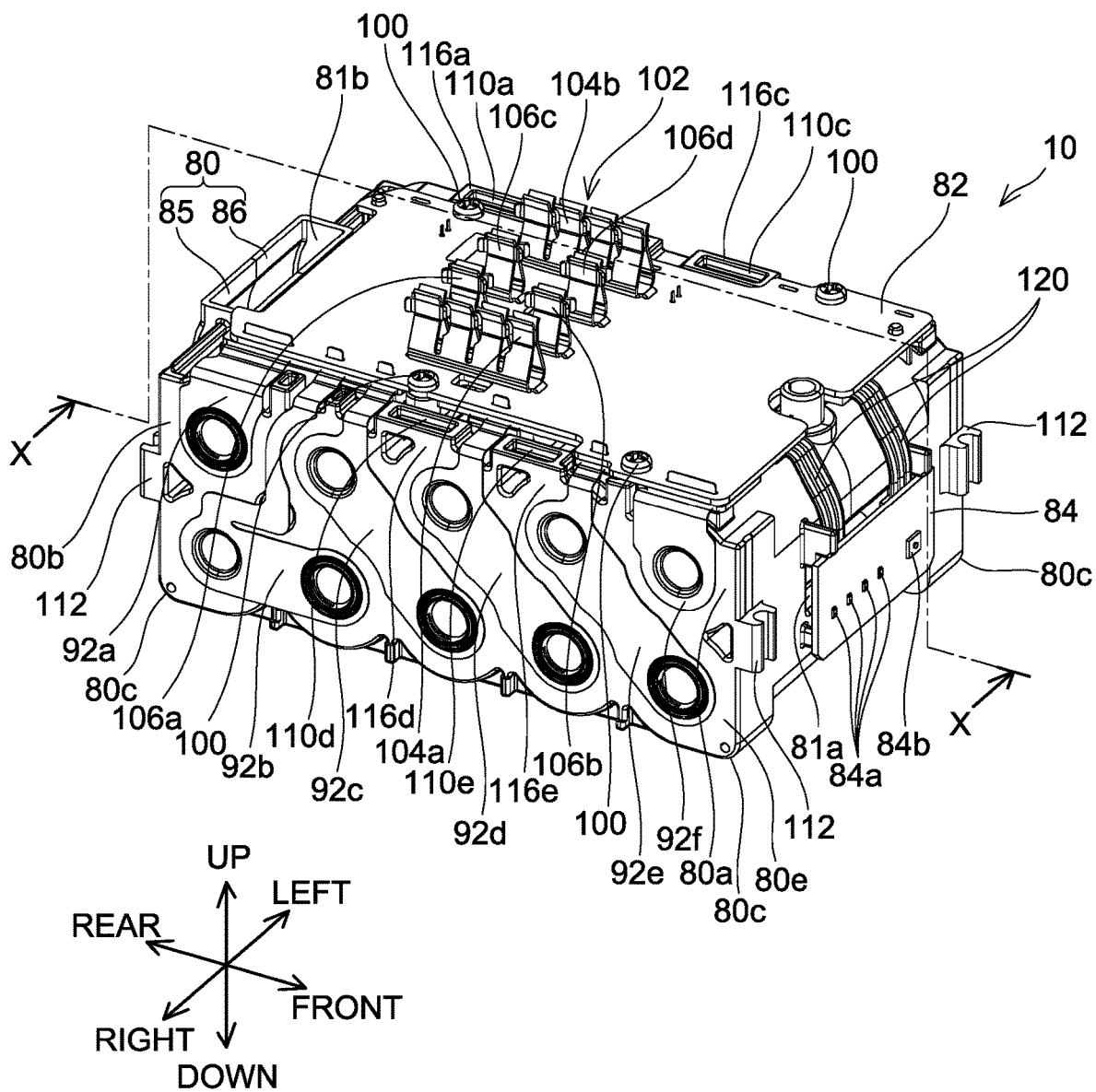
FIG. 9A is an oblique view, viewed from the front, the right, and above, of a battery module 10 according to the first embodiment.
Figure 9B:
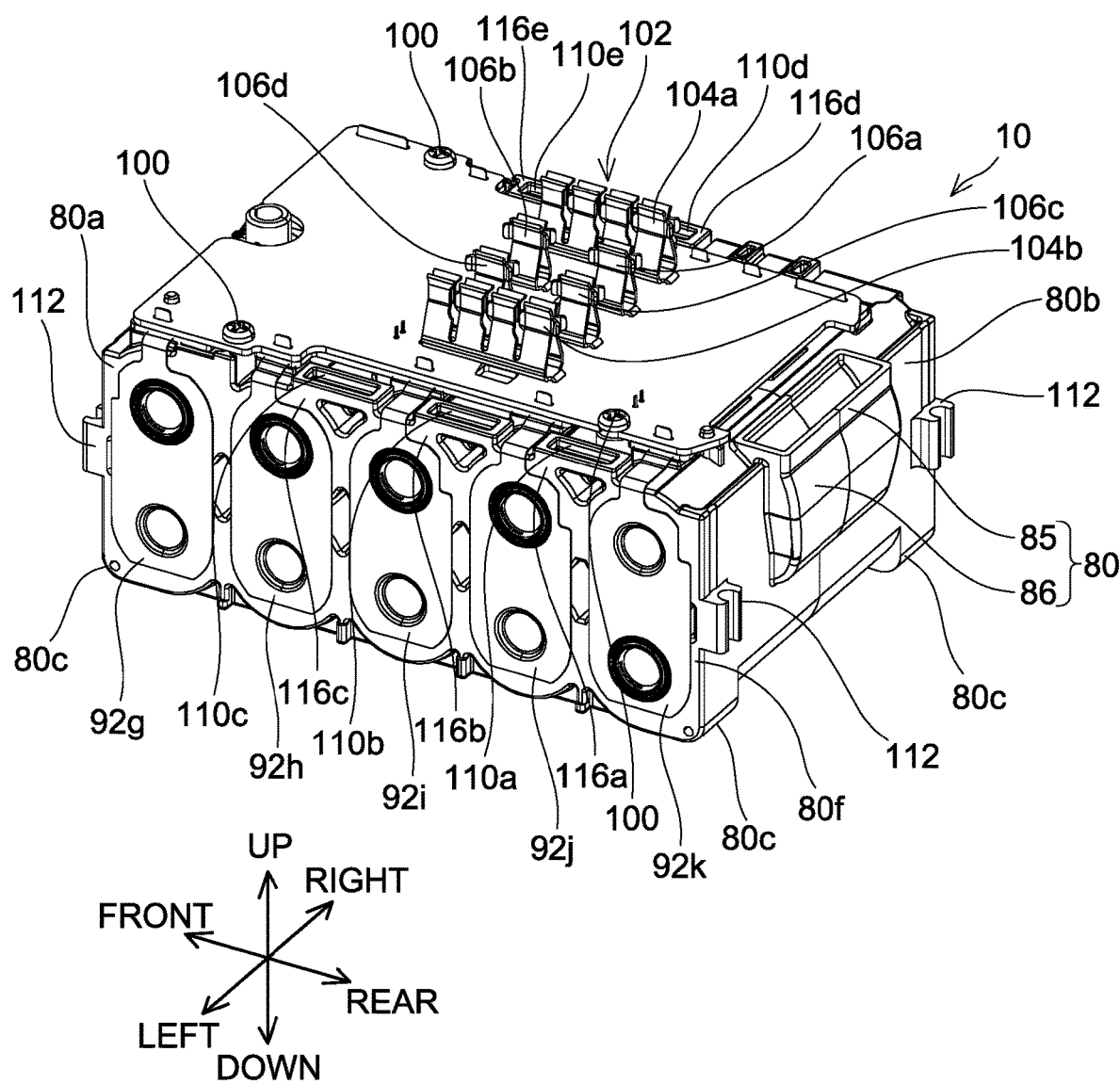
FIG. 9B is an oblique view, viewed from the rear, the left, and above, of the battery module 10 according to the first embodiment.

As shown in FIG. 9A, the battery module 10 comprises the cell case (battery cell case) 80, a control board (circuit board) 82, and the LED board 84. The cell case 80 is made of a rigid, electrically-insulating material, e.g., a synthetic resin (polymer) material such as polyamide. As shown in FIG. 11A, the cell case 80 is divided into a right cell case (right cell case half) 85 and a left cell case (left cell case half) 86. A (first) vent 81a is provided in a front part 80a of the cell case 80, and a (second) vent 81b is provided in a rear part 80b of the cell case 80. As shown in FIG. 11B, thick-wall parts 80c are respectively provided at corner portions at the four corners of a lower portion of the cell case 80. As shown in FIG. 19, thickness t11 of each of the thick-walls part 80c is greater than thickness t12 of the respective cell-holding parts 87, which are described below. As shown in FIGS. 11A and 11B, an upper portion (that includes an upper surface 80d) of the cell case 80 has a shape that matches (corresponds to, is complementary with, fits with) side surfaces of battery cells 90f-90j (refer to FIGS. 10 and 16), which are described below, in the longitudinal direction. Hollow parts (depressions) 80g are provided on (in) the upper surface 80d of the cell case 80 between adjacent battery cells 90f-90j. Four screw bosses 83 are provided on the upper surface 80d of the cell case 80 and are used to connect the control board 82 and the cell case 80 to one another. As shown, e.g., in FIG. 9B, protruding parts (protrusions) 116a-116c protrude upward from the upper surface 80d of an upper portion of a left-side surface 80f of the cell case 80. As shown in FIG. 11C, the protruding parts 116a-116c are disposed such that they each span (partially overlap, bridge) two adjacent battery cells 90f-90i of the upper level of the battery cells 90a-90j. First recessed parts (recesses, blind holes) 110a-110c are respectively provided on (in) the protruding parts 116a-116c. The first recessed parts 110a-110c are provided at locations corresponding to the first ridge parts 30a-30c (refer to FIG. 4A), respectively, of the upper-part case 14. As shown in FIG. 9A, protruding parts 116d, 116e protrude upward from the upper surface 80d of an upper portion of a right-side surface 80e of the cell case 80. As shown in FIG. 11C, the protruding parts 116d, 116e are disposed such that they span two adjacent battery cells 90g-90i. First recessed parts 110d, 110e are provided on (in) the protruding parts 116d, 116e. The first recessed parts 110d, 110e are provided at locations corresponding to the first ridge parts 30d, 30e (refer to FIG. 4A), respectively, of the upper-part case 14. As shown in FIGS. 9B and 11C, the protruding parts 116a-116e and the first recessed parts 110a-110e are each provided outward of the control board 82 in the left-right direction when the battery module 10 is viewed from above (i.e. in plan view). In other words, in the left-right direction of the battery pack 2, the control board 82 is entirely disposed between the protruding parts 116a-116c on the left side and the protruding parts 116d-116e on the right side. The first recessed parts 110a-110e are respectively provided between two adjacent lead plates 92. More specifically, as shown in FIG. 9A, the protruding part 116d and the first recessed part 110d are provided between lead plates 92c, 92d, and the protruding part 116e and the first recessed part 110e are provided between lead plates 92d, 92e. In addition, as shown in FIG. 9B, the protruding part 116a and the first recessed part 110a are provided between lead plates 92j, 92k, the protruding part 116b and the first recessed part 110b are provided between lead plates 92i, 92j, and the protruding part 116c and the first recessed part 110c are provided between lead plates 92h, 92i.

As shown in FIG. 11B, the cell-holding parts 87 include ten cell-holding parts 87a-87j that are provided on the right cell case 85. The ten cell-holding parts 87a-87j are disposed such that they are lined up in two levels: an upper level and a lower level. As shown in FIG. 18, which is a cross-sectional view of the battery pack 2 at its center position in the left-right direction, the cell-holding parts 87a-87c have center holding parts 89a, which hold the lower level of the battery cells 90a-90e at their centers and are described below. In addition, as shown in FIG. 19, which is a cross-sectional view of the battery pack 2 at the location at which the right-side, rearward depression 16c of the lower-part case 15 is provided, the cell-holding parts 87a-87c have end-surface-side holding parts 89b, which hold the right-end-surface sides of the battery cells 90a-90e in the longitudinal direction. Although not shown, the cell-holding parts 87d, 87e also have center holding parts and end-surface-side holding parts. As shown in FIG. 11B, coupling parts 88, which are for coupling the right cell case 85 and the left cell case 86, are provided between the cell-holding parts 87a, 87b, 87f, 87g and between the cell-holding parts 87d, 87e, 87i, 87j. It is noted that, although not shown, ten cell-holding parts, which correspond to the ten cell-holding parts 87a-87j of the right cell case 85, and two coupling parts, which correspond to the two coupling parts 88 of the right cell case 85, are also provided on the left cell case 86.

Figure 10:
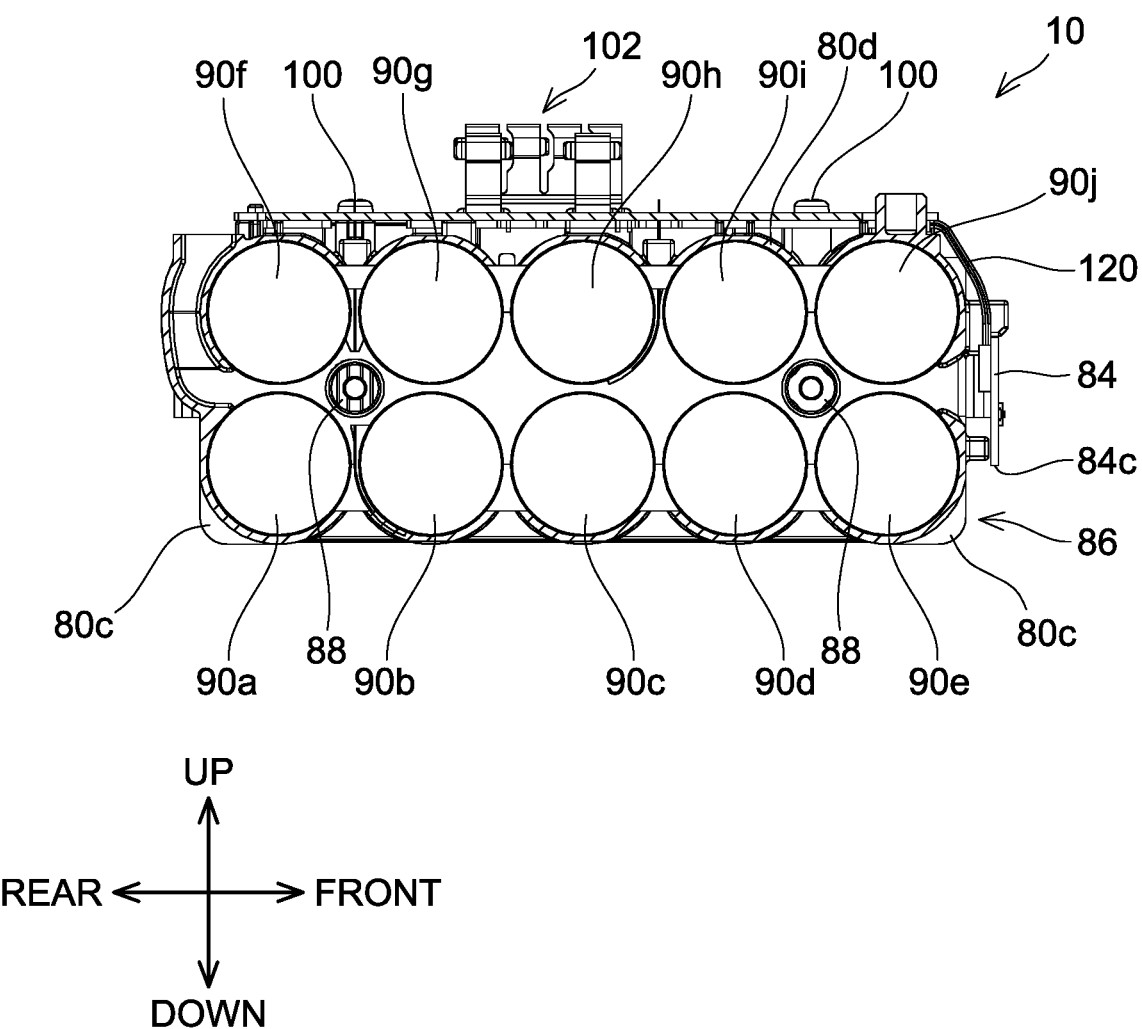
FIG. 10 is a cross-sectional view taken along line X-X in FIG. 9A.
Figure 11A:
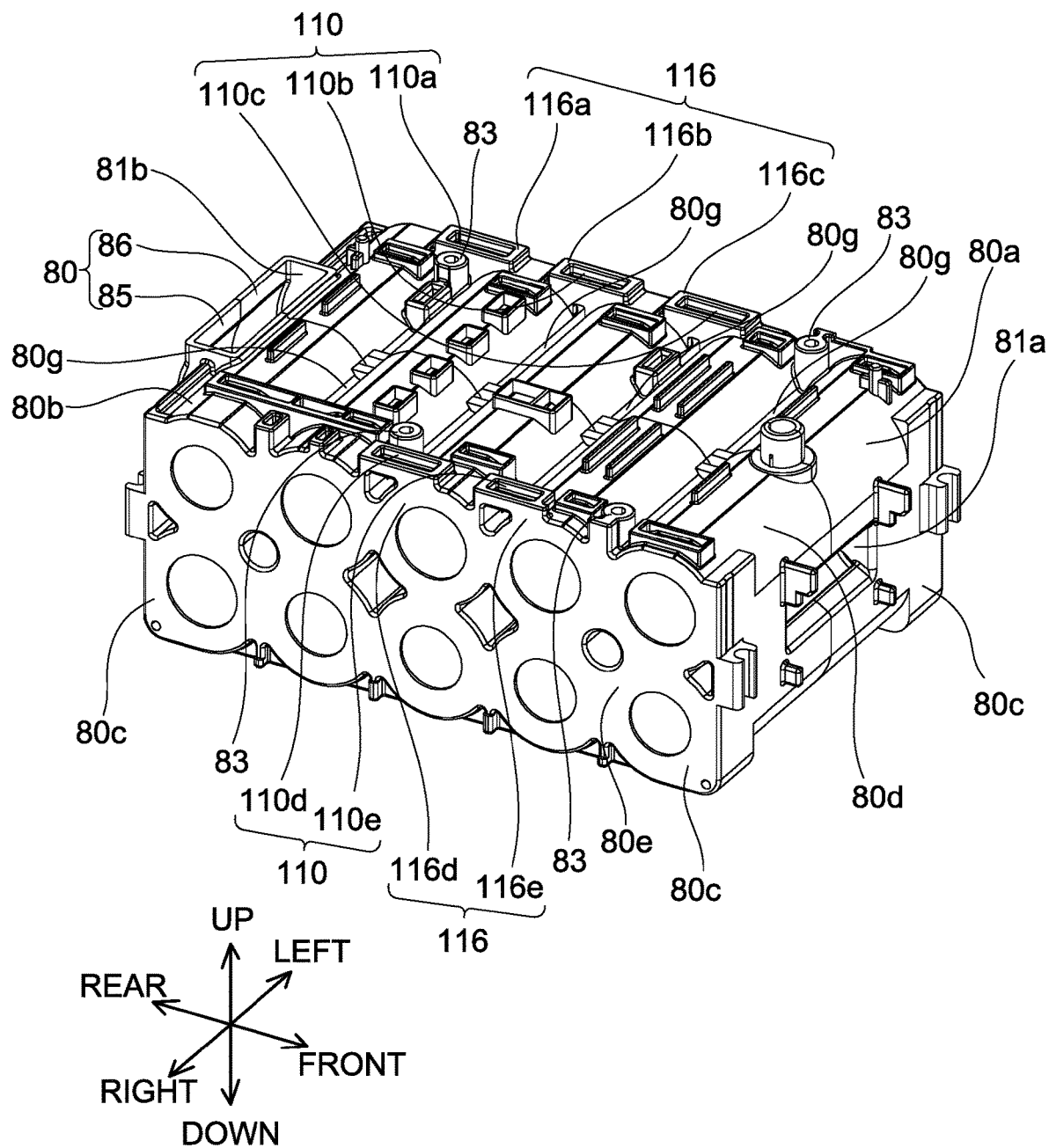
FIG. 11A is an oblique view, viewed from the front, the right, and above, of a cell case 80 according to the first embodiment.
Figure 11B:
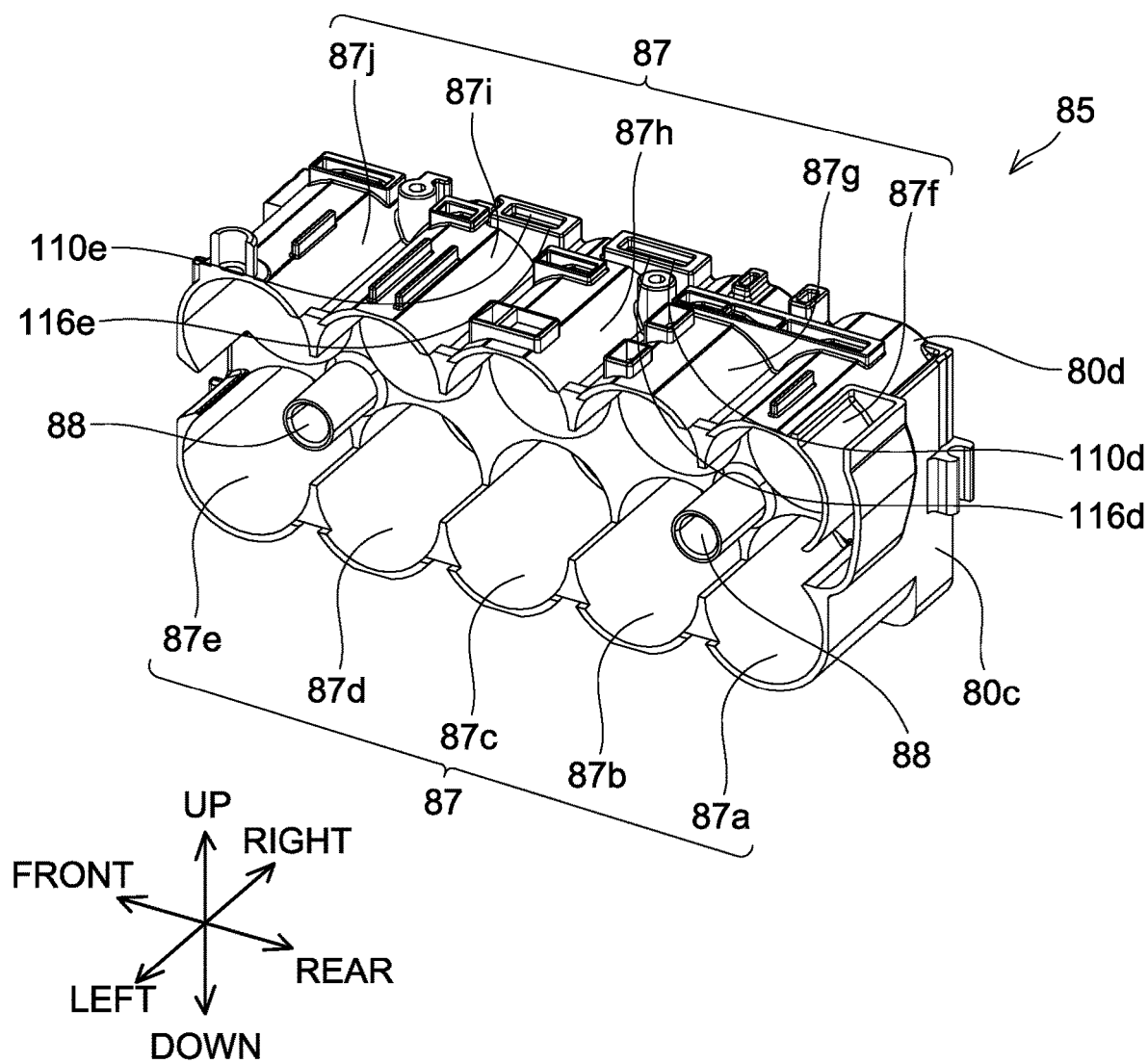
FIG. 11B is an oblique view, viewed from the rear, the left, and above, of a right cell case 85 according to the first embodiment.
Figure 11C:
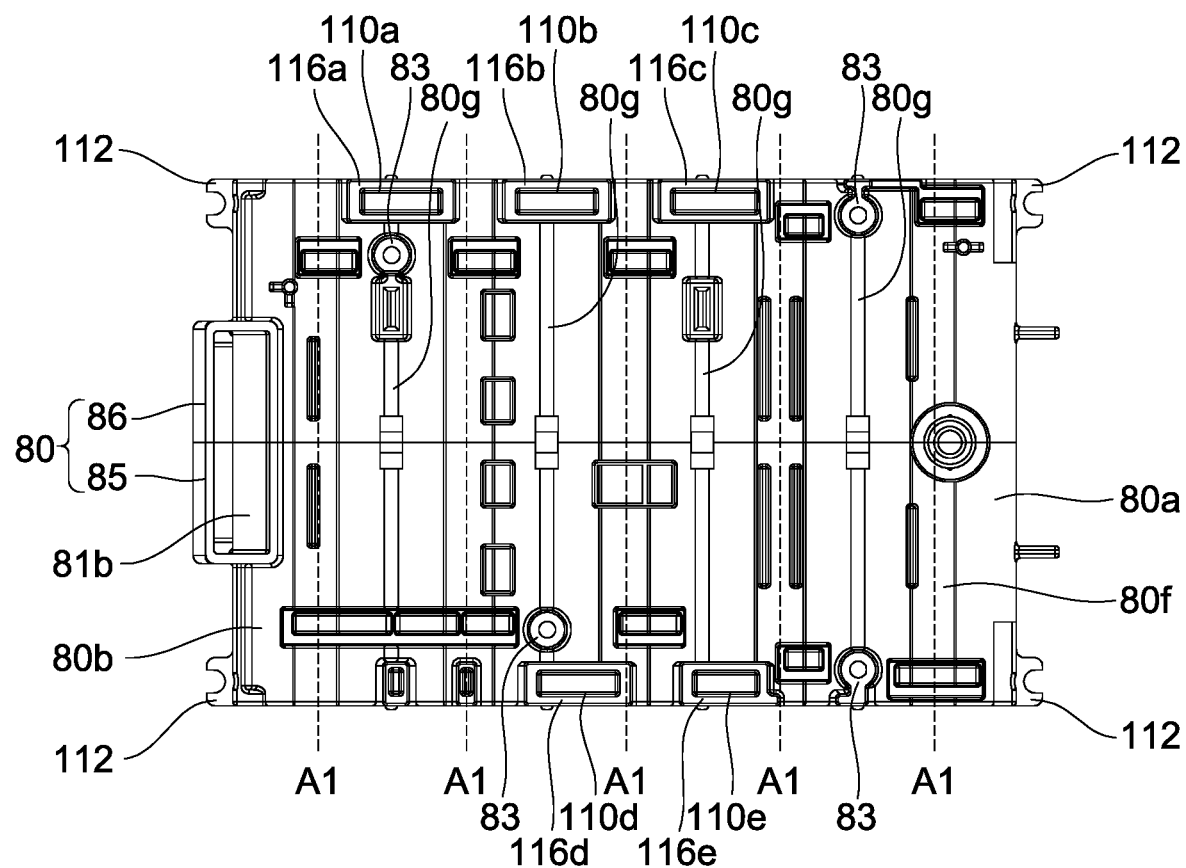
FIG. 11C is a top view, viewed from above, of the cell case 80 according to the first embodiment.
Figure 11C:
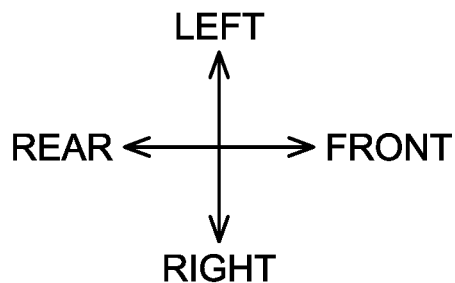
Figure 20:
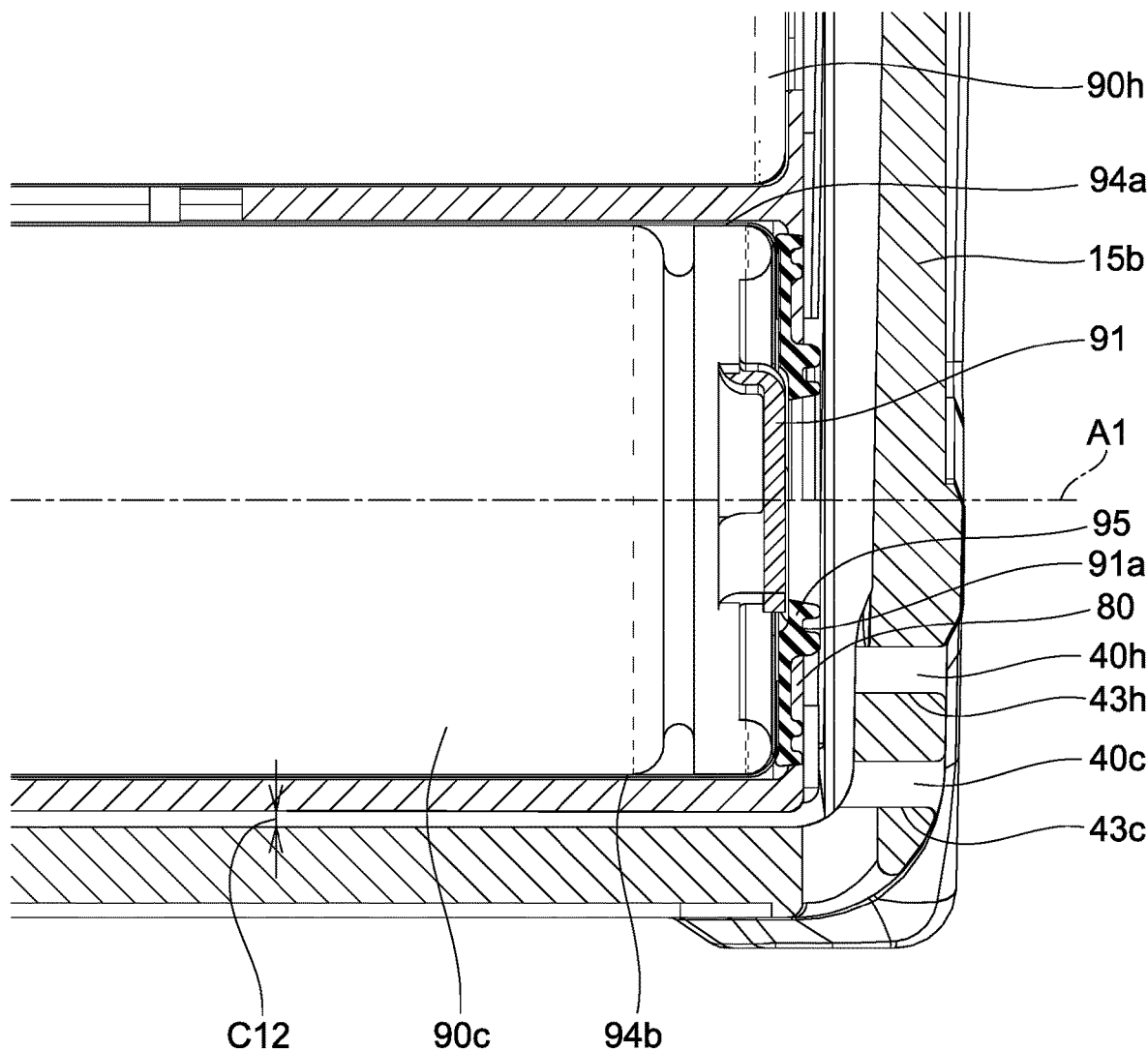
FIG. 20 is a cross-sectional view, viewed from the rear, of the battery pack 2 according to the first embodiment.
Figure 20:
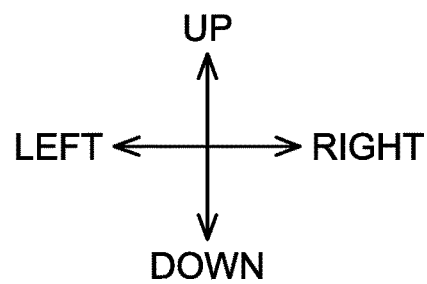

As shown in FIG. 10, the ten battery cells 90a-90j are disposed, such that they are lined up in two levels, an upper level and a lower level, in the cell case 80. Each battery cell 90a-90j is a rechargeable battery cell, e.g., a lithium-ion battery cell, having a circular-cylinder shape and on which a positive electrode is formed on a first end portion and a negative electrode is formed on a second (opposite) end portion. In the present embodiment, the battery cells 90a-90j are 18650-type, lithium-ion battery cells having a rated voltage of 3.6V. The battery cells 90a-90j are disposed such that, among battery cells 90a-90j adjacent in the up-down direction, the positive electrodes and the negative electrodes are oriented in the reverse direction from one another. The battery cell 90a, which is the rearmost of the battery cells 90a-90e in the lower level, is disposed such that its right-end-surface side is its negative electrode and its left-end-surface side is its positive electrode. In addition, the battery cells 90b-90e are disposed such that their right-end-surface sides are their positive electrodes and their left-end-surface sides are their negative electrodes. In addition, the battery cell 90f, which is the rearmost of the battery cells 90f-90j in the upper level, is disposed such that its right-end-surface side is its positive electrode and its left-end-surface side is its negative electrode. In addition, the battery cells 90g-90j are disposed such that their right-end-surface sides are their negative electrodes and their left-end-surface sides are their positive electrodes. A metal part 91 (e.g., refer to FIG. 20), which constitutes the positive electrode of each battery cell 90a-90j, and a metal part, which constitutes the negative electrode of each battery cell 90a-90j, are respectively connected to the first and second end portions (surfaces) of each battery cell 90a-90j. The first end portions of the battery cells 90a-90j are connected via the metal parts to lead plates 92a-92f (refer to FIG. 9A), which are made of a conductive metal or alloy, such as copper, copper alloy, aluminum, aluminum alloy, etc., and are provided on the right-side surface 80e side of the cell case 80. The second end portions of the battery cells 90a-90j are connected via the metal parts to lead plates 92g-92k (refer to FIG. 9B), which are also made of a conductive metal or alloy, such as copper, copper alloy, aluminum, aluminum alloy, etc., and are provided on the left-side surface 80f side of the cell case 80. It is noted that, as shown in FIG. 20, for each of the battery cells 90a-90j, a waterproof ring 95 is provided on the metal part 91 that constitutes the positive electrode of the battery cell 90a-90j. In FIG. 9A and FIG. 9B, the portions denoted by thick-line circles on the surfaces of the lead plates 92 indicate that the waterproof rings 95 are disposed inward thereof. Accordingly, the positive electrodes of the battery cells 90a-90j are connected to the portions denoted by the thick-line circles on the surfaces of the lead plates 92.

As shown in FIG. 9A, the lead plates 92a-92f are disposed spaced apart from one another, i.e. there is no direct contact between the lead plates 92a-92f that could cause electrically shorting. Accordingly, the lead plates 92a-92f are electrically insulated from one another by the gaps therebetween. The lead plate 92a is connected only to the positive electrode of the battery cell 90f. The lead plate 92f is connected only to the negative electrode of the battery cell 90j. The lead plate 92b connects the two battery cells 90a, 90b, which are adjacent in the front-rear direction. The lead plates 92c-92e connect the two battery cells that are adjacent in a diagonal direction. Specifically, the lead plate 92c is connected to the negative electrode of the battery cell 90g and the positive electrode of the battery cell 90c. The lead plate 92d is connected to the negative electrode of the battery cell 90h and the positive electrode of the battery cell 90d. The lead plate 92e is connected to the negative electrode of the battery cell 90i and the positive electrode of the battery cell 90e.

In addition, as shown in FIG. 9B, the lead plates 92g-92k are disposed spaced apart from one another in a manner similar to the lead plates 92a-92f. Accordingly, the lead plates 92g-92k are electrically insulated from one another by the gaps therebetween. The lead plates 92g-92k connect the battery cells that are adjacent in the up-down direction. Specifically, the lead plate 92g connects the negative electrode of the battery cell 90e and the positive electrode of the battery cell 90j. In addition, the lead plate 92h connects the negative electrode of the battery cell 90d and the positive electrode of the battery cell 90i. In addition, the lead plate 92i connects the negative electrode of the battery cell 90c and the positive electrode of the battery cell 90h. In addition, the lead plate 92j connects the negative electrode of the battery cell 90b and the positive electrode of the battery cell 90g. In addition, the lead plate 92k connects the positive electrode of the battery cell 90a and the negative electrode of the battery cell 90f. According to the above-mentioned configuration, the ten battery cells 90a-90j are electrically connected in series. Accordingly, the rated voltage of the battery pack 2 is 36V. It is noted that, although not shown, electrically insulating sheets are affixed to the right-side surface 80e and the left-side surface 80f of the cell case 80.

According to the above-mentioned configuration, the lead plates 92a, 92f, which are connected to the control board 82 via respective power-supply lines (not shown), can be connected to the battery cells 90f, 90j, which are on the upper side. The electric current that flows in (through) the lead plates 92a, 92f, which are connected to the control board 82, is larger than the electric current that flows in (through) the other lead plates. Consequently, the width of each of the lead plates 92a, 92f is preferably large. Owing to the arrangement of parts in the above-mentioned configuration, the width of the lead plates 92a, 92f can be sufficiently ensured. In this regard, it is noted that, if at least one of the lead plates 92a, 92f connected to the control board 82 were to instead be connected to one of the lower level battery cells 90a-90e, then it would become necessary to wire the corresponding power-supply line from a lower portion of cell case 80 up to the control board 82 that is above the cell case 80. Because the clearance between the cell case 80 and a right-side surface of the outer case 12 is small in the lower portion of the cell case 80, wiring the power-supply line would be difficult in such an arrangement. On the other hand, according to the above-mentioned configuration of the present teachings, because both of the lead plates 92a, 92f, which are connected to the control board 82, are connected to the battery cells 90f, 90j, which are on the upper side, the power-supply lines that respectively connect the lead plates 92a, 92f and the control board 82 can be wired easily. In addition, because the length of the power-supply lines that connect the lead plates 92a, 92f and the control board 82 can be made shorter than in an embodiment in which at least one of the lead plates 92a, 92f is connected to a battery cell in the lower level, the resistance of the power-supply lines that connect the lead plates 92a, 92f and the control board 82 can be made smaller.

As shown in FIG. 10, when the cell case 80 holds the ten battery cells 90a-90j, the upper-level battery cells 90f-90j and the lower-level battery cells 90a-90e are disposed spaced apart from one another in the up-down direction. In addition, clearances (gaps) are provided between the battery cells 90a, 90b, 90f, 90g and the rearward-side coupling parts 88 and between the battery cells 90d, 90e, 90i, 90j and the forward-side coupling parts 88. Consequently, air that flows into the cell case 80 via the vent 81a or the vent 81b of the cell case 80 can pass between the upper-level battery cells 90f-90j and the lower-level battery cells 90a-90e, between the battery cells 90a, 90b, 90f, 90g and the rearward-side coupling parts 88, and between the battery cells 90d, 90e, 90i, 90j and the forward-side coupling parts 88.

As shown in FIG. 9A, the control board 82 is disposed upward of the cell case 80. The control board 82 is disposed along a plane orthogonal to the up-down direction and is fixed to the cell case 80 via fasteners 100.

A plurality of terminals 102 is provided on the upper surface of the control board 82. The terminals 102 include: a battery-side, negative-electrode terminal 104a and a battery-side, positive-electrode terminal 104b, which are used for discharging or charging when the battery pack 2 is mounted on the power tool 200 or the charger 300; and a plurality of battery-side signal terminals 106a-106d used for the transmission and receipt of signals. The battery-side, negative-electrode terminal 104a and the battery-side, positive-electrode terminal 104b are provided outward of the battery-side signal terminals 106a-106d in the left-right direction and may each be constituted by four discrete terminals that are electrically connected, as shown in FIG. 9A. The battery-side, negative-electrode terminal 104a is provided on the control board 82 on the right side thereof, and the battery-side, positive-electrode terminal 104b is provided on the control board 82 on the left side thereof. The battery-side signal terminals 106a, 106b are provided such that they are lined up (colinear) in the front-rear direction. The battery-side signal terminals 106c, 106d are provided such that they are lined up (colinear) in the front-rear direction and thus extend in parallel to the battery-side signal terminals 106a, 106b. As shown in FIG. 12B, the battery-side, negative-electrode terminal 104a is disposed at a location corresponding to the terminal-opening part 22a of the upper-part case 14, the battery-side signal terminals 106a, 106b are disposed at a location corresponding to the terminal-opening part 22b, the battery-side signal terminals 106c, 106d are disposed at a location corresponding to the terminal-opening part 22c, and the battery-side, positive-electrode terminal 104b is disposed at a location corresponding to the terminal-opening part 22d.

Figure 12A:
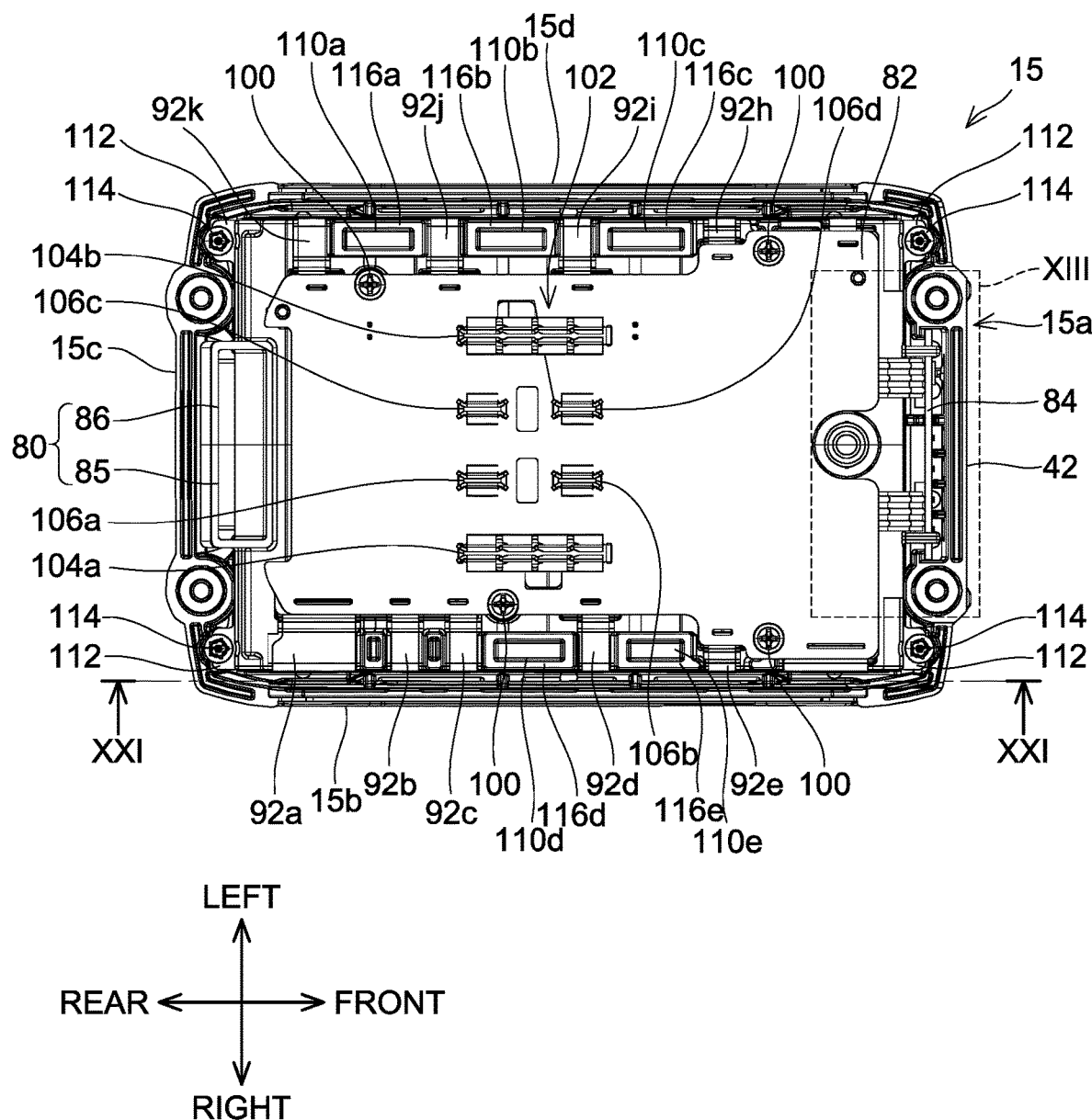
FIG. 12A is a top view that shows the state in which, in the first embodiment, the battery module 10 and the lower-part case 15 are fixed to one another.
Figure 12B:
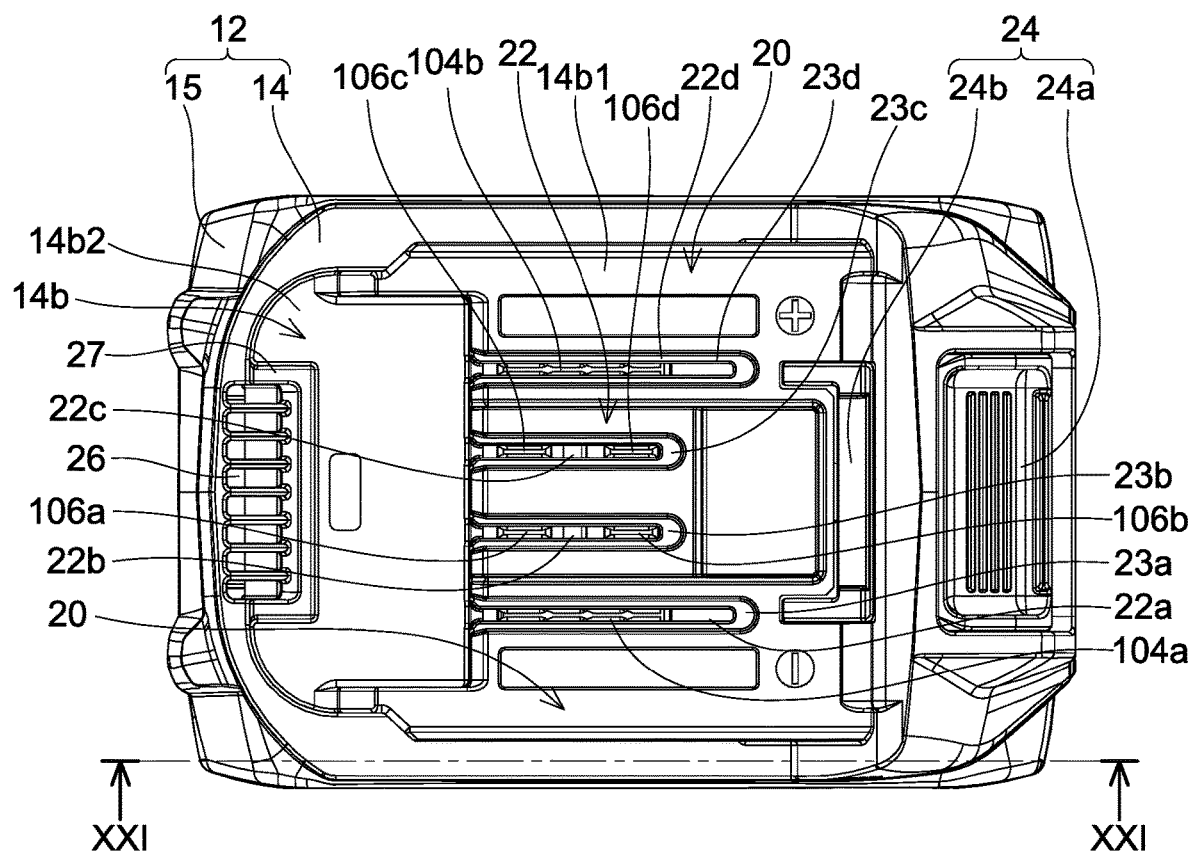
FIG. 12B is a top view, viewed from above, of the battery pack 2 according to the first embodiment.
Figure 12B:
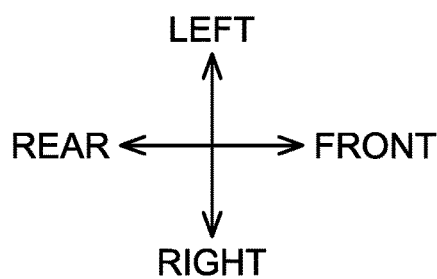

As shown in FIGS. 9A, 9B, 11C and 12A, four screw holders (fixing parts) 112 are provided on the cell case 80. The screw holders 112 are provided at locations corresponding to the screw holes 62 (FIG. 6) of the lower-part case 15. As shown in FIG. 12A, the lower-part case 15 and the battery module 10 are fixed to one another by four screws 114 that respectively pass through the screw holes 62 and into the screw holders 112.

As shown in FIG. 9A, the LED board 84 is connected to the control board 82 via signal lines 120. The LED board 84 comprises four LEDs 84a and a switch 84b, which may be, e.g., a push-button switch. As shown in FIG. 13A, when the battery module 10 and the lower-part case 15 are fixed to one another, the LED board 84 is disposed in the vicinity of a rear surface of the display part 42 of the lower-part case 15. Specifically, the LEDs 84a are respectively disposed on the rear surfaces of the remaining-battery-charge display parts 42a, and the switch 84b is disposed on the rear surface of the button 42b. That is, inward of the lower-part case 15, the LED board 84 opposes the front surface 14a. In addition, the LED board 84 is inserted into the groove part 50a of the front-part rib 50 of the lower-part case 15 and is mounted on the front-part ribs 48, 56. Consequently, the LED board 84 is held by the lower-part case 15. In addition, a front surface of the LED board 84 makes contact with rear ends of the front-part ribs 52, 54 and the light-shielding wall part 56a of the front-part rib 56. In addition, the vents 58a-58d are provided in the surface that opposes a lower surface 84c of the LED board 84.

Engagement clearances C1, which are respectively located between the first ridge parts 30 of the upper-part case 14 and the first recessed parts 110 of the battery module 10, and engagement clearances C2, which are respectively located between second ridge parts 34a-34d of the upper-part case 14 and second recessed parts 64a-64d of the lower-part case 15, are explained below, with reference to FIG. 14 to FIG. 17.

Figure 14:
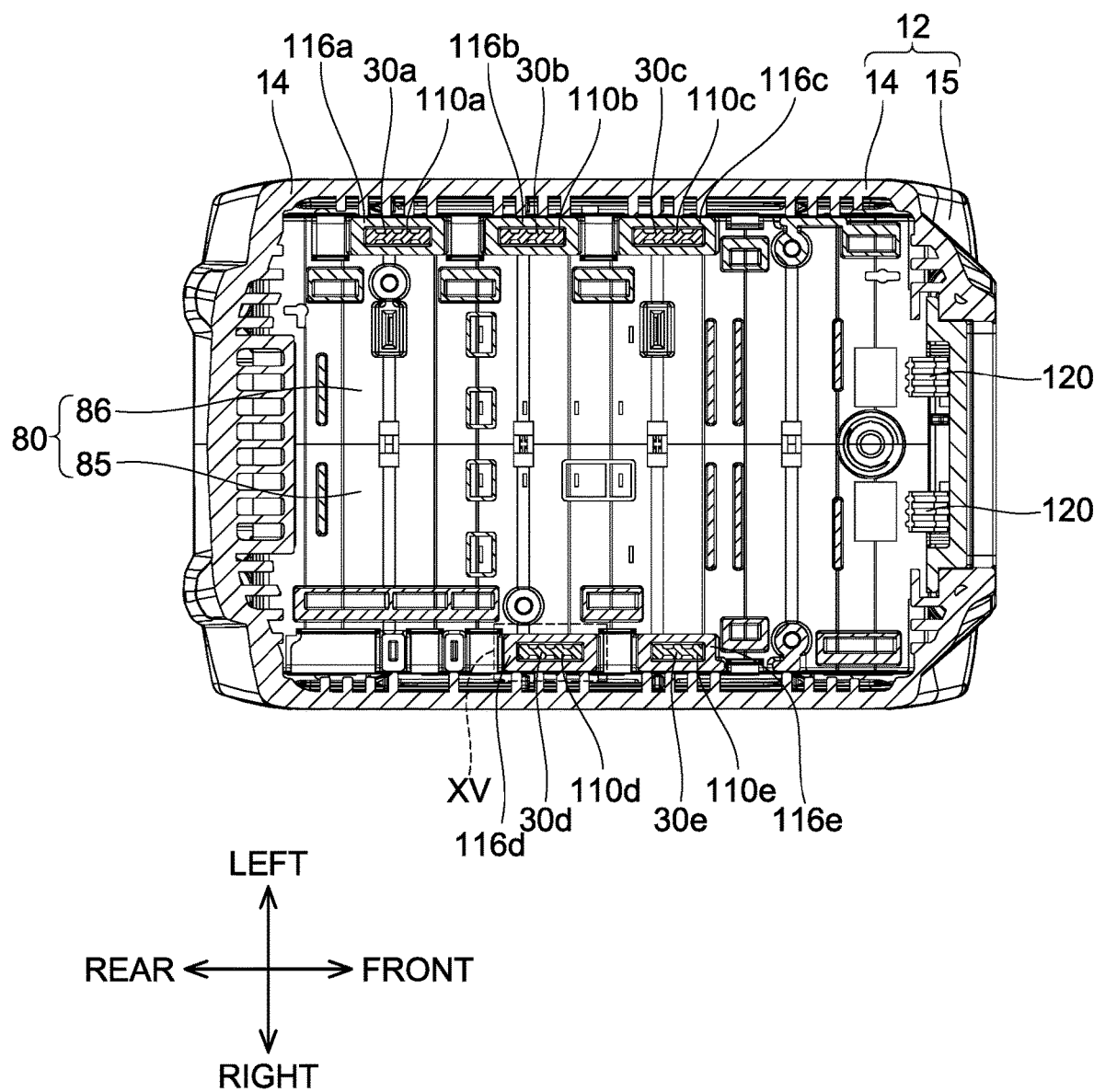
FIG. 14 is a cross-sectional view, viewed from above, of the battery pack 2 according to the present embodiment.
Figure 15:
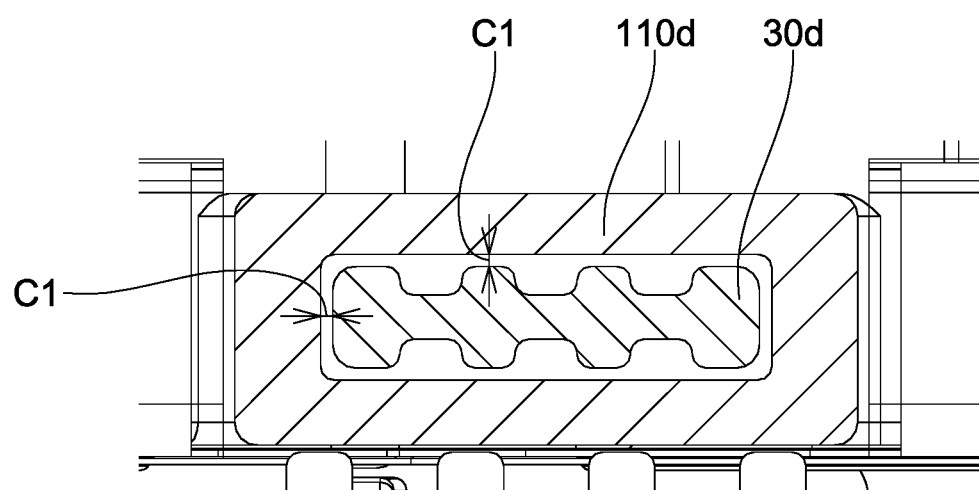
FIG. 15 is an enlarged view of the broken-line area XV in FIG. 14.
Figure 15:
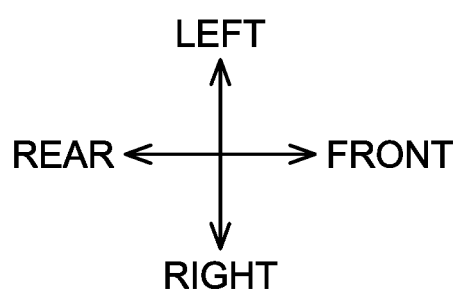

As shown in FIG. 14, the first ridge parts (protrusions) 30a-30e of the upper-part cases 14 are received in the first recessed parts (recesses, slots, blind holes) 110a-110e of the battery module 10, respectively. As shown in FIG. 15, engagement clearances (gaps) C1 are provided between the first ridge parts (30d) and the first recessed parts (110d) in the front-rear direction and in the left-right direction. The same engagement clearances C1 are also provided with regard to the other first ridge parts 30a-30c and first recessed parts 110a-110c.

Figure 16:
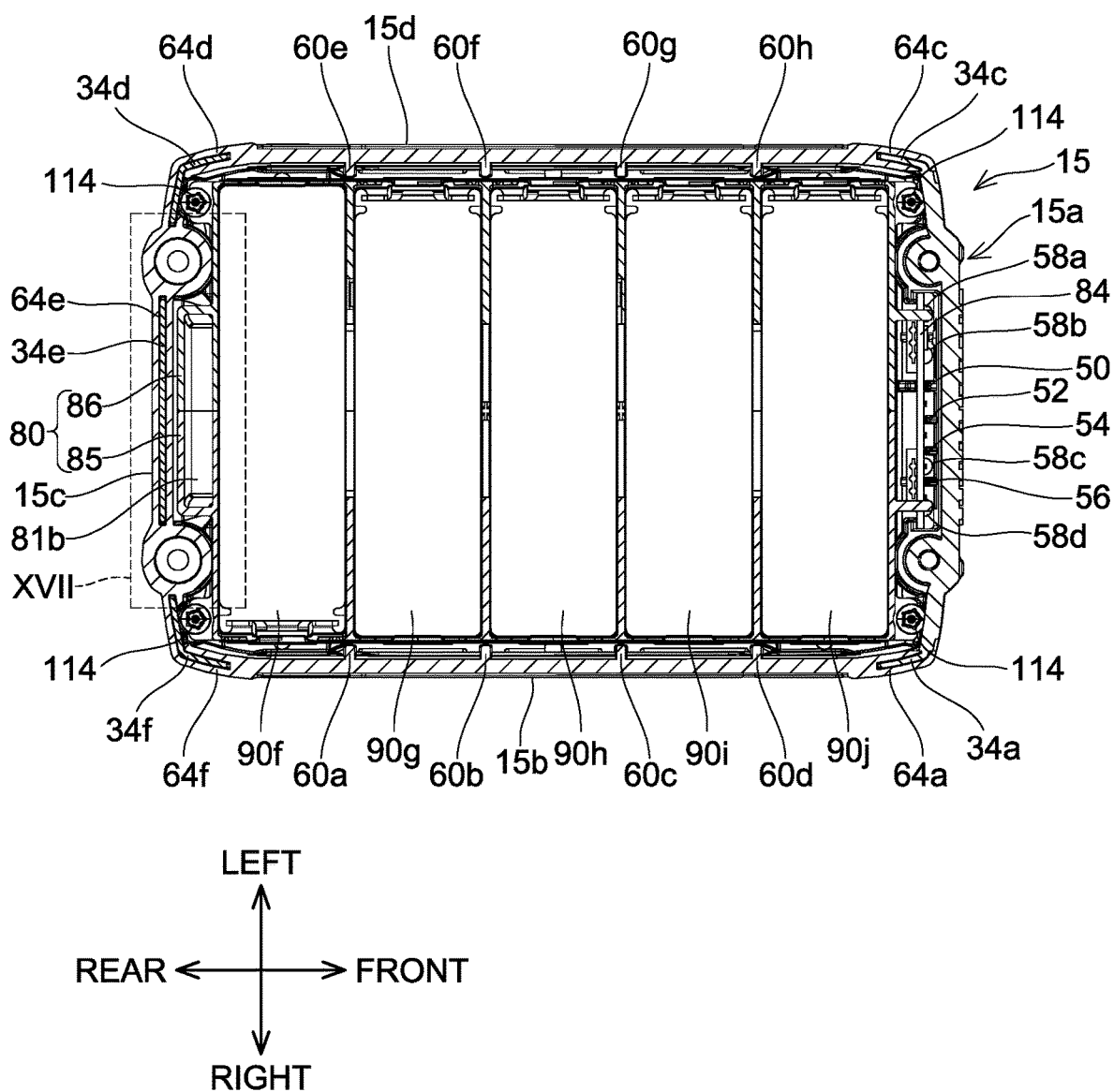
FIG. 16 is a cross-sectional view, viewed from above, of the battery pack 2 according to the present embodiment.
Figure 17:
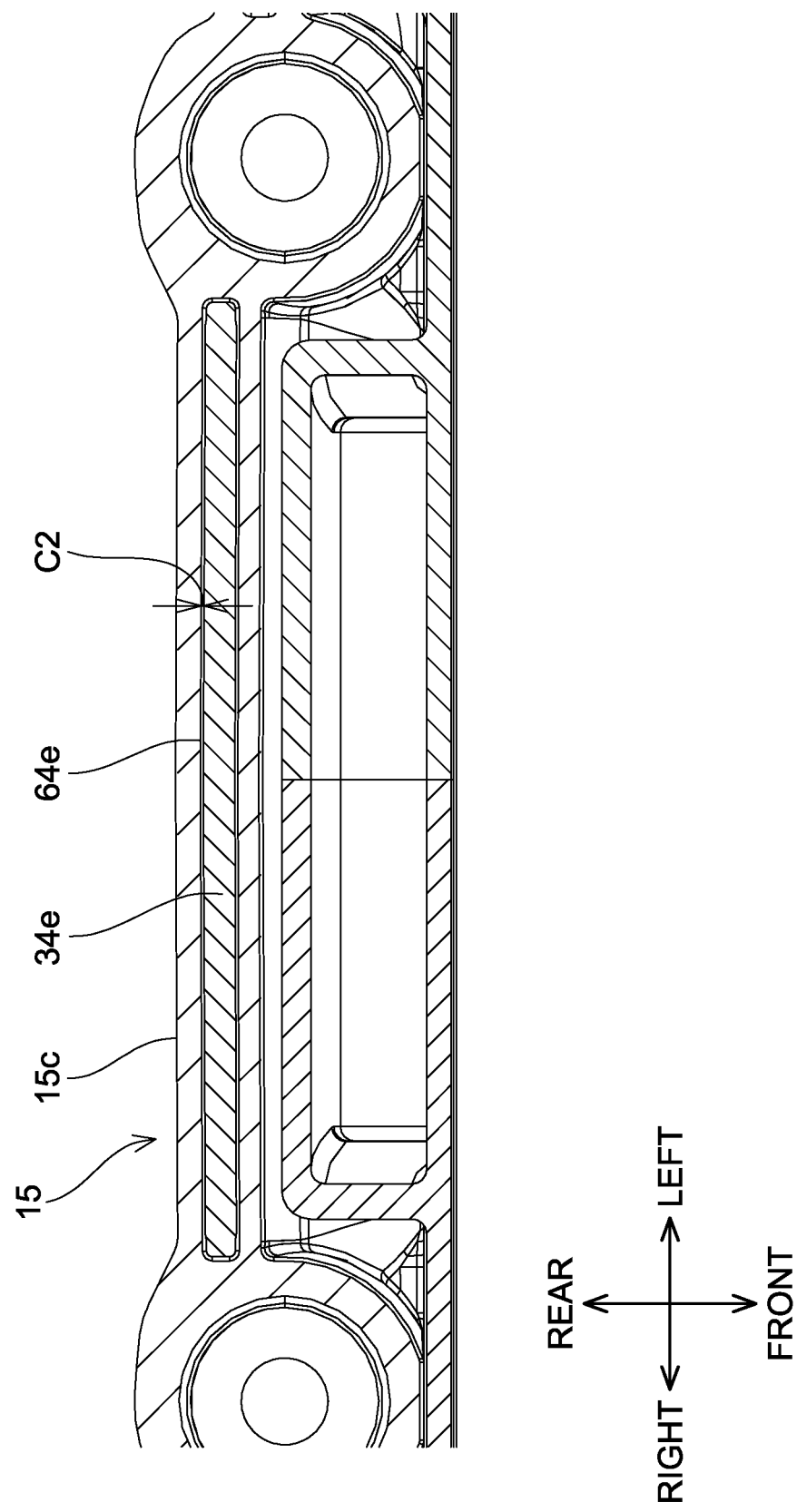
FIG. 17 is an enlarged view of the broken-line area XVII in FIG. 16.

In addition, as shown in FIG. 16, the second ridge parts (protrusions) 34a-34f of the upper-part case 14 are respectively received in the second recessed parts (recesses, slots, blind holes) 64a-64f of the lower-part case 15. As shown in FIG. 17, engagement clearance (gap) C2 is provided, e.g., between the second ridge part 34e and the second recessed part 64e. The same engagement clearances (gaps) C2 are also provided with regard to the other second ridge parts 34a-34d and 34f and second recessed parts 64a-64d and 64f These engagement clearances C2 are designed (configured) to position (retain) the upper-part case 14 relative to the lower-part case 15 in directions perpendicular to the up-down direction, i.e. in a plane defined by the front-rear direction and the left-right direction. The engagement clearances C1 shown in FIG. 14 are designed (configured) to reduce the likelihood of mispositioning (misalignment) between the upper-part case 14 and the cell case 80. More specifically, the engagement clearances C1 should be set (designed, configured) such that mispositioning between the upper-part case 14 and the cell case 80 tends not to occur and contact between the upper-part case 14 and the control board 82 is thereby hindered or prevented. The engagement clearances C1 are preferably larger than the engagement clearances C2. It is noted that, as shown in FIG. 16, a labyrinth structure (tortious path) is formed by the interaction of the second ridge parts 34a-34f and the second recessed parts 64a-64f Thereby, the ingress of water into the outer case 12 via these parts is hindered.

Next, case clearances (gaps) C11-C13, which are located between the lower surface of the cell case 80 of the battery module 10 and the lower-part case 15, will be explained, with reference to FIG. 18 and FIG. 19. As described above, FIG. 18 is a cross-sectional view of the battery pack 2 at its center position in the left-right direction, and FIG. 19 is a cross-sectional view of the battery pack 2 at the location at which the right-side, rearward depression 16c of the lower-part case 15 is provided.

As shown in FIG. 18, the (entire) lower surface of the cell case 80 does not make contact with the upper surface of the bottom wall 15e of the lower-part case 15. Specifically, case clearances C11 are provided between the center holding parts 89a of the cell-holding parts 87a-87c and the projections 16b, which protrude upward (i.e., inward in the up-down direction) from the bottom wall 15e of the lower-part case 15. In addition, case clearances C12 are provided between the center holding parts 89a and the flat part 16a. The case clearances C12 are larger than the case clearances C11.

In addition, as shown in FIG. 19, case clearance C13 is provided between the depression 16c and the end-surface-side holding part 89b corresponding to the battery cell 90a disposed at the location closest to the corresponding corner part 15f of the lower-part case 15. The step part 16d is provided between the portion of the bottom wall 15e of the lower-part case 15 that opposes a side surface 93a of the battery cell 90a and the portion of the bottom wall 15e of the lower-part case 15 that opposes a side surface 93b of the battery cell 90b. The same case clearance C13 is provided at each of the recessed parts 16a, 16b and 16d. It is noted that the step part 16d is not provided between the portion of the bottom wall 15e of the lower-part case 15 that opposes the side surface 93b of the battery cell 90b and the portion of the bottom wall 15e of the lower-part case 15 that opposes a side surface 93c of the battery cell 90c. Consequently, the case clearances C13 are larger than the case clearances C12.

Next, the positional relationship between the battery cell 90c, from among the plurality of battery cells 90a-90j, located in (at) the center of the lower level and the holes 40c, 40h provided rightward of the battery cell 90c will be explained in an exemplary manner, with reference to FIG. 20. It is noted that, in FIG. 20, the lead plate 92i is omitted to facilitate understanding.

As shown in FIG. 20, holes 40c, 40h are provided in the right-side surface 15b at locations at which they face an end surface of the (lower level) battery cell 90c in the longitudinal direction. It is noted that a hole is not provided in the right-side surface 15b at a location facing an end surface of the (lower level) battery cell 90h, which is located upward of the battery cell 90c, in the longitudinal direction. At least a portion of the holes 40c, 40h face an end surface of the battery cell 90c in the longitudinal direction.

The metal part 91, which constitutes the positive electrode of the battery cell 90c, is provided on the right-side end surface of the battery cell 90c. The lower end (edge) 43h of the hole 40h in the upper level and the lower end (edge) 43c of the hole 40c in the lower level are provided downward of an upper end 94a of the battery cell 90c and downward of longitudinal-direction axis A1 of the battery cell 90c. In addition, the lower end 43c of the hole 40c in the lower level is provided downward of a lower end 91a of the metal part 91 and downward of a lower end 94b of the battery cell 90c.

Figure 21:
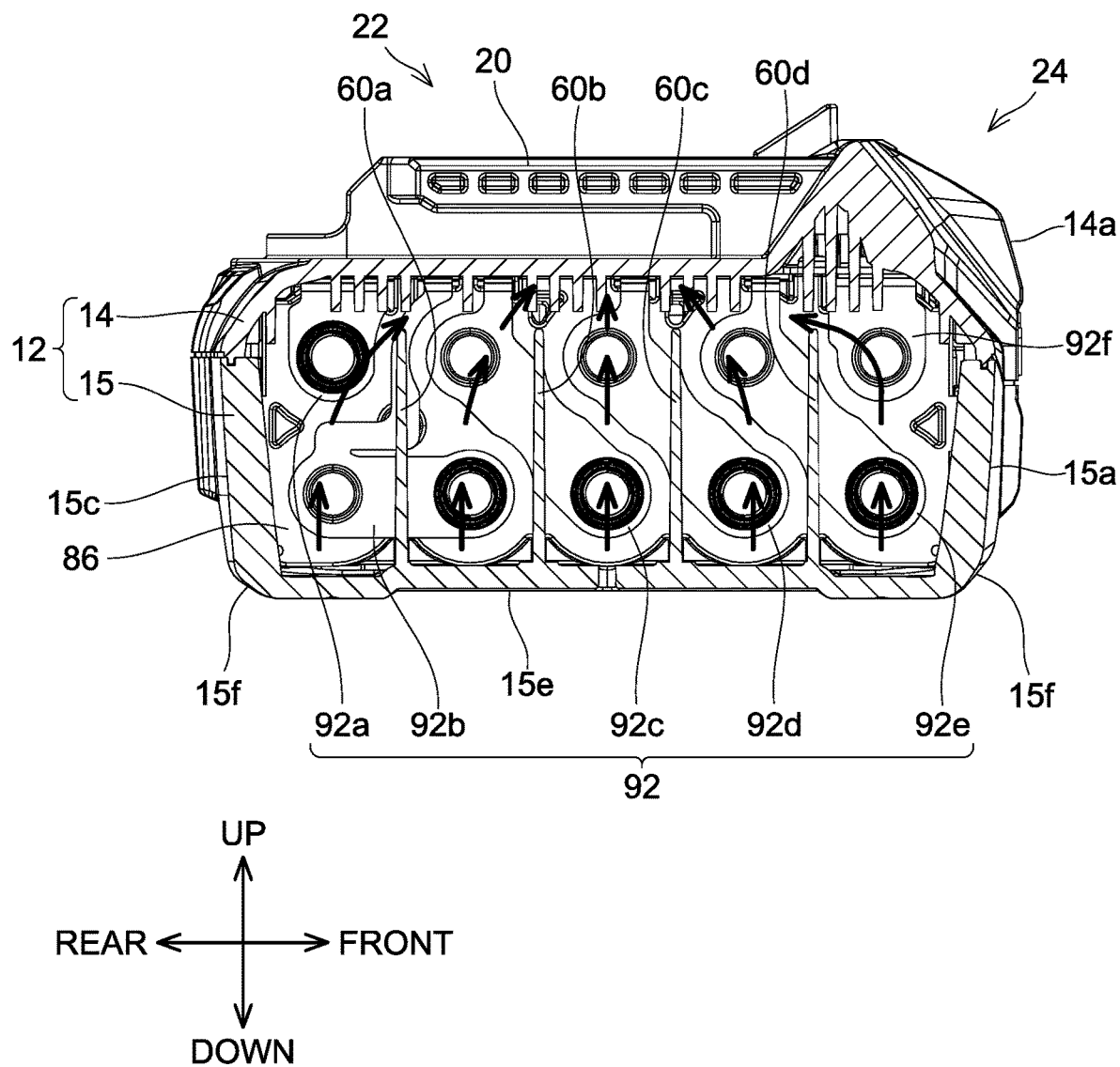
FIG. 21 is a cross-sectional view taken along line XXI-XXI in FIG. 12A and FIG. 12B.

Next, the flow of air inside the battery pack 2 will be explained, with reference to FIG. 21. Let us assume the circumstance in which, for example, the battery pack 2 was mounted on the power tool 200, the power tool 200 was used by the user, and then the battery pack 2 was removed from the power tool 200. During operation of the power tool 200, the temperature of the battery pack 2 increases owing to the discharge of current. Therefore, the vents 40, 41, which are provided at (in) the lower portion of the lower-part case 15, as shown in FIG. 1A, FIG. 3, and FIG. 8, function as air-suction holes through which air is introduced from outside into the interior of the battery pack 2. Specifically, the air around the battery cells 90a-90j within the battery pack 2 warms up, which causes the (cooler) air around the battery pack 2 to flow into the interior of the battery pack 2 via the vents 40, 41. The air introduced via the vent 40 (i.e. through the holes 40a-40j) into the battery pack 2 flows into the partitioned spaces between the plurality of battery cells 90a-90j and the lower-part case 15 in the following manner. As was described above, the side-part ribs 60a-60d are provided between the holes 40a-40j. Consequently, as shown in FIG. 20, the air introduced via the holes 40c, 40h flows into the space (vertical channel) between the battery cells 90c, 90h and the right-side surface 15b of the lower-part case 15. Likewise, the air introduced via the holes 40a, 40f flows into the space (vertical channel) between the battery cells 90b, 90g and the right-side surface 15b of the lower-part case 15, the air introduced via the holes 40b, 40g flows into the space (vertical channel) between the battery cells 90b, 90g and the right-side surface 15b of the lower-part case 15, the air introduced via the holes 40d, 40i flows into the space (vertical channel) between the battery cells 90d, 90i and the right-side surface 15b of the lower-part case 15, and the air introduced via the holes 40e, 40j flows into the space (vertical channel) between the battery cells 90e, 90j and the right-side surface 15b of the lower-part case 15. Accordingly, the plurality of battery cells 90a-90j is cooled reliably. After the air that has flowed into the spaces between the plurality of battery cells 90a-90j and the right-side surface 15b of the lower-part case 15 has cooled the plurality of battery cells 90, that heated air flows out to the exterior of the battery pack 2 via the terminal-opening part 22a, etc. of the terminal-receiving part 22 of the upper-part case 14. Thus, when the temperature of the battery cells 90a-90j inside the battery pack 2 is high, natural convection arises within the outer case 12. It is noted that the air introduced via the vent 41 into the battery pack 2 also flows into the spaces (vertical channels) between the battery cells 90a-90j and the left-side surface 15d of the lower-part case 15 and also is used in the cooling of the battery cells 90a-90j.

Next, the flow of air inside the battery pack 2 while the battery pack 2 is mounted on the charger 300 will be explained, with reference to FIG. 22 and FIG. 23. A ventilation fan (not shown) is installed in the charger 300 and is configured to suction air from the battery pack 2. In this state, the vents 40, 41 (refer to FIG. 1) and the vents 58a-58d (refer to FIG. 6) of the battery pack 2 function as air-suction holes through which air is introduced from the exterior into the interior of the battery pack 2, and the vent 26 (refer to FIG. 1) of the battery pack 2 functions as an air-exhaust hole through which air is exhausted from the interior of the battery pack 2 through the charger 300 to the outside (via a vent hole 310 in the charger 300 as shown in FIG. 25A).

Figure 22:
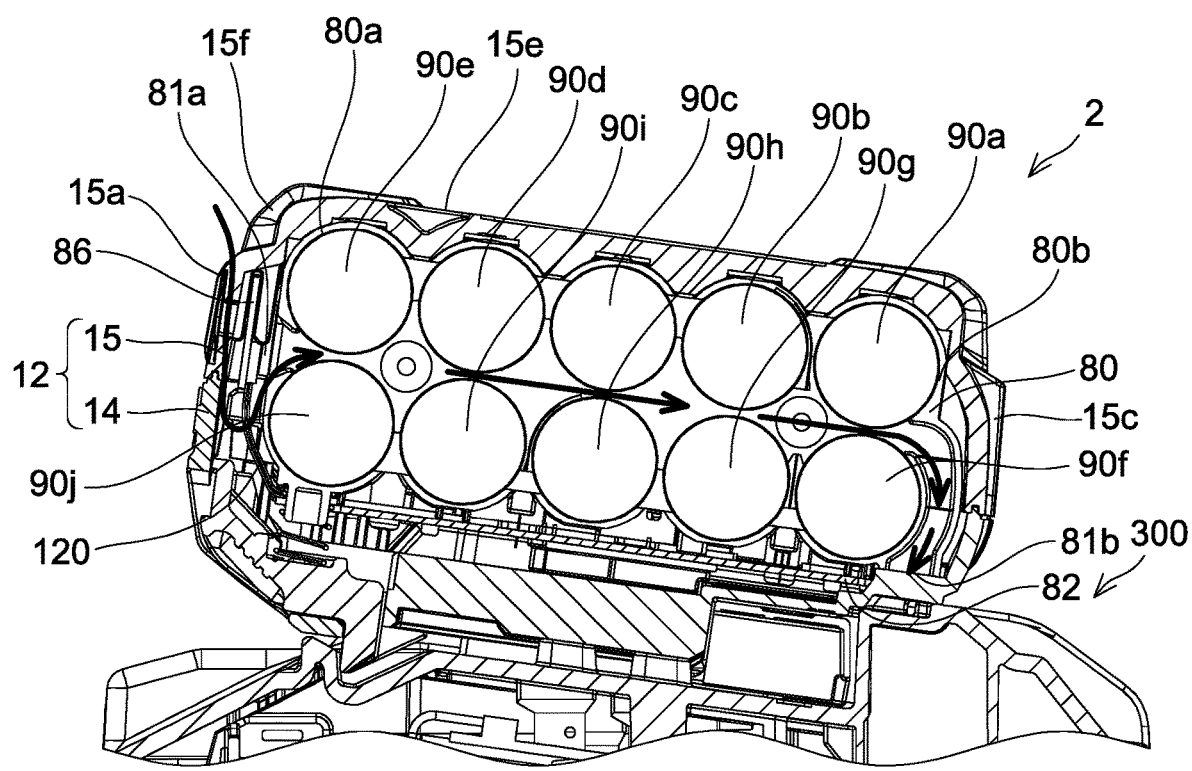
FIG. 22 is a cross-sectional view, viewed from the left, of the state in which the battery pack 2 according to the first embodiment is mounted on a charger 300.
Figure 22:
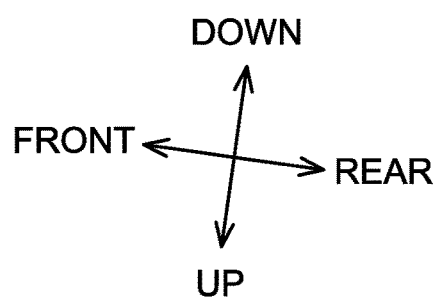

As shown in FIG. 22, when the ventilation fan of the charger 300 is driven, air suctioned into the battery pack 2 via the vents 58a-58d (see also FIG. 1B) flows into the space between the front part 80a of the cell case 80 and the front surface 15a of the lower-part case 15. The LED board 84 is provided between the front part 80a of the cell case 80 and the front surface 15a of the lower-part case 15. Therefore, the air that flows into the space between the front part 80a of the cell case 80 and the front surface 15a of the lower-part case 15 passes between the front part 80a of the cell case 80 and the LED board 84, passes through the vent 81a of (in) the cell case 80, and flows into the interior of the cell case 80. The air introduced into the cell case 80 passes through the spaces between the battery cells 90f-90j in the upper level and the battery cells 90a-90e in the lower level, the spaces between the battery cells 90a, 90b, 90f, 90g and the rearward-side coupling part 88, and the spaces between the battery cells 90d, 90e, 90i, 90j and the forward-side coupling part 88. Therefore, the air that passes through the interior of the cell case 80 cools the plurality of battery cells 90a-90j. Then, the heated air is suctioned into the charger 300 via the vent 81b of the rear part 80b of the cell case 80, the vent 26 of the upper-part case 14, and a vent 308 (refer to FIG. 25B) of the charger 300, which corresponds to the vent 26. As described above, when the battery pack 2 is mounted on the charger 300, the charger-side ridge part 306 of the charger 300 is inserted into the battery-side channel 27, which surrounds the vent 26. Consequently, the amount of air suctioned into the charger 300 through a gap, which may be (undesirably) present between the battery pack 2 and the charger 300, e.g., due to manufacturing tolerances, can be made less than in an embodiment in which the battery-side channel 27 is not provided around the vent 26. Thereby, the amount of air that flows inside the battery pack 2 can be increased because suctioning losses via the undesired gap are reduced. Accordingly, the battery cells 90a-90j, the lead plates 92, and the like inside the battery pack 2 can be cooled efficiently.

Figure 23:
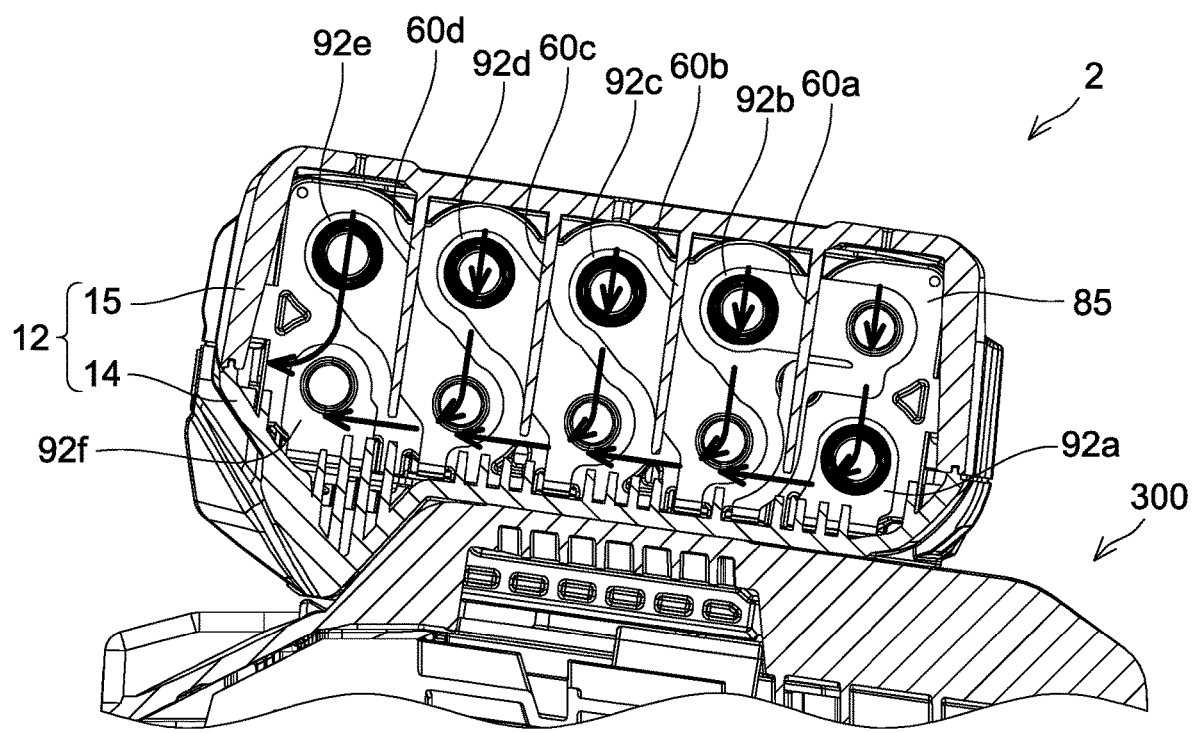
FIG. 23 is a cross-sectional view, viewed from the left, of the state in which the battery pack 2 according to the first embodiment is mounted on the charger 300.
Figure 23:
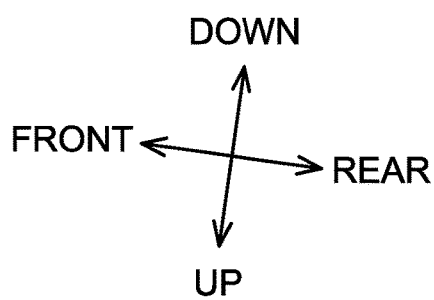

In addition, as shown in FIG. 23, the air introduced via the vent 40 into the battery pack 2 flows into the spaces (vertical channels) between the plurality of battery cells 90a-90j and the right-side surface 15b of the lower-part case 15 (more precisely, between the lead plates 92 and the right-side surface 15b of the lower-part case 15). The air that flows into the spaces between the battery cells 90a-90j and the right-side surface 15b of the lower-part case 15 flows toward the forward side, upward of the plurality of side-part ribs 60a-60d, and flows into the space between the front part 80a of the cell case 80 and the front surface 15a of the lower-part case 15. The flow of air thereafter is the same as is shown in FIG. 22. Thus, the air introduced via the vents 58a-58d, 40, 41 is used to cool the plurality of battery cells 90a-90j. It is noted that, in the present embodiment, the vents 40, 41 are provided at the lower portion of the lower-part case 15. Therefore, when the battery pack 2 is mounted on the charger 300, the vents 40, 41 are located at a height that is higher than an upper surface of the charger 300. Because dust and the like tends to accumulate at lower locations, dust and the like tend not to be suctioned into the battery pack 2 owing to the fact the battery pack 2 is mounted above the charger 300 and the vents 40, 41 are located an upper most location at this time.

The effects of the battery-side channels (steps) 23a-23d of the upper-part case 14 of the battery pack 2 will be explained below, with reference to FIG. 24B. It is noted that FIG. 24B is a cross-sectional view, at the center position in the front-rear direction, of the battery-side signal terminal 106a (refer to FIG. 12A) of the battery pack 2 in the state in which the battery pack 2 is mounted on the power tool 200. As shown in FIG. 24B, the power tool 200 comprises a terminal-holding part 202. Tool-side ridge parts (protrusions) 206a-206d, which protrude toward the downward side (i.e., toward the battery pack 2), are provided on the terminal-holding part 202. The tool-side, negative-electrode terminal 208a, which corresponds to the battery-side, negative-electrode terminal(s) 104a, is provided on (in) the tool-side ridge part 206a, and the tool-side, positive-electrode terminal 208b, which corresponds to the battery-side, positive-electrode terminal(s) 104b, is provided on (in) the tool-side ridge part 206d. The tool-side signal terminal 210a, which corresponds to the battery-side signal terminal 106a, is provided on (in) the tool-side ridge part 206b. It is noted that a tool-side signal terminal (not shown), which corresponds to the battery-side signal terminal 106b, is provided, forward of the tool-side signal terminal 210a, on the tool-side ridge part 206b. The tool-side signal terminal 210c, which corresponds to the battery-side signal terminal 106c, is provided on the tool-side ridge part 206c. It is noted that, because the battery-side signal terminal 106d is configured (adapted) to be used only while the battery pack 2 is mounted on the charger 300, a tool-side signal terminal corresponding to the battery-side signal terminal 106d is not provided, forward of a tool-side signal terminal 210c, on (in) the tool-side ridge part 206c. When the battery pack 2 is mounted on the power tool 200, the tool-side ridge parts 206a-206d are inserted into the battery-side channels 23a-23d, respectively. Owing to this design, the creepage distance between adjacent terminals of the power tool 200 in the left-right direction can be made longer than in an embodiment in which the tool-side ridge parts 206a-206d are not provided on the terminal-holding part 202 of the power tool 200. More specifically, the increase of the creepage distance corresponds to the combined heights of each pair of adjacent tool-side ridge parts 206a-206d. Accordingly, a short circuit between two adjacent terminals of the power tool 200 in the left-right direction is less likely to occur.

As shown in FIG. 1 to FIG. 17, a battery pack 2 according to one aspect of the present teachings comprises the outer case 12, the battery cells 90a-90j, and the cell case 80, which is housed in the outer case 12 and houses the battery cells 90a-90j. The outer case 12 has: an upper surface (upper wall) 14b, in which at least the terminal-opening part 22a for exposing one of the terminals 102 is provided; the bottom wall (bottom plate) 15e; and the plurality of side surfaces (side walls) 15a-15d extending upward from the bottom wall 15e. The battery cells 90a-90j are disposed parallel to the bottom wall 15e. The vent 40 is provided in the right-side surface (wall) 15b, from among the plurality of side surfaces (walls) 15a-15d, that faces an end surface of the battery cells 90a-90j in the longitudinal direction, i.e. the vent 40 is provided in at least one of the side surfaces (walls) 15b and/or 15d that faces at least one longitudinal end of the battery cells 90a-90j. According to the above-mentioned configuration, air that has flowed via the vent 40 into the outer case 12 rises within the outer case 12 while cooling the battery cells 90a-90j. Accordingly, the battery cells 90a-90j can be quickly cooled.

In one or more embodiments, as shown in FIG. 20, the vent 40 is provided, in particular, in the right-side surface 15b at a location at which it faces, in particular, one of the end surfaces of the (lower level) battery cell 90c in the longitudinal direction. In such an embodiment, air that has flowed via the vent 40 into the outer case 12 can be reliably caused to make contact with the battery cell 90c.

In one or more embodiments, as shown in FIG. 10, the battery cells 90a-90j include the battery cells 90a-90e, which are disposed in the lower level, and the battery cells 90f-90j, which are disposed upward of the battery cells 90a-90e. The vent 40 is provided, at least in the right-side surface 15b, at a location at which it faces at least one of the end surfaces of each lower-level battery cell 90a-90e in the longitudinal direction. No hole(s) is (are) provided at a location or locations facing (opposing) an end surface of the upper-level battery cells 90f-90j in the longitudinal direction. As in the preceding embodiment, air that has flowed via the vent 40 into the outer case 12 rises within the outer case 12. Consequently, air that has flowed via the vent 40, which is provided at a location at which it faces one of the end surfaces of each lower-level battery cell 90a-90e in the longitudinal direction, into the outer case 12 rises within the outer case 12 and subsequently makes contact with the battery cells 90f-90j in the upper level. Accordingly, compared to an embodiment in which the (an additional) vent is also provided, in the right-side surface 15b, at a location or locations facing (opposing) an end surface of the upper-level battery cells 90f-90j in the longitudinal direction, the number of vents (holes) provided in the right-side surface 15b can be reduced.

In one or more embodiments, as shown in FIG. 10, the five (lower level) battery cells 90a-90e are provided, in the cell case 80, lined up parallel to the bottom wall 15e of the lower-part case 15 of the outer case 12. In addition, as shown in FIG. 1 and FIG. 3, the five holes 40a-40e, which respectively correspond to (oppose) the five battery cells 90a-90e, are provided in the outer case 12. According to the above-mentioned configuration, air that has flowed via the holes 40a-40e, which respectively correspond to the battery cells 90a-90e, into the outer case 12 can be caused to make contact with every battery cell 90a-90j.

In one or more embodiments, as shown in FIG. 8, the side-part ribs 60a-60d, which protrude inward, are provided on the inner side of the right-side surface (wall) 15b of the lower-part case 15 of the outer case 12. The side-part ribs 60a-60d are respectively provided between two adjacent ones of the holes 40a-40e, 40f-40j. According to the above-mentioned configuration, (lateral) dispersion of air that has flowed in via the holes 40a-40j can be prevented by the side-part ribs 60a-60d. Accordingly, air that has flowed via the holes 40a-40j, which respectively correspond to (oppose) the battery cells 90a-90e, into the outer case 12 can be reliably caused to make contact with one longitudinal end surface of every battery cell 90a-90j.

In one or more embodiments, as in the partial example shown in FIG. 20, the lower end (edge) 43c of the hole 40c is provided downward of the longitudinal-direction axis A1 of the battery cell 90c, i.e. the lower end (edge) 43c of the hole 40c is defined between the longitudinal-direction axis A1 of the lower-level battery cell 90c and the bottom wall 15e. Consequently, air that has flowed via the hole 40c into the outer case 12 makes contact with the battery cell 90c, and thereby the battery cell 90c is cooled. Accordingly, the battery cell 90c can be quickly cooled. More generally, the lower ends (edges) of each of the holes 40a-40e and each of the holes 41a-41e are preferably provided downward of the longitudinal-direction axis A1 of the battery cells 90a-90e, i.e. the lower ends (edges) of each of the holes 40a-40e and 41a-41e are all defined between the longitudinal-direction axis A1 of the lower-level battery cells 90a-90e and the bottom wall 15e.

In one or more embodiments, as in the partial example shown in FIG. 20, the lower end (edge) 43c of the hole 40c is located downward of the lower end 91a of the metal part 91. According to the above-mentioned configuration, it is possible to cause air that flows via the hole 40c into the outer case 12 to make contact with an increased surface area of the battery cell 90c, as compared to an embodiment in which the lower end (edge) 43 of the hole 40c is located more upwardly relative to the lower end (edge) 91a of the metal part 91. Accordingly, the battery cell 90c can be more quickly cooled. More generally, the lower ends (edges) of each of the holes 40a-40e and each of the holes 41a-41e are preferably provided downward of the lower ends (edges) of the metal parts 91 of the battery cells 90a-90e.

In one or more embodiments, as shown in FIG. 10, the five (lower-level) battery cells 90a-90e are provided, in the cell case 80, lined up parallel to the bottom wall 15e of the lower-part case 15 of the outer case 12. In addition, as shown in FIG. 1 and FIG. 3, these five battery cells 90a-90e include the battery cells 90a, 90e, which are respectively disposed at locations closest to the corner parts 15f of the lower-part case 15 of the outer case 12, and the battery cells 90b-90d, which are disposed inward of (between) the battery cells 90a, 90e. As shown in FIG. 3, the width of the holes 40a, 40e, which respectively correspond to (oppose) the battery cells 90a, 90e, is smaller than the width of the holes 40b-40d, which (respectively) correspond to (oppose) the battery cells 90b-90d. According to the above-mentioned configuration, compared with an embodiment in which the widths of all the holes 40a-40e are the same, the stiffness of the corner parts 15f of the lower-part case 15 of the outer case 12 can be increased. As a result, if the battery pack 2 is dropped, the likelihood of deformation of the outer case 12 can be reduced.

In one or more embodiments, as shown in FIG. 1, the vent 26 is provided in the upper portion of the outer case 12. According to the above-mentioned configuration, air that has flowed via the holes 40a-40j and optionally via the holes 41a-41j into the outer case 12 rises while cooling the battery cells 90a-90j and is exhausted via at least the vent 26 in the upper portion of the outer case 12. Accordingly, air that has flowed via the holes 40a-40j (and the holes 41a-41j) into the outer case 12 can be reliably caused to make contact with all the battery cells 90a-90j.

In one or more embodiments, as shown in FIG. 25, the battery pack 2 is mountable on the charger 300, and, in the state in which the battery pack 2 is mounted on the charger 300, the holes 40a-40j (and/or the holes 41a-41j) are not covered by the charger 300. According to the above-mentioned configuration, when the battery pack 2 is mounted on the charger 300, air that has flowed via the holes 40a-40j (and/or the holes 41a-41j) into the outer case 12 is exhausted via the vent 26. Accordingly, the holes 40a-40j (and/or the holes 41a-41j) serve (function) as air-suction holes.

In one or more embodiments, as shown in FIG. 22 and FIG. 23, when the battery pack 2 is mounted on the charger 300, the holes 40a-40j (and/or the holes 41a-41j) serve (function) as air-suction holes are located at a height higher than the charger 300. Because dust and the like tends to collect at lower locations, dust and the like tends not to be suctioned in via the holes 40a-40j (and/or the holes 41a-41j) during a charging operation, as compared with an embodiment in which the holes 40a-40j (and/or the holes 41a-41j) are disposed at a lower location during the charging operation.

Correspondence Relationship

The vent 40 and the holes 40a-40j, as well as the vent 41 and the holes 41a-41j, are each one example of an "opening." The side-part ribs 60a-60h are each one example of a "rib." The right-side surface 15b and the left-side surface 15d of the lower-part case 15 are each one example of a "specific side surface." The battery cells 90a-90e are each one example of a "downward-side battery cell" and the battery cells 90f-90j are each one example of an "upward-side battery cell." The battery cells 90a, 90e are each one example of an "outward battery cell." The battery cells 90b-90d are each one example of an "inward battery cell."

Second Embodiment

Battery pack 602 according to a second embodiment will now be explained, with reference to FIG. 26. In the battery pack 602 according to the second embodiment, the structure of lower-part case 615 of outer case 612 differs from the structure of the lower-part case 15 of the outer case 12 of the battery pack 2 according to the first embodiment. In addition, in the battery pack 602, the size, etc. of the battery cells (not shown) housed inside the outer case 612 differ from those of the battery cells 90a-90j housed inside the outer case 12 according to the first embodiment. Specifically, the battery cells of the present embodiment are 21700-type, lithium-ion battery cells and have a rated voltage of 3.6V. Consequently, the size of the outer case 612 is larger than that of the outer case 12 in the first embodiment. It is noted that, because the ten battery cells 90a-90j are housed inside the outer case 612 in the same manner as in the battery pack 2 of the first embodiment, the method of connecting the battery cells is the same as in the battery pack in the first embodiment. Accordingly, the rated voltage of the battery pack 602 in the present embodiment is likewise 36V.

Figure 26:
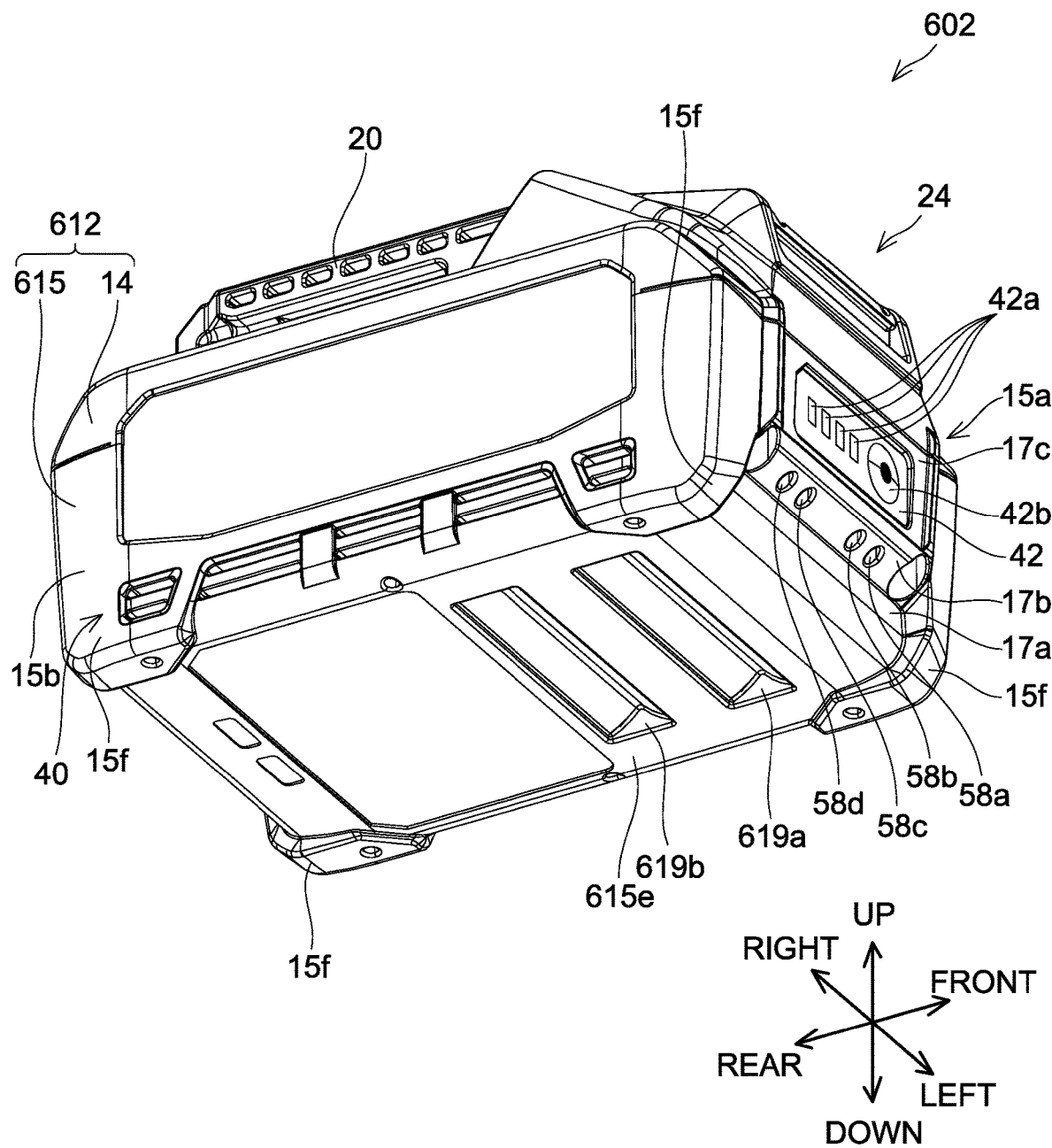
FIG. 26 is an oblique view, viewed from the front, the right, and below, of a battery pack 602 according to a second embodiment of the present teachings.

As shown in FIG. 26, two hook parts 619a, 619b, which are lined up (parallel) in the front-rear direction, are provided on bottom surface 615e of the lower-part case 615. Therefore, when the user wishes to remove the battery pack 2 from the power tool 200 or the charger 300, the user can insert one or more fingers into one of the two hook parts 619a, 619b that is best suited to the length of the user's finger(s). Accordingly, removal of the battery pack 2 from the power tool 200 or the charger 300 can be made easier.

Additional configurations of the battery pack disclosed by the present specification are described below.
(Configuration 1)
A battery pack mountable, by sliding, on a power tool, comprising:
  a first terminal;
  a second terminal;
  an outer case, which houses the first terminal and the second terminal;
  wherein:
  a first terminal-opening part, which is provided at a location corresponding to the first terminal, and a second terminal-opening part, which is provided at a location corresponding to the second terminal, are provided in an upper surface of the outer case; and
  a battery-side channel (recessed part) is provided between the first terminal-opening part and the upper surface and a second battery-side channel (recessed part) is provided between the second terminal-opening part and the upper surface.
(Configuration 2)
The battery pack according to configuration 1, wherein the battery-side channels (recessed parts) have a shape that matches (corresponds to, is complementary to) tool-side ridge parts of the power tool.
(Configuration 3)
The battery pack according to configuration 1 or 2, wherein:
  the first terminal is a discharge terminal; and
  the second terminal is a signal terminal.
(Configuration 4)
A battery pack comprising:
  a first terminal;
  a second terminal;
  a third terminal;
  a fourth terminal; and
  an outer case, which houses the first terminal, the second terminal, the third terminal, and the fourth terminal;
  wherein:
  the outer case comprises a pair of slide rails that receive a power tool by being slid;
  a first terminal-opening part, which is provided at a location corresponding to the first terminal, a second terminal-opening part, which is provided at a location corresponding to the second terminal, a third terminal-opening part, which is provided at a location corresponding to the third terminal, and a fourth terminal-opening part, which is provided at a location corresponding to the fourth terminal, are provided in an upper surface of the outer case between the pair of slide rails;

the first terminal-opening part, the second terminal-opening part, the third terminal-opening part, and the fourth terminal-opening part are disposed, from one slide rail of the pair of slide rails toward the other slide rail, in the order of the first terminal-opening part, the second terminal-opening part, the third terminal-opening part, and the fourth terminal-opening part; and a first battery-side channel (recessed part) is provided between the first terminal-opening part and the upper surface, a second battery-side channel (recessed part) is provided between the second terminal-opening part and the upper surface, a third battery-side channel (recessed part) is provided between the third terminal-opening part and the upper surface, and a fourth battery-side channel (recessed part) is provided between the fourth terminal-opening part and the upper surface.

(Configuration 5)

The battery pack according to configuration 4, wherein the battery-side recessed parts have a shape that matches (corresponds to, is complementary to) tool-side ridge parts of the power tool.

(Configuration 6)

The battery pack according to configuration 4 or 5, wherein:

the first terminal and the fourth terminal are discharge terminals; and the second terminal and the third terminal are signal terminals.

(Configuration 7)

A battery pack, which is mountable, by the being slid from the front to the rear, on an external apparatus, comprising:

an outer case;

wherein:

the outer case comprises:

a pair of slide rails that receive the external apparatus by being slid;

a terminal-opening part, which is provided between the pair of slide rails;

a surface that is between the pair of slide rails and rearward of the terminal-opening part;

a vent; and a battery-side channel (recessed part), which is provided between the pair of slide rails and between the vent and the surface rearward of the terminal-opening part.

(Configuration 8)

The battery pack according to configuration 7, wherein the battery-side channel (recessed part) has a shape that matches a (corresponding, complementary, matching) apparatus-side ridge part of the external apparatus.

Concrete examples of the present invention are explained above in detail, but these are merely illustrative examples and do not limit the claims. The techniques described in the claims include variations and modifications of the concrete examples illustrated above.

First Modified Example

The vent 40 does not have to be provided, in the right-side surface 15b, at a location that differs from the location facing an end surface of the battery cell 90c in the longitudinal direction.

Second Modified Example

In addition to the vent 40 according to the first embodiment, a (another) vent may be provided, in the right-side surface 15b, at a location at which it faces an end surface of each upper-level battery cell 90f-90j in the longitudinal direction. In addition, in a separate modified example, a vent is provided at a location at which it faces an end surface of each upper-level battery cell 90f-90j in the longitudinal direction, but a (another) vent does not have to be provided at a location at which it faces an end surface of each lower-level battery cell 90a-90e in the longitudinal direction.

Third Modified Example

The number of holes that constitute the vent 40 may be made fewer or greater than the number of the battery cells 90a-90j.

Fourth Modified Example

The lower-part case 15 does not have to have the side-part ribs 60a-60h.

Fifth Modified Example

The holes of the vent 40 should be provided downward of the upper ends of the battery cells 90a-90e. For example, in a modified example, the holes of the vent 40 may be provided between the upper ends of the battery cells 90a-90e and the longitudinal-direction axes A1 of the battery cells 90a-90e, instead of being all lower than the longitudinal-direction axes A1 of the battery cells 90a-90e.

Sixth Modified Example

The widths of the holes 40a-40j, whose locations in the up-down direction coincide, in the left-right direction may be the same. In addition, in a separate modified example, the widths of the holes 40a-40j in the left-right direction may gradually increase as they go outward from the center position in the left-right direction.

Seventh Modified Example

When the battery pack 2 is mounted on the charger 300, a ventilation fan (blower fan) located within the charger 300 may blow air into the interior of the battery pack 2 via the vent 26. In such an embodiment, the vent 40 may serve as an air exhaust hole (port) for exhausting the air that has cooled the components within the interior of the battery pack 2.

The technical elements explained in the present specification and the drawings exhibit technical utility on their own or in various combinations and are not limited to the combinations recited in the claims at the time of application. In addition, the techniques illustrated in the present specification and the drawings can simultaneously achieve multiple objects and, by achieving one among those objects, have technical utility on their own.

This application hereby incorporates by reference the entire disclosure of application Ser. No. 17/036,356, and the entire disclosure of application Ser. No. 17/036,435.

Representative, non-limiting examples of the present invention were described above in detail with reference to the attached drawings. This detailed description is merely intended to teach a person of skill in the art further details for practicing preferred aspects of the present teachings and is not intended to limit the scope of the invention. Furthermore, each of the additional features and teachings disclosed above may be utilized separately or in conjunction with other features and teachings to provide improved battery packs for cordless tools.

Moreover, combinations of features and steps disclosed in the above detailed description may not be necessary to practice the invention in the broadest sense, and are instead taught merely to particularly describe representative examples of the invention. Furthermore, various features of the above-described representative examples, as well as the various independent and dependent claims below, may be combined in ways that are not specifically and explicitly enumerated in order to provide additional useful embodiments of the present teachings.

All features disclosed in the description and/or the claims are intended to be disclosed separately and independently from each other for the purpose of original written disclosure, as well as for the purpose of restricting the claimed subject matter, independent of the compositions of the features in the embodiments and/or the claims. In addition, all value ranges or indications of groups of entities are intended to disclose every possible intermediate value or intermediate entity for the purpose of original written disclosure, as well as for the purpose of restricting the claimed subject matter.

EXPLANATION OF THE REFERENCE NUMBERS

2 Battery pack
10 Battery module
12 Outer case
14 Upper-part case
14a Front surface
14b1 Forward-upper surface
14b2 Rearward-upper surface
15 Lower-part case
15a Front surface
15b Right-side surface
15c Rear surface
15d Left-side surface
15e Bottom surface
15f Corner part
16a Flat part
16b Projection
16c Depression
16d Step part
17a First upward-extending surface
17b Tilted surface
17c Second upward-extending surface
18 Screw
19 Hook part
20 Slide rail
20a Base part
20b Upward-extending part
20c First rightward-extending part
20d Second rightward-extending part
20e Slots
22 Terminal-receiving part
22a-22d Terminal-opening parts
23a-23d Battery-side channels
24 Hook
24a Manipulatable part
24b Projection
26 Vent
27 Battery-side channel
28 Screw hole
30a-30e First ridge parts
32a Thick-wall part
32b Thin-wall part
34a-34f Second ridge parts
40 Vent
40a-40j Holes
41 Vent
41a-41j Holes
42 Display part
42a Remaining-battery-charge display part
42b Button
43c Lower end
43h Lower end
46 Screw hole
48 Front-part rib
50 Front-part rib
50a Groove part
52 Front-part rib
54 Front-part rib
56 Front-part rib
56a Light-shielding wall part
56b Flat part
58a-58d Vents
60a-60h Side-part ribs
62 Screw hole
64a-64f Second recessed parts
80 Cell case
80a Front part
80b Rear part
80c Thick-wall part
80d Upper surface
80e Right-side surface
80f Left-side surface
80g Hollow part
81a Vent
81b Vent
82 Control board
83 Screw boss
84 LED board
84a LED
84b Switch
84c Lower surface
85 Right cell case
86 Left cell case
87a-87j Cell-holding parts
88 Coupling part
89a Center holding part
89b End-surface-side holding part
90a-90j Battery cells
91 Metal part
91a Lower end
92a-92k Lead plates
93a-93c Side surfaces
94a Upper end
94b Lower end
95 Waterproof ring
100 Fastener
102 Terminal
104a Battery-side, negative-electrode terminal
104b Battery-side, positive-electrode terminal
106a-106d Battery-side signal terminals
110a-110e First recessed parts
112 Screw holder
114 Screw 116a-116e Protruding parts
120 Signal line
200 Power tool
202 Terminal-holding part
206a-206d Tool-side ridge parts
208a Tool-side, negative-electrode terminal
208b Tool-side, positive-electrode terminal
210a, 210c Tool-side signal terminals
300 Charger
302 Slide rail
304 Housing
306 Charger-side ridge part
308 Vent
602 Battery pack
612 Outer case
615 Lower-part case
615e Bottom surface
619a, 619b Hook parts

The invention claimed is:

1. A battery pack comprising:
  an outer case having an upper wall, a bottom wall extending in a first plane defined by a first direction and a second direction that is perpendicular to the first direction, first and second side walls respectively extending upward from the bottom wall in second and third planes that are parallel to each other and that each extend in the first direction and a third direction that is perpendicular to the first and second directions, and third and fourth side walls respectively extending upward from the bottom wall in fourth and fifth planes that are parallel to each other and that each extend in the second direction and the third direction;
  a battery cell case housed within the outer case;
  first and second battery cells housed in the battery cell case such that a longitudinal axis of each of the first and second battery cells extends in the second direction and parallel to the bottom wall; and
  at least one first opening defined in the first side wall;
  wherein:
  the upper wall has a terminal-opening part and a first vent,
  a terminal extends through the terminal-opening part and is electrically connected to the first and second battery cells;
  the longitudinal axes of the first and second battery cells extend parallel to the bottom wall in a sixth plane that is parallel to the third and fourth side walls;
  a first air flow path extends through an interior of the battery cell case between the first and second battery cells and at least a majority of the first air flow path extends in the first direction and parallel to the first plane;
  the first air flow path extends from the first vent to a second vent defined in the third side wall;
  the first side wall faces a first longitudinal end surface of the first and second battery cells;
  a second air flow path extends in the third direction parallel to the second and third planes, the second air flow path being defined between an interior surface of the first side wall and a first exterior surface of the battery cell case such that the first longitudinal end surfaces of the first and second battery cells are disposed in the second air flow path;
  the second air flow path extends from the at least one first opening to the terminal-opening part; and
  the first exterior surface of the battery cell case is disposed between the first air flow path and the second air flow path.

2. The battery pack according to claim 1, wherein the at least one first opening is defined in the first side wall at a location at which the at least one first opening faces the first longitudinal end surface of the first battery cell.

3. The battery pack according to claim 2, wherein:
  the second battery cell is an upward-side battery cell disposed upward of the first battery cell in the third direction; and
  no opening is provided at a location opposing the first longitudinal end surface of the second battery cell.

4. The battery pack according to claim 1, wherein:
  the at least one first opening comprises at least two first openings, which are both defined in the first side wall and which both oppose the first longitudinal end surface of the first battery cell.

5. The battery pack according to claim 4, wherein:
  first and second ribs project inward from the first side wall towards the battery cell case and extend in parallel in the third direction; and
  the at least two first openings are disposed between the first and second ribs.

6. The battery pack according to claim 1, wherein a lower end of the at least one first opening is located between the longitudinal axis of the first battery cell and the bottom wall.

7. The battery pack according to claim 6, wherein:
  a metal plate is electrically connected to the first longitudinal end surface of the first battery cell;
  the metal plate extends perpendicular to the longitudinal axis of the first battery cell; and
  the lower end of the at least one first opening is located between a lower end of the metal plate and the bottom wall.

8. The battery pack according to claim 3, further comprising:
  third and fourth battery cells provided in the battery cell case such that the longitudinal axes of the third and fourth battery cells are parallel to the bottom wall;
  wherein:
  the first and fourth battery cells are outward battery cells respectively disposed at locations closest to corner portions of the outer case, and the third battery cell is an inward battery cell disposed between the two outward battery cells;
  the at least one first opening comprises at least three first openings defined in the first side wall;
  two of the at least three first openings respectively oppose the two outward battery cells and have a first width or respective first widths in a direction parallel to the bottom wall;
  a third one of the at least three first openings opposes the inward battery cell and has a second width in the direction parallel to the bottom wall; and
  the second width is longer than the first width(s).

9. The battery pack according to claim 1, wherein the vent is in fluid communication with the at least one first opening.

10. The battery pack according to claim 1, wherein the at least one first opening is disposed at a location on the first side wall such that, when the battery pack is mounted on a charger, the at least one first opening is not covered by the charger.

11. The battery pack according to claim 10, wherein the at least one first opening is configured to function as an air-intake hole when the battery pack is mounted on the charger and the charger is suctioning air from within the battery pack.

12. The battery pack according to claim 1, further comprising:
  at least one second opening defined in the second side wall;
  the second side wall faces a second longitudinal end surface of the first battery cell that is opposite of the first longitudinal end surface in the direction of the longitudinal axis of the first battery cell.

13. The battery pack according to claim 12, wherein:
  the at least one first opening comprises a plurality of first openings;
  the at least one second opening comprises a plurality of second openings;
  third, fourth, fifth and sixth battery cells are also provided in the battery cell case such that the longitudinal axes of the first-to-sixth battery cells are parallel to the bottom wall;
  the first battery cell is disposed closest to a first corner portion of the outer case, the fourth battery cell is disposed closest to a second corner portion of the outer case, and the third battery cell is disposed between the first and second battery cells in the first direction, the second battery cell is disposed above the first battery cell in the third direction, the fifth battery cell is disposed above the fourth battery cell in the third direction, and the sixth battery cell is disposed above the third battery cell in the third direction and between the second and fifth battery cells in the first direction; and
  a width or widths, in a direction parallel to the bottom wall, of ones of the first and second openings that oppose the first and fourth battery cells is (are) shorter than a width, in the direction parallel to the bottom wall, of ones of the first and second openings that oppose the third battery cell.

14. The battery pack according to claim 13, further comprising:
  a plurality of ribs that respectively protrude inward from each of the first and second side walls toward the battery cell case and extend in parallel in the third direction;
  wherein:
  a first one of the ribs is provided on the first side wall between (i) the first and second battery cells and one of the first openings on one side and (ii) the third and fifth battery cells and another one of the first openings on the other side; and
  a second one of the ribs is provided on the second side wall between (i) the first and second battery cells and one of the second openings on one side and (ii) the third and fifth battery cells and another one of the second openings on the other side.

15. The battery pack according to claim 14, wherein the first openings and the second openings are provided in the first and second side walls, respectively, at locations between the bottom wall and the longitudinal axes of the first, and fourth battery cells.

16. The battery pack according to claim 15, wherein:
  the first and second openings are respectively defined in the first and second side walls at locations that respectively oppose the first and second longitudinal end surfaces of the first, third and fourth battery cells; and
  no opening is provided in the first and second side walls at locations that respectively oppose the first and second longitudinal end surfaces of the second, fifth and sixth battery cells.

17. The battery pack according to claim 16, wherein:
  metal plates are respectively connected to the first and second longitudinal end surfaces of each of the first, third and fourth battery cells;
  the metal plates each respectively extend perpendicular to the longitudinal axes of the first, third and fourth battery cells; and
  lower ends of the first and second openings are respectively located between lower ends of the metal plates and the bottom wall.

18. The battery pack according to claim 17, wherein the vent and the terminal-opening part are in fluid communication with the first and second openings.

19. The battery pack according to claim 18, wherein the first and second openings are disposed at locations on the first and second side walls such that, when the battery pack is mounted on a charger, the first and second openings are not covered by the charger and are configured to function as air-intake holes.

20. The battery pack according to claim 1, wherein the second vent is defined in a third side wall of the outer case that extends perpendicular to the first and second side walls.

21. The battery pack according to claim 1, wherein:
  a third vent is defined in the battery cell case in fluid communication with the first air flow path, and is located in the first air flow path between the second vent defined in the third side wall of the outer case and the interior of the battery cell case; and
  a fourth vent is defined in the battery cell case in fluid communication with the first air flow path, and is located the first air flow path between the first vent defined in the upper wall of the outer case and the interior of the battery cell case.

* * * * *